US011800147B2

(12) United States Patent
Aono et al.

(10) Patent No.: US 11,800,147 B2
(45) Date of Patent: *Oct. 24, 2023

(54) VIDEO ENCODING DEVICE AND VIDEO DECODING DEVICE

(71) Applicant: Sharp Kabushiki Kaisha, Sakai (JP)

(72) Inventors: Tomoko Aono, Sakai (JP); Tomohiro Ikai, Sakai (JP); Takeshi Chujoh, Sakai (JP); Tomonori Hashimoto, Sakai (JP); Yukinobu Yasugi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/488,418

(22) Filed: Sep. 29, 2021

(65) Prior Publication Data
US 2022/0060741 A1  Feb. 24, 2022

Related U.S. Application Data

(63) Continuation of application No. 16/625,964, filed as application No. PCT/JP2018/024364 on Jun. 27, 2018, now Pat. No. 11,184,636.

(30) Foreign Application Priority Data

Jun. 28, 2017 (JP) ................................ 2017-126272
Jul. 28, 2017 (JP) ................................ 2017-146569
(Continued)

(51) Int. Cl.
H04N 19/52 (2014.01)
H04N 19/159 (2014.01)
(Continued)

(52) U.S. Cl.
CPC ......... *H04N 19/563* (2014.11); *H04N 19/159* (2014.11); *H04N 19/176* (2014.11); *H04N 19/52* (2014.11)

(58) Field of Classification Search
CPC .. H04N 19/159; H04N 19/563; H04N 19/139; H04N 19/52
See application file for complete search history.

(56) References Cited

U.S. PATENT DOCUMENTS 10,034,012 B2 * 7/2018 Ikai ...................... H04N 19/105
11,184,636 B2 * 11/2021 Aono ................... H04N 19/176
(Continued)

OTHER PUBLICATIONS

Control-Point Representation and Differential Coding Affine-Motion Compensation; 2013. (Year: 2013).*
(Continued)

*Primary Examiner* — Luis Perez-Fuentes
(74) *Attorney, Agent, or Firm* — KEATING & BENNETT, LLP

(57) ABSTRACT

In a case of referring to information between pictures by means of inter prediction, the entire picture needs to be decoded even in a case of decoding a small region. In a case of referring to information within a picture by means of intra prediction, referring to information across a tile boundary is not possible. In a case that a pixel pointed by a sub-block level motion vector of a target block that is calculated by scaling based on an available motion vector acquired from a spatial neighboring block or a temporal neighboring block is not present within a tile sequence, a process of replacing the pixel value with a pixel value within the tile sequence is performed. In a case of referring to a pixel outside of a tile by means of intra prediction, a process of replacing the pixel value with that of a pixel within the tile is performed.

1 Claim, 50 Drawing Sheets

(30) Foreign Application Priority Data

Aug. 25, 2017 (JP) ................................ 2017-162106
Mar. 28, 2018 (JP) ................................ 2018-061846

(51) Int. Cl.
*H04N 19/563* (2014.01)
*H04N 19/176* (2014.01)

(56) References Cited

U.S. PATENT DOCUMENTS 11,375,230 B2* 6/2022 Misra .................... H04N 19/176
11,412,243 B2* 8/2022 Chujoh .................. H04N 19/52

OTHER PUBLICATIONS

Affine transform prediction for next generation of video coding; 2015. (Year: 2015).*
An affine MC framework for HEVC coding; 2015. (Year: 2015).*
Improved affine motion prediction; 2016. (Year: 2016).*
Aono et al., "Video Encoding Device and Video Decoding Device", U.S. Appl. No. 16/625,964, filed Dec. 23, 2019.

* cited by examiner (a)

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( 1, sps_max_sub_layers_minus1 ) | |
| sps_seq_parameter_set_id | ue(v) |
| chroma_format_idc | ue(v) |
| if( chroma_format_idc == 3 ) | |
|    separate_colour_plane_flag | u(1) |
| pic_width_in_luma_samples | ue(v) |
| pic_height_in_luma_samples | ue(v) |
| ... | ... |
| independent_tile_flag | u(1) |
| vui_parameters_present_flag | u(1) |
| if( vui_parameters_present_flag ) | |
|    vui_parameters( ) | |
| ... | |

(b)

| pic_parameter_set_rbsp( ) { | Descriptor |
|---|---|
| pps_pic_parameter_set_id | ue(v) |
| pps_seq_parameter_set_id | ue(v) |
| ... | |
| tiles_enabled_flag | u(1) |
| entropy_coding_sync_enabled_flag | u(1) |
| if( tiles_enabled_flag ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
|   loop_filter_across_tiles_enabled_flag | u(1) |
| } | |
| ... | |

(c)

| slice_segment_header( ) { | Descriptor |
|---|---|
| ... | |
| if( ( collocated_from_l0_flag && num_ref_idx_l0_active_minus1 > 0 ) \|\| ( !collocated_from_l0_flag && num_ref_idx_l1_active_minus1 > 0 ) ) | |
|   collocated_ref_idx | ue(v) |
| ... | |

(d)

| vui_parameters( ) { | Descriptor |
|---|---|
| ... | |
| bitstream_restriction_flag | u(1) |
| if( bitstream_restriction_flag ) { | |
|   tiles_fixed_structure_flag | u(1) |
| ... | |

FIG. 18

| |
|---|
| SPATIAL MERGE CANDIDATE (BLOCK L) |
| SPATIAL MERGE CANDIDATE (BLOCK A) |
| SPATIAL MERGE CANDIDATE (BLOCK AR) |
| SPATIAL MERGE CANDIDATE (BLOCK BL) |
| SPATIAL-TIME MERGE CANDIDATE (ATMVP) |
| SPATIAL-TIME MERGE CANDIDATE (STMVP) |
| SPATIAL MERGE CANDIDATE (BLOCK AL) |
| TIME MERGE CANDIDATE (TMVP) |
| COMBINED MERGE CANDIDATE |
| ZERO MERGE CANDIDATE |

```
Pred[x][y] = {(c1v>>k[y])*r[x][-1] + (c1h>>k[x])*r[-1][y] -
              ((c2v>>k[y])+(c2h>>k[x]))*r[-1][-1] +
              b[x][y]*q[x][y] + (1<<(rshift-1))} >> rshift
```

(b)

```
b[x][y] = {(1<<rshift) - (c1v>>k[y]) - (c1h>>k[x]) +
           ((c2v>>k[y])+(c2h>>k[x]))}
```

(c)

```
k[x] = floor(x/dx)
k[y] = floor(y/dy)
```

(d)

| W  | W<=16 | W>16 |
|----|-------|------|
| dx | 1     | 2    |

(e)

| W  | W<=4 | W<=8 | W<=16 | W>16 |
|----|------|------|-------|------|
| dx | 1/4  | 1/2  | 1     | 2    |

FIG. 42

```
ktable[][4] = {{c1v, c2v, c1h, c2h}} =
{
  {  27,  10,  27,  10}, // IntraPredMode = PLANER (=0)
  {  22,   9,  22,   9}, // IntraPredMode = DC (=1)
  { -10,   7,  22,   1}, // 2
  { -10,   7,  22,   1}, // 3
  {  -5,   4,  10,   1}, // 4
  {  -5,   4,  10,   1}, // 5
  {  -8,   3,   7,   2}, // 6
  {  -8,   3,   7,   2}, // 7
  { -48,   1,   8,   6}, // 8
  { -48,   1,   8,   6}, // 9
  {  20,   1,  25,  25}, // 10
  {  20,   1,  25,  25}, // 11
  {  14,  -1,   5,   9}, // 12
  {  14,  -1,   5,   9}, // 13
  {  10,   1,   1,   3}, // 14
  {  10,   1,   1,   3}, // 15
  {   6,   2,   2,   1}, // 16
  {   6,   2,   2,   1}, // 17
  {  -1,   2,  -1,   2}, // IntraPredMode=HOR(18) / VER(50)
  {   2,   1,   6,   2}, // 19
  {   2,   1,   6,   2}, // 20
  {   1,   3,  10,   1}, // 21
  {   1,   3,  10,   1}, // 22
  {   5,   9,  14,  -1}, // 23
  {   5,   9,  14,  -1}, // 24
  {  25,  25,  20,   1}, // 25
  {  25,  25,  20,   1}, // 26
  {   8,   6, -48,   1}, // 27
  {   8,   6, -48,   1}, // 28
  {   7,   2,  -8,   3}, // 29
  {   7,   2,  -8,   3}, // 30
  {  10,   1,  -5,   4}, // 31
  {  10,   1,  -5,   4}, // 32
  {  22,   1, -10,   7}, // 33
  {  22,   1, -10,   7}, // 34
}
    c1v = ktable[fmode][0]
    c2v = ktable[fmode][1]
    c1h = ktable[fmode][2]
    c2h = ktable[fmode][3]
    fmode = IntraPredMode        (IntraPredMode<=34)
            68-IntraPredMode     (34<IntraPredMode)
```

FIG. 44

(a)
$$Pred[x][y] = \{(c1v>>k[y])*r[x][-1] - (c2v>>k[y])*r[0][-1] + b[x][y]*q[x][y] + (1<<(rshift-1))\} >> rshift$$

$$b[x][y] = \{(1<<rshift) - (c1v>>k[y]) + (c2v>>k[y])\}$$

(b)
$$Pred[x][y] = \{(c1v>>k[y])*r[x][-1] - (c2v>>k[y])*r[W-1][-1] + b[x][y]*q[x][y] + (1<<(rshift-1))\} >> rshift$$

$$b[x][y] = \{(1<<rshift) - (c1v>>k[y]) + (c2v>>k[y])\}$$

(c)
$$Pred[x][y] = \{(c1h>>k[x])*r[-1][y] - (c2h>>k[x])*r[-1][0] + b[x][y]*q[x][y] + (1<<(rshift-1))\} >> rshift$$

$$b[x][y] = \{(1<<rshift) - (c1h>>k[x]) + (c2h>>k[x])\}$$

(d)
$$Pred[x][y] = \{(c1h>>k[x])*r[-1][y] - (c2h>>k[x])*r[-1][H-1] + b[x][y]*q[x][y] + (1<<(rshift-1))\} >> rshift$$

$$b[x][y] = \{(1<<rshift) - (c1h>>k[x]) + (c2h>>k[x])\}$$

FIG. 47

VIDEO ENCODING DEVICE AND VIDEO DECODING DEVICE

TECHNICAL FIELD

One aspect of the present invention relates to a video decoding device and a video encoding device.

BACKGROUND ART

A video encoding device which generates coded data by coding a video, and a video decoding device which generates decoded images by decoding the coded data are used to transmit or record a video efficiently.

For example, specific video coding schemes include schemes suggested in H.264/AVC and High-Efficiency Video Coding (HEVC).

In such a video coding scheme, images (pictures) constituting a video are managed by a hierarchy structure including slices obtained by splitting images, Coding Tree Units (CTUs) obtained by splitting the slices, coding units (CUs) obtained by splitting the coding tree units, Prediction Units (PUs) which are blocks obtained by splitting the coding units, and Transform Units (TUs), and are coded/decoded for each CU.

In such a video coding scheme, usually, a prediction image is generated based on local decoded images obtained by coding/decoding input images, and prediction residual (also sometimes referred to as "difference images" or "residual images") obtained by subtracting the prediction images from input images (original images) are coded. Generation methods of prediction images include an inter-picture prediction (an inter prediction) and an intra-picture prediction (intra prediction) (NPL 1).

In recent years, along with the advancement in processors, such as a multi-core CPU and a GPU, configurations and algorithms that facilitate performance of parallel processes have been adopted for a video coding and decoding process. As an example of a configuration facilitating parallelization, a screen (picture) split unit, called a Tile, has been introduced. Unlike a slice, a tile is obtained by splitting a picture into rectangular regions, and a tile is decoded without referring to information (a prediction mode, an MV, a pixel value) outside of the tile within one picture. Consequently, the tile can be independently decoded within one picture (NPL 2). Incidentally, in a case that another decoded picture (reference picture) is referred to by means of inter prediction also in a case of using the tiles, information (a prediction mode, an MV, a pixel value) that a target tile refers to on the reference picture is not necessarily information of a region at the same position as the target tile on the reference picture. Therefore, even in a case that only a part of a region (tile, or a limited number of tiles) of a video is regenerated, the entire video needs to be regenerated.

In addition, in recent years, resolution for a video has been enhanced, as typified by 4K, 8K, VR, and a video that captures 360-degree omnidirectional images, such as a 360-degree video. To watch such images/videos on a smartphone and a Head Mount Display (HMD), a part of the high-resolution image is clipped and displayed on a display. Since capacity of a battery for a smartphone and an HMD is not large, there is anticipation for a system that extracts a partial region necessary for display so as to enable watching of an image through a minimum necessary decoding process.

CITATION LIST

Non Patent Literature

NPL 1: "Algorithm Description of Joint Exploration Test Model 6", JVET-F1001, Joint Video Exploration Team (JVET) of ITU-T SG 16 WP 3 and ISO/IEC JTC 1/SC 29/WG 11, 31 March-April 2017

NPL 2: ITU-T H.265 (April 2015) SERIES H: AUDIOVISUAL AND MULTIMEDIA SYSTEMS Infrastructure of audiovisual services—Coding of moving video High efficiency video coding "Algorithm Description of Joint Exploration Test Model 7", JVET-G1001, Joint Video Exploration Team (JVET) of ITU-T SG 16 WP 3 and ISO/IEC JTC 1/SC 29/WG 11, 31 Jul. 2017

SUMMARY OF INVENTION

Technical Problem

As described above, a tile is obtained by splitting a picture into rectangular regions, and a tile can be decoded without referring to information (a prediction mode, an MV, a pixel value) outside of the tile within one picture. Specifically, the tile can be independently decoded within one picture. However, to decode a partial region (tile, or a limited number of tiles) of a video as a sequence, the entire video needs to be regenerated. To enable an independent process for each tile in a time direction as well as in a spatial direction, it is only necessary that an encoder abandon the use of a tool that may use information of a neighboring tile of a target tile and a collocated tile. In this case, however, information related to the tool needs to be transmitted uselessly, and this significantly reduces coding efficiency. Furthermore, a process without the use of information of a neighboring tile of a target tile is also required, but this reduces coding efficiency.

The present invention is made in view of the problems described above, and has an object to provide a system that prevents decrease in coding efficiency, and secures independent decoding of each tile in a spatial direction and a time direction.

Solution to Problem

An image decoding device or a video encoding device according to one aspect of the present invention is a video encoding device or a video decoding device for performing a spatial-temporal prediction process by deriving a motion vector of a target block, based on a spatial neighboring block or a temporal neighboring block, the image decoding device or the video encoding device including: a unit configured to determine whether or not a reference pixel is present within a tile sequence on a reference picture, the reference pixel being referred to in a case of deriving a motion compensation image by using a motion vector of the target block; and a unit configured to derive a pixel value of the motion compensation image, based on a pixel value within the tile sequence, in a case that the reference pixel is not present within the tile sequence, wherein a position of the temporal neighboring block is a block including any one of lower right coordinates within a collocated block, lower left coordinates of a right neighboring block of the collocated block, and upper right coordinates of a lower neighboring block of the collocated block.

Advantageous Effects of Invention

According to one aspect of the present invention, a system of securing independence of decoding of each tile is introduced in each individual tool, and therefore decrease in coding efficiency can be prevented, and each tile can be independently decoded in a video. As a result, decoding can be performed in a selected region necessary for display or the like, and therefore a processing amount can be reduced in a great degree.

BRIEF DESCRIPTION OF DRAWINGS

FIG. 18 is a syntax table related to tile information and the like.

FIG. 24 is a diagram illustrating a prediction vector candidate list (merge candidate list).

FIG. 27(a) illustrates the transmission device equipped with the video encoding device, and FIG. 27(b) illustrates the reception device equipped with the video decoding device.

FIG. 28(a) illustrates the recording device equipped with the video encoding device, and FIG. 28(b) illustrates the regeneration device equipped with the video decoding device.

FIG. 42 is a diagram illustrating a boundary filter.

FIG. 44 is a diagram illustrating an example of a reference intensity coefficient table.

FIG. 47 is another diagram illustrating a boundary filter.

DESCRIPTION OF EMBODIMENTS

First Embodiment

Hereinafter, embodiments of the present invention are described with reference to the drawings.

Figure 29:
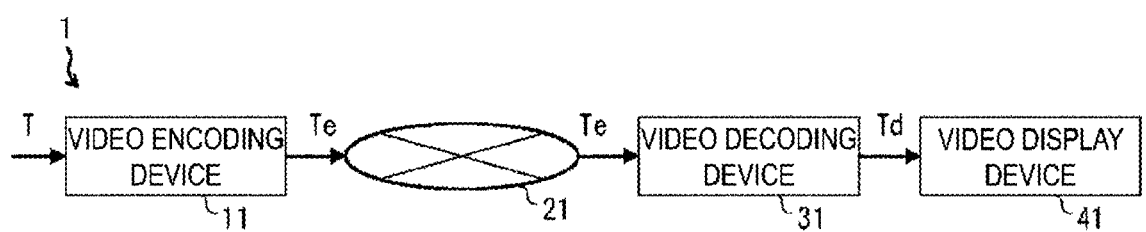
FIG. 29 is a schematic diagram illustrating a configuration of an image transmission system according to the present embodiment.

FIG. 29 is a schematic diagram illustrating a configuration of an image transmission system 1 according to the present embodiment.

The image transmission system 1 is a system configured to transmit codes of a coding target image having been coded, decode the transmitted codes, and display an image. The image transmission system 1 includes an image encoding device (video encoding device) 11, a network 21, an image decoding device (video decoding device) 31, and an image display device (video display device) 41.

An image T indicating an image of a single layer or multiple layers is input to the image encoding device 11. A layer is a concept used to distinguish multiple pictures in a case that there are one or more pictures to configure a certain time. For example, coding an identical picture in multiple layers having different image qualities and resolutions is scalable coding, and coding pictures having different viewpoints in multiple layers is view scalable coding. In a case of performing a prediction (an inter-layer prediction, an inter-view prediction) between pictures in multiple layers, coding efficiency greatly improves. In a case of not performing a prediction, in a case of (simulcast), coded data can be compiled.

The network 21 transmits a coding stream Te generated by the image encoding device 11 to the image decoding device 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium that records the coding stream Te, such as Digital Versatile Disc (DVD) and Blue-ray Disc (BD).

The image decoding device 31 decodes each of the coding streams Te transmitted by the network 21, and generates one or multiple decoded images Td.

The image display device 41 displays all or part of one or multiple decoded images Td generated by the image decoding device 31. For example, the image display device 41 includes a display device such as a liquid crystal display and an organic Electro-luminescence (EL) display. Examples of a display type include stationary, mobile, HMD, and the like. In spacial scalable coding and SNR scalable coding, in a case that the image decoding device 31 and the image display device 41 have high processing capability, an enhanced layer image having high image quality is displayed, and in a case of having lower processing capability, a base layer image which does not require as high processing capability and display capability as an enhanced layer is displayed.

Operator

Operators used herein will be described below.

An operator ">>" is a right bit shift operator, "<<" is a left bit shift operator, "&" is a bitwise AND operator, "|" is a bitwise OR operator, and "|=" is an OR assignment operator.

X ? An operator "x?y:z" is a ternary operator representing that y is obtained in case that x is true (that is, other than "0") or z is obtained in a case that x is false (that is, "0").

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

"abs(a)" is a function that returns an absolute value of a.

"Int(a)" is a function that returns an integer value of a.

"floor(a)" is a function that returns a maximum integer that is smaller or equal to a.

"a/d" represents a division of a by d (decimal places are rounded down).

Structure of Coding Stream Te

Prior to the detailed description of the image encoding device 11 and the image decoding device 31 according to the present embodiment, the data structure of the coding stream Te generated by the image encoding device 11 and decoded by the image decoding device 31 will be described.

Figure 1:
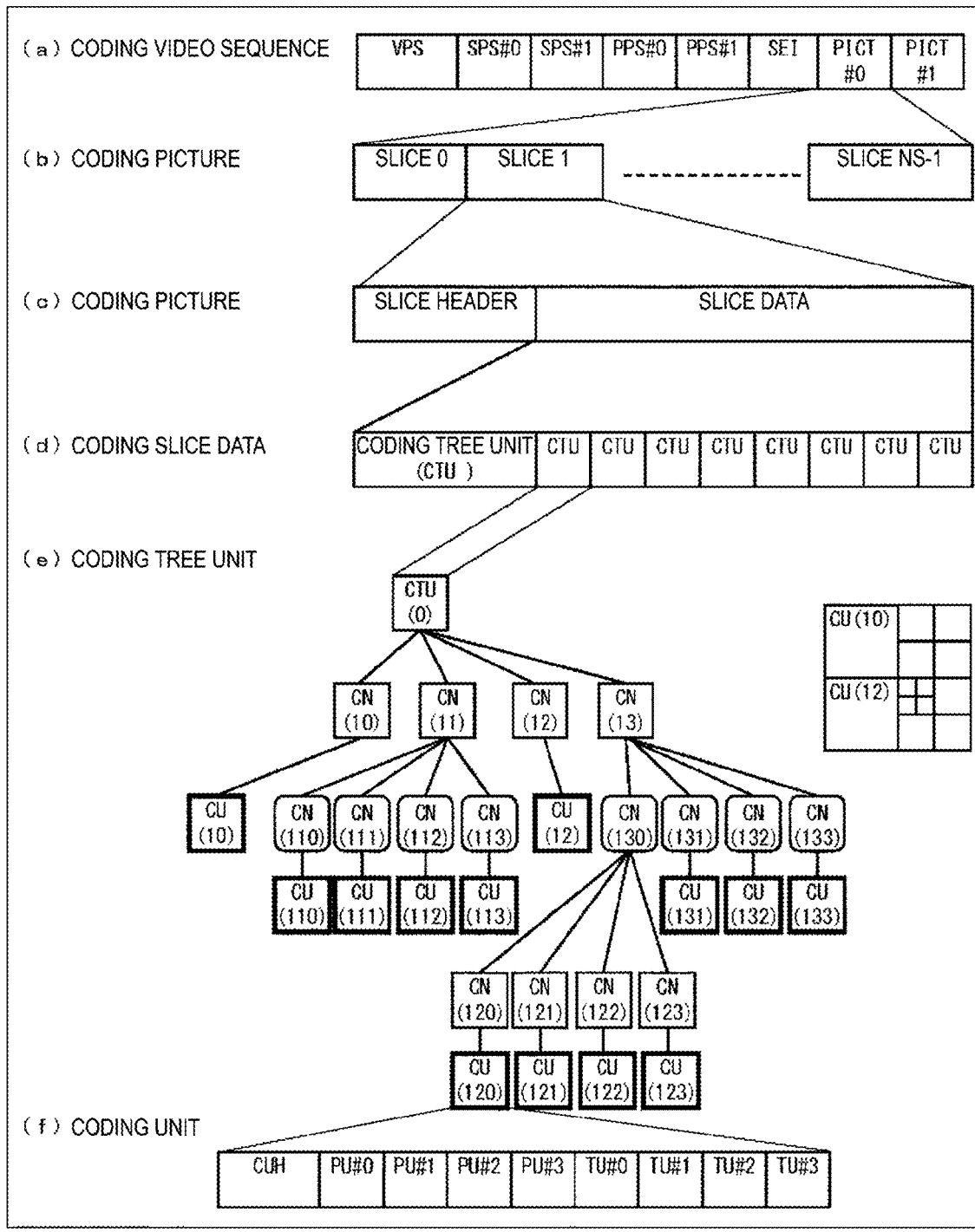
FIG. 1 is a diagram illustrating a hierarchy structure of data of a coding stream according to the present embodiment.

FIG. 1 is a diagram illustrating a hierarchy structure of data in the coding stream Te. The coding stream Te includes a sequence and multiple pictures constituting a sequence illustratively. (a) to (f) of FIG. 1 are diagrams illustrating a coding video sequence prescribing a sequence SEQ, a coding picture prescribing a picture PICT, a coding slice prescribing a slice S, a coding slice data prescribing slice data, a coding tree unit included in coding slice data, and Coding Units (CUs) included in a coding tree unit, respectively.

Coding Video Sequence

In the coding video sequence, a set of data referred to by the image decoding device 31 to decode the sequence SEQ of a processing target is prescribed. As illustrated in (a) of FIG. 1, the sequence SEQ includes a Video Parameter Set VPS, a Sequence Parameter Set SPS, a Picture Parameter Set PPS, a picture PICT, and Supplemental Enhancement Information SEI. Here, a value indicated after #indicates a layer ID. FIG. 1 illustrates an example in which there is coded data of #0 and #1, that is, a layer 0 and a layer 1, but types of layer and the number of layers are not limited thereto.

In the video parameter set VPS, for a video including multiple layers, a set of coding parameters common to multiple videos and a set of coding parameters associated with multiple layers and an individual layer included in a video are prescribed.

In the sequence parameter set SPS, a set of coding parameters referred to by the image decoding device 31 to decode a target sequence is prescribed. For example, width and height of a picture are prescribed. Note that multiple SPSs may exist. In that case, any of multiple SPSs is selected from the PPS.

In the picture parameter set PPS, a set of coding parameters referred to by the image decoding device 31 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each slice header in a target sequence.

Coding Picture

In the coding picture, a set of data referred to by the image decoding device 31 to decode the picture PICT of a processing target is prescribed. As illustrated in (b) of FIG. 1, the picture PICT includes slices S0 to $S_{NS-1}$ (NS is the total number of slices included in the picture PICT).

Note that in a case not necessary to distinguish the slices S0 to $S_{NS-1}$ below, subscripts of reference signs may be omitted and described. The same applies to other data included in the coding stream Te described below and described with an added subscript.

Coding Slice

In the coding slice, a set of data referred to by the image decoding device 31 to decode the slice S of a processing target is prescribed. As illustrated in (c) of FIG. 1, the slice S includes a slice header SH and a slice data SDATA.

The slice header SH includes a coding parameter group referred to by the image decoding device 31 to determine a decoding method of a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, (3) B slice using a unidirectional prediction, a bidirectional prediction, or an intra prediction in coding, and the like. Note that an inter prediction is not limited to a uni-prediction or a bi-prediction, and a greater number of reference pictures may be used to generate a prediction image. Hereinafter, in a case that a slice is referred to as a P or B slice, the slice refers to a slice that includes a block that may employ an inter prediction.

Note that, the slice header SH may include a reference (pic_parameter_set_id) to the picture parameter set PPS included in the coding video sequence.

Coding Slice Data

In the coding slice data, a set of data referred to by the image decoding device 31 to decode the slice data SDATA of a processing target is prescribed. As illustrated in (d) of FIG. 1, the slice data SDATA includes a Coding Tree Unit (CTU, CTU block). The CTU is a block of a fixed size (for example, 64×64) constituting a slice, and may be referred to as a Largest Coding Unit (LCU).

Coding Tree Unit

In (e) of FIG. 1, a set of data referred to by the image decoding device 31 to decode the coding tree unit of a processing target is prescribed. The coding tree unit is split into Coding Units (CUs), each of which is a basic unit of coding processing, by recursive quad tree split (QT split) or binary tree split (BT split). A tree structure obtained by the recursive quad tree splits or binary tree is referred to as a Coding Tree (CT), and a node of the tree structure is referred to as a Coding Node (CN). An intermediate node of the quad tree or binary tree is a coding node, and the coding tree unit itself is also prescribed as the highest coding node.

The CT includes, as CT information, a QT split flag (cu_split_flag) indicating whether or not to perform the QT split and a BT split mode (split_bt_mode) indicating a split method of the BT split. cu_split_flag and/or split_bt_mode are transmitted for each coding node CN. In a case that cu_split_flag is 1, the coding node CN is split into four coding nodes CN. In a case that cu_split_flag is 0, in a case that split_bt_mode is 1, the coding node CN is horizontally split into two coding nodes CN, in a case that split_bt_mode is 2, the coding node CN is vertically split into two coding nodes CN, and in a case that split_bt_mode is 0, the coding node CN is not split and has one coding unit CU as a node.

The coding unit CU is an end node (leaf node) of the coding nodes, and is not split anymore.

In a case that a size of the coding tree unit CTU is 64×64 pixels, a size of the coding unit can be any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, and 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

In (f) of FIG. 1, a set of data referred to by the image decoding device 31 to decode the coding unit of a processing target is prescribed. Specifically, the coding unit includes a prediction tree, a transform tree, and a CU header CUH. In the CU header, a prediction mode, a split method (PU split mode), and the like are prescribed.

Figure 15:
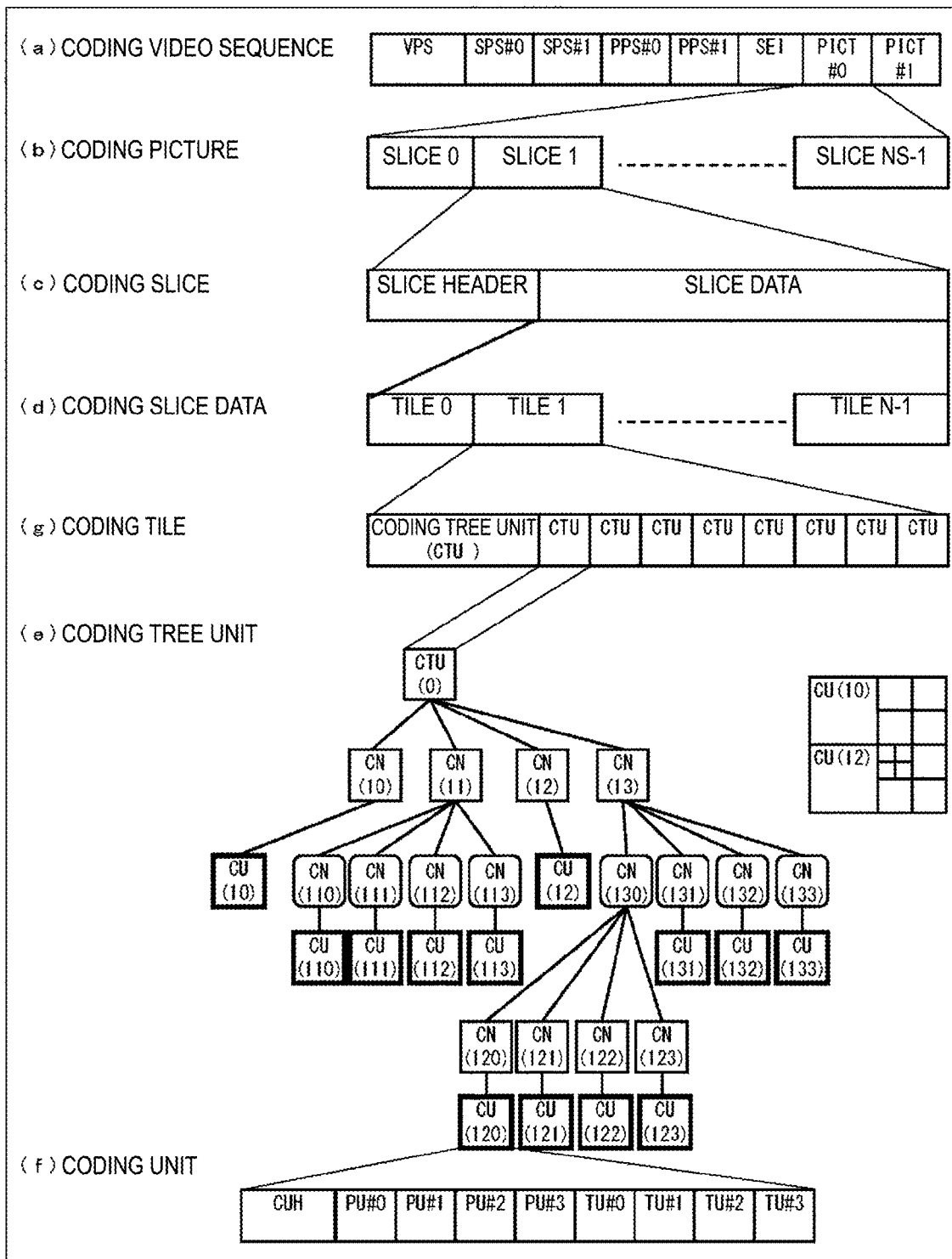
FIG. 15 is another diagram illustrating a hierarchy structure of data of a coding stream according to the present embodiment.

Note that the data structure of the coding stream Te may have a configuration illustrated in FIG. 15 instead of that in FIG. 1. A difference between FIG. 15 and FIG. 1 is that the slice is further split into tiles and the CTUs are included in each tile. Accordingly, (d) coding slice data includes the tiles, and (g) coding tile includes the CTUs.

Figure 16:
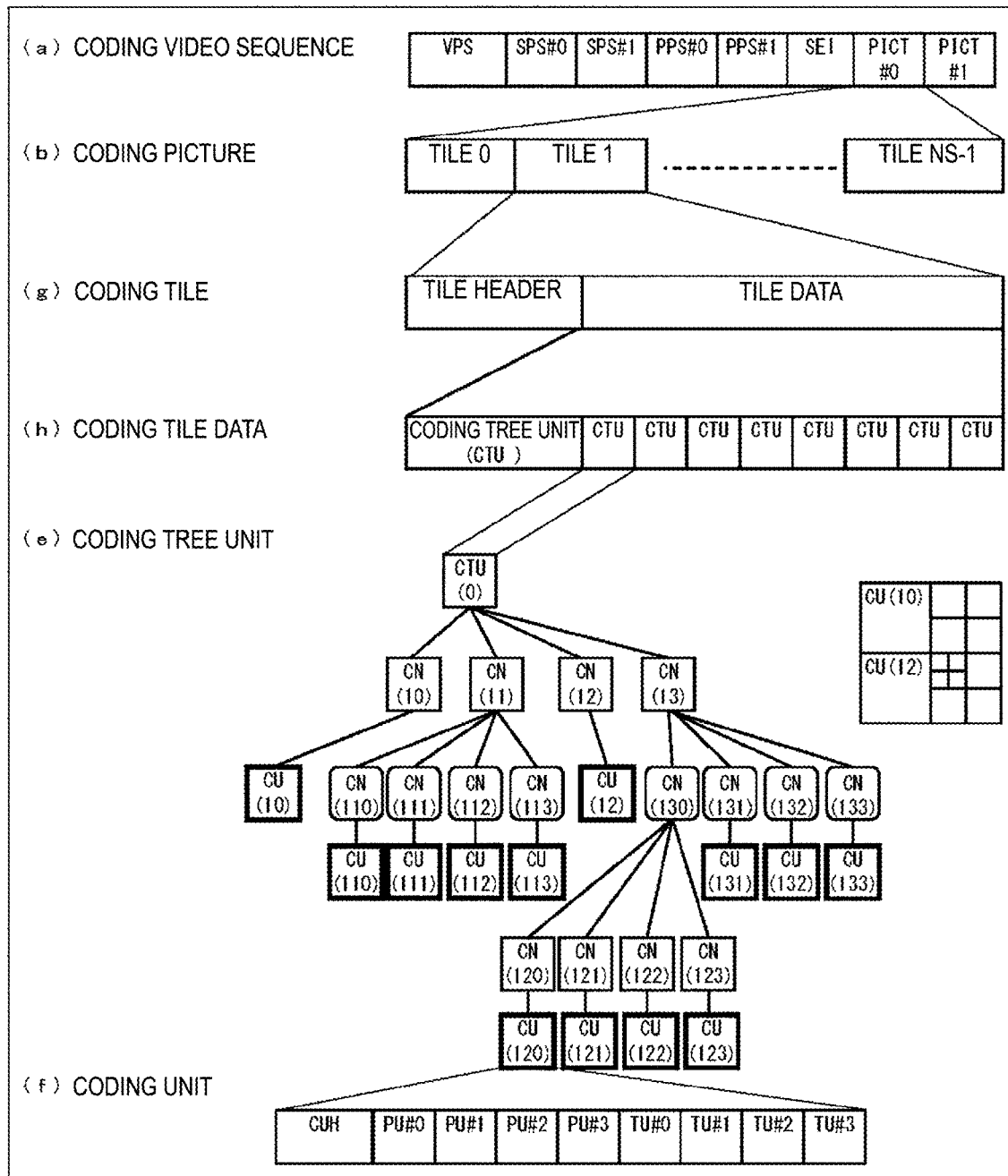
FIG. 16 is another diagram illustrating a hierarchy structure of data of a coding stream according to the present embodiment.

Also, the data structure of the coding stream Te may have a configuration in in FIG. 16 instead of that in FIG. 1. A difference between FIG. 16 and FIG. 1 is that the slices are replaced by tiles and the CTUs are included in tile data. Accordingly, (b) coding picture includes the tiles, the coding tile includes a tile header and (g) tile data, and (h) coding tile data includes the CTUs.

In the prediction tree, prediction parameters (a reference picture index, a motion vector, and the like) of each prediction unit (PU) are prescribed, the prediction unit being obtained by splitting the coding unit into one or multiple pieces. In another expression, the prediction unit is one or multiple non-overlapping regions constituting the coding unit. The prediction tree includes one or multiple prediction units obtained by the above-mentioned split. Note that, in the following, a unit of prediction where the prediction unit is further split is referred to as a "sub-block". The sub-block includes multiple pixels. In a case that the sizes of the prediction unit and the sub-block are the same, there is one sub-block in the prediction unit. In a case that the prediction unit is larger than the size of the sub-block, the prediction unit is split into sub-blocks. For example, in a case that the prediction unit is 8×8, and the sub-block is 4×4, the prediction unit is split into four sub-blocks formed by horizontal split into two and vertical split into two.

The prediction processing may be performed for each of these prediction units (sub-blocks).

Types of prediction for the prediction tree are roughly classified into two for a case of the intra prediction and a case of the inter prediction. The intra prediction is a prediction in an identical picture, and the inter prediction refers to a prediction processing performed between mutually different pictures (for example, between display times, and between layer images).

In a case of an intra prediction, the split method has 2N×2N (the same size as the coding unit) and N×N.

In a case of an inter prediction, the split method includes coding by a PU split mode (part_mode) of the coded data, and includes 2N×2N (the same size as the coding unit), 2N×N, 2N×nU, 2N×nD, N×2N, nL×2N, nR×2N<N×N, and the like. Expressions of 2N×N and N×2N represent a 1:1 symmetric partition, and expressions of 2N×nU and 2N×nD, and nL×2N and nR×2N represent a 1:3 asymmetric partition and a 3:1 asymmetric partition, respectively. The PUs included in the CU are expressed as PU0, PU1, PU2, and PU3 sequentially.

Figure 2:
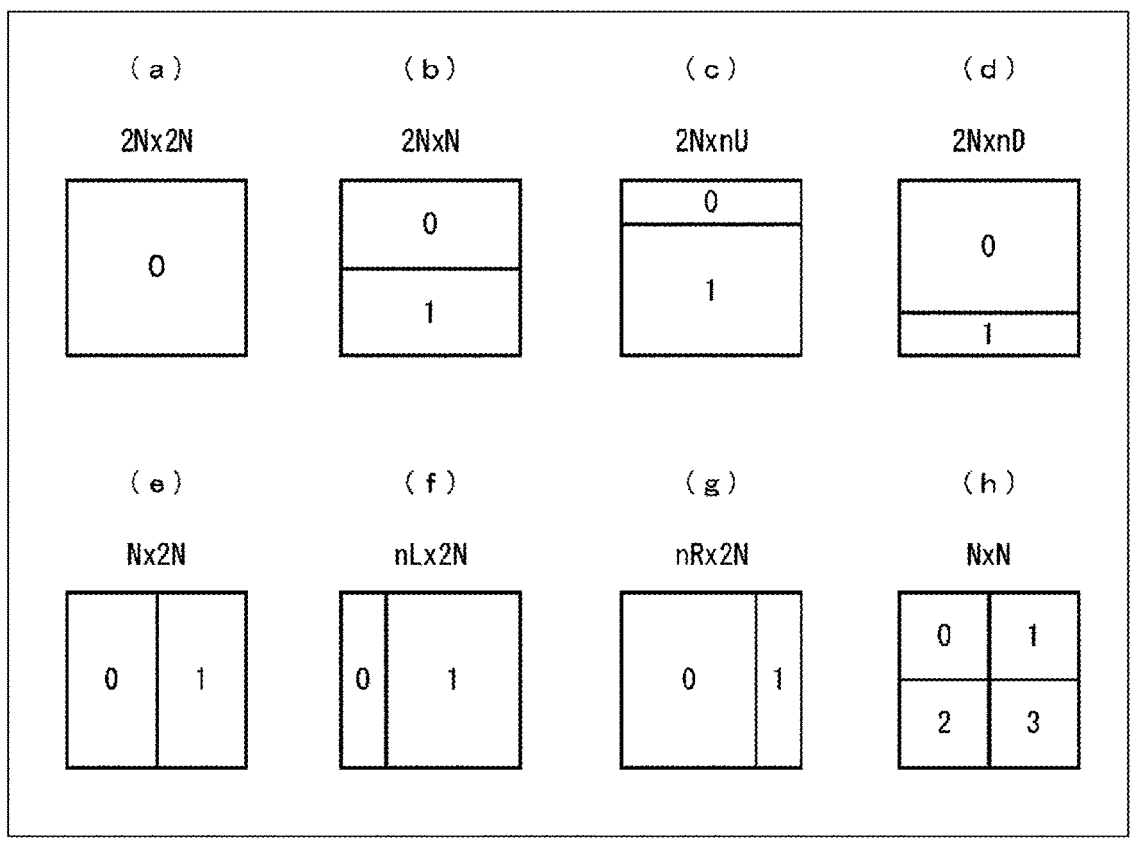
FIG. 2 is a diagram illustrating patterns of PU split modes. (a) to (h) of FIG. 2 illustrate partition shapes in cases that PU split modes are 2N×2N, 2N×N, 2N×nU, 2N×nD, N×2N, nL×2N, nR×2N, and N×N, respectively.

(a) to (h) of FIG. 2 illustrate shapes of partitions in respective PU split modes (positions of boundaries of PU split) specifically. (a) of FIG. 2 illustrates a partition of 2N×2N, and (b), (c), and (d) of FIG. 2 illustrate partitions (horizontally long partitions) of 2N×N, 2N×nU, and 2N×nD, respectively. (e), (f), and (g) of FIG. 2 illustrate partitions (vertically long partitions) in cases of N×2N, nL×2N, and nR×2N, respectively, and (h) of FIG. 2 illustrates a partition of N×N. Note that horizontally long partitions and vertically long partitions are collectively referred to as rectangular partitions, and 2N×2N and N×N are collectively referred to as square partitions.

In the transform tree, the coding unit is split into one or multiple transform units, and a position and size of each transform unit are prescribed. In another expression, the transform unit is one or multiple non-overlapping regions constituting the coding unit. The transform tree includes one or multiple transform units obtained by the above-mentioned split.

Splits in the transform tree include those to allocate a region that is the same size as the coding unit as a transform unit, and those by recursive quad tree splits similar to the above-mentioned split of CUs.

A transform processing is performed for each of these transform units.

Prediction Parameter

A prediction image of Prediction Units (PUs) is derived by prediction parameters attached to the PUs. The prediction parameter includes a prediction parameter of an intra prediction or a prediction parameter of an inter prediction. The prediction parameter of an inter prediction (inter prediction parameters) will be described below. The inter prediction parameter is constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real devices and methods.

Examples of an syntax element for deriving the inter prediction parameter included in the coded data include a PU split mode part_mode, a merge flag merge_flag, a merge index merge_idx, an inter prediction indicator inter_pred_idc, a reference picture index ref_idx_lX (refIdxLX), a prediction vector index mvp_lX_idx, and a difference vector mvdLX, for example.

Reference Picture List

Figure 3:
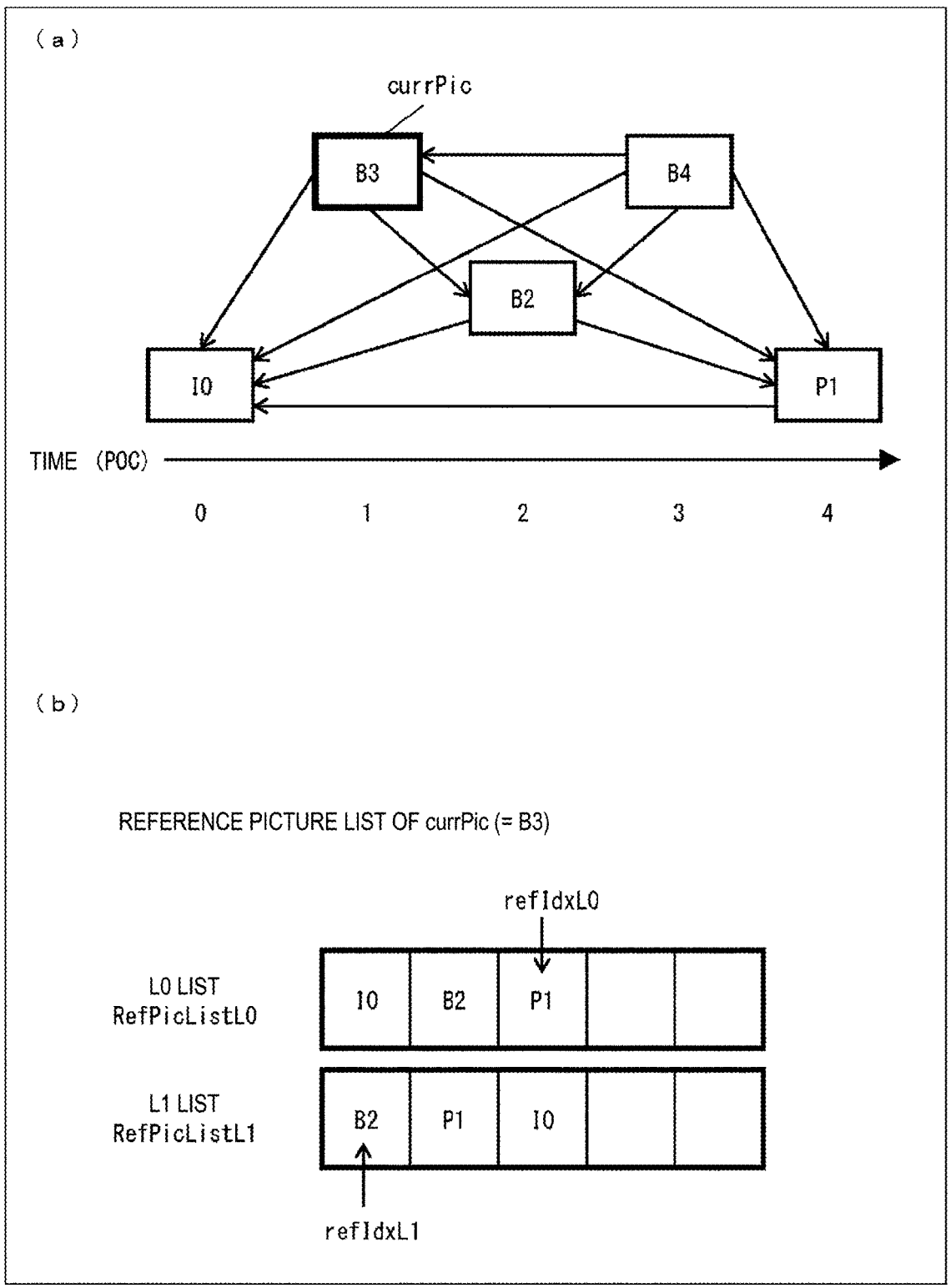
FIG. 3 is a conceptual diagram illustrating an example of reference pictures and reference picture lists.

A reference picture list is a list constituted by reference pictures stored in a reference picture memory 306. FIG. 3 is a conceptual diagram illustrating an example of reference pictures and reference picture lists. In FIG. 3(a), a rectangle represents a picture, an arrow represents a picture reference relationship, an abscissa represents time, characters "I", "P", and "B" in the rectangles represent an intra picture, a uni-prediction picture, and a bi-prediction picture, respectively, and a numeral in the rectangle represents a decoding order. As illustrated, the decoding order of the pictures is I0, P1, B2, B3, and B4, and the display order is I0, B3, B2, B4, and P1. FIG. 3(b) illustrates an example of the reference picture lists. The reference picture list is a list to represent a candidate of a reference picture, and one picture (slice) may include one or more reference picture lists. In the illustrated example, a target picture B3 includes two reference picture lists, i.e., a L0 list RefPicList0 and a L1 list RefPicList1. In a case that a target picture is B3, the reference pictures are I0, P1, and B2, the reference picture includes these pictures as elements. In each prediction unit, which picture in the reference picture list RefPicListX (X=0 or 1) is referred to is indicated by a reference picture index refIdxLX. The diagram indicates an example where reference pictures P1 and B2 are referred to by refIdxL0 and refIdxL1. Note that "LX" is a description method used in a case that L0 prediction and L1 prediction are not distinguished from each other, and parameters for the L0 list and parameters for the L1 list are distinguished by replacing "LX" with "L0" and "L1" in the following description.

Merge Prediction and AMVP Prediction

Decoding (coding) methods of prediction parameters include a merge prediction (merge) mode and an Adaptive Motion Vector Prediction (AMVP) mode, and merge flag merge_flag is a flag to identify these. The merge mode is a mode in which a prediction list utilization flag predFlagLX (or inter prediction indicator inter_pred_idc), a reference picture index refIdxLX, and a motion vector mvLX are not included in the coded data, but is derived from prediction parameters for a neighboring PU already processed. The AMVP mode is a mode in which the inter prediction indicator inter_pred_idc, the reference picture index refIdxLX, and the motion vector mvLX are included in the coded data. Note that the motion vector mvLX is coded as a prediction vector index mvp_lX_idx identifying the prediction vector mvpLX and as a difference vector mvdLX.

The inter prediction indicator inter_pred_idc is a value indicating types and the number of reference pictures, and takes any value of PRED_L0, PRED_L1, and PRED_BI. PRED_L0 and PRED_L1 indicate to use reference pictures managed in the reference picture list of the L0 list and the L1 list respectively, and indicate to use one reference picture (uni-prediction). PRED_BI indicates to use two reference pictures (bi-prediction BiPred), and use reference pictures managed in the L0 list and the L1 list. The prediction vector index mvp_lX_idx is an index indicating a prediction vector, and the reference picture index refIdxLX is an index indicating reference pictures managed in a reference picture list.

The merge index merge_idx is an index to indicate which prediction parameter to use as a prediction parameter of a decoding target PU among prediction parameter candidates (merge candidates) derived from PUs for which the processing is completed.

Motion Vector

The motion vector mvLX indicates a displacement (shift) between the blocks on two different pictures. A prediction vector and a difference vector related to the motion vector mvLX is referred to as a prediction vector mvpLX and a difference vector mvdLX respectively.

Inter Prediction Indicator inter_pred_idc and Prediction List Utilization Flag predFlagLX A relationship between an inter prediction indicator inter_pred_idc and prediction list utilization flags predFlagL0 and predFlagL1 are as follows, and those can be converted mutually.

inter_pred_idc=(predFlag*L*1<<1)+predFlag*L*0 predFlag*L*0=inter_pred_idc & 1 predFlag*L*1=inter_pred_idc>>1

Note that an inter prediction parameter may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.
Determination of Bi-Prediction biPred A flag biPred of whether or not a bi-prediction BiPred can be derived from whether or not two prediction list utilization flags are both 1. For example, the flag can be derived by the following expression.

biPred=(predFlag*L*0==1&& predFlag*L*1==1)

The flag biPred can be also derived from whether an inter prediction indicator is a value indicating to use two prediction lists (reference pictures). For example, the flag can be derived by the following expression.

biPred=(inter_pred_idc==PRED_BI)?1:0

The above expression can be also expressed by the following expression.

biPred=(inter_pred_idc==PRED_BI)

Note that, for example, PRED_BI can use the value of 3.
Intra Prediction

Next, an intra prediction parameter will be described.

The intra prediction parameter is a parameter used for processing to predict a CU with information in a picture, for example, an intra prediction mode IntraPredMode, and a luminance intra prediction mode IntraPredModeY and a chrominance intra prediction mode IntraPredModeC may be different from each other. There are 67 types of intra prediction modes, for example, and are composed of planar prediction, DC prediction, Angular (direction) prediction. For the chrominance prediction mode IntraPredModeC, any of a planar prediction, a DC prediction, an Angular prediction, a direct mode (mode in which a prediction mode for luminance is used), and LM prediction (a mode for performing linear prediction, based on the luminance pixel) is used.

The luminance intra prediction mode IntraPredModeY is derived using a Most Probable Mode (MPM) candidate list including intra prediction modes estimated to have a high probability of being applied to a target block in one case, and is derived from REM that is a prediction mode not included in the MPM candidate list in the other case. Which method is to be used is signaled with a flag prev_intra_luma_pred_flag, and in the former case, the MPM candidate list derived from an index mpm_idx and an intra prediction mode of a neighboring block is used to derive IntraPredModeY. In the latter case, a flag rem_selected_mode_flag, and modes rem_selected_mode and rem_non_selected_mode are used to derive the intra prediction mode.

The chrominance intra prediction mode IntraPredModeC is derived using a flag not_lm_chroma_flag indicating whether or not to use the LM prediction in a case, is derived using a flag not_dm_chroma_flag indicating whether or not to use the direct mode in a case, or is derived using an index chroma_intra_mode_idx directly specifying the intra prediction mode applied to a chrominance pixel in a case.

Loop Filter

A loop filter is a filter provided in a coding loop to remove a block distortion and a ringing distortion and improve an image quality. The loop filter mainly includes a deblocking filter, a Sample Adaptive Offset (SAO), and an Adaptive Loop Filter (ALF).

In a case that a difference in pre-deblock pixel values of pixels of the luminance component neighboring each other through the block boundary is less than a predetermined threshold value, the deblocking filter performs deblocking on the pixels of the luminance and the chrominance component with respect to the block boundary to smooth the image in the vicinity of the block boundary.

The SAO is a filter that is applied after the deblocking filtering, and has the effect of removing a ringing distortion and a quantization distortion. The SAO, which is a process in units of CTU, is a filter that classifies pixel values into several categories to add or subtract offsets in units of pixel for each category. Edge offset (EO) processing of the SAO determines an offset value that is added to the pixel value in accordance with a size relationship between the target pixel and the neighboring pixel (reference pixel).

The ALF subjects a ALF-unperformed decoded image to an adaptive filtering process using an ALF parameter (filter coefficient) ALFP that is decoded from the coding stream Te to generate a ALF-performed decoded image.

Figure 17:
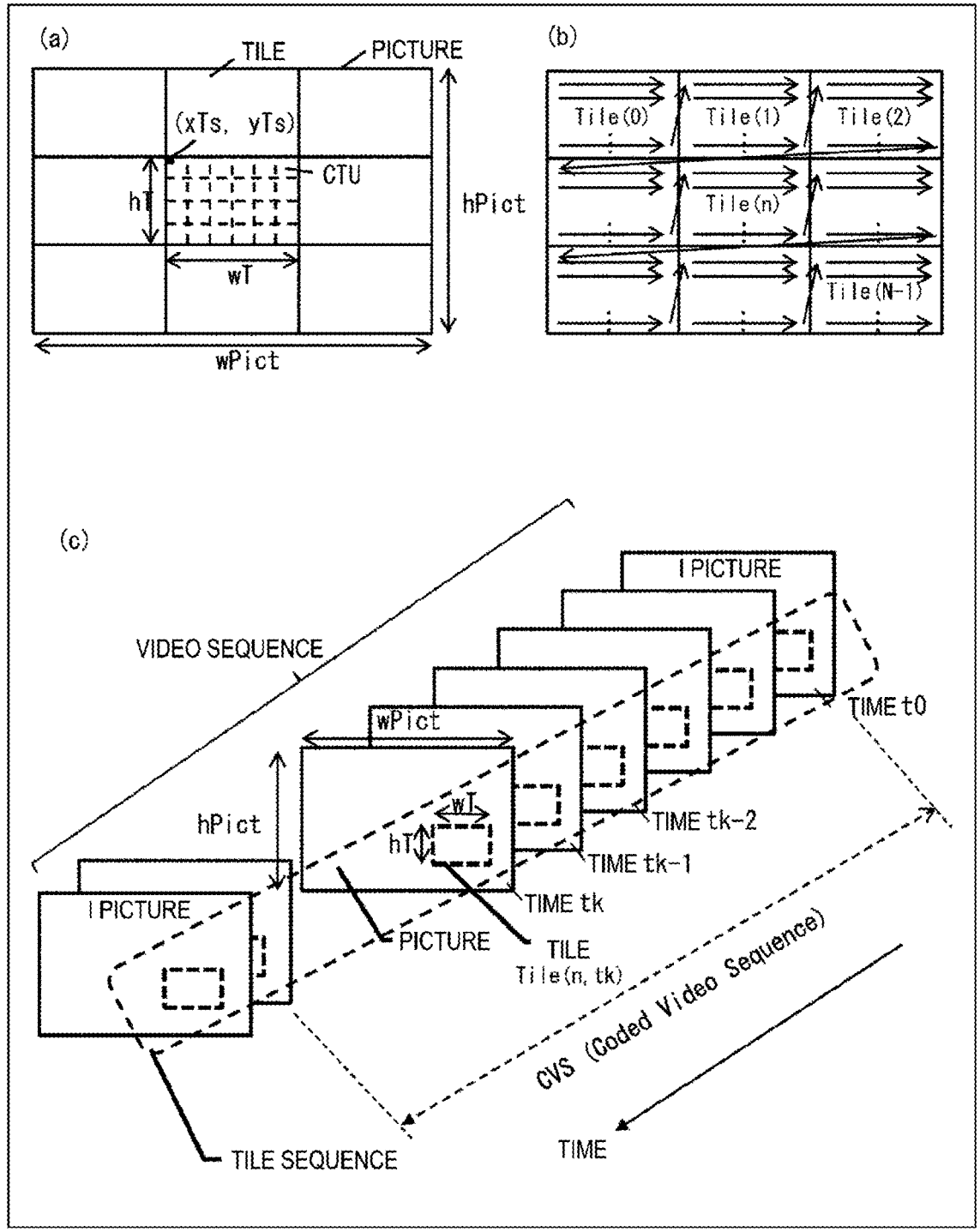
FIG. 17 is a diagram illustrating tiles.

The filter coefficient is signaled immediately after the slice header and stored in a memory. In a slice or picture for which the subsequent inter prediction is used, other than signaling the filter coefficients themselves, filter coefficients that have been signaled in the past and stored in the memory are indicated by indexes without signaling the filter coefficients themselves to reduce a bit amount required to code the filter coefficients. However, in order to independently decode each tile described later, the ALF may signal and store the filter coefficients in units of tile and use the filter coefficients indicated by the indexes to subject subsequent tiles having the same TileId to the adaptive filtering process.
Entropy Coding Entropy coding includes a method of variable-length coding a syntax using a context (probability model) that is adaptively selected depending on the type of syntax or the surrounding situation, and a method of variable-length coding a syntax using a predetermined table or calculation formula. In the former Context Adaptive Binary Arithmetic Coding (CABAC), the probability model updated for each coded or decoding picture is stored in the memory. Then, in the P picture or B picture for which the subsequent inter prediction is used, as an initial state of the context of the target picture, a probability model of the picture using the same slice type and the same slice level quantization parameter is selected among the probability models stored in the memory and is used for coding and decoding processes. To independently decode each tile, the probability model is stored in the memory in units of tile. Then, as the initial state of the context in a subsequent tile having the same TileId, the probability model of the already decoded tile used for coding or decoding the same slice type and the same slice level quantization parameters may be selected.
Tile FIG. 17(*a*) is a diagram illustrating an example of splitting a picture into N tiles (solid rectangles, the figure illustrates an example of N=9). The tile is further split into multiple CTUs (broken line rectangles). Assume that upper left coordinates of the center tile in FIG. 17(*a*) are (xTs, yTs), a width is wT, and a height is hT. Assume that a width of the picture is wPict and a height is hPict. Note that information regarding the number and size of split tiles is referred to as tile information, and details thereof are described below.

FIG. 17(b) is a diagram illustrating a coding and decoding order of CTUs in a case that the picture is split into the tiles. A number assigned to each tile is the TileId (the identifier of the tile in the picture), the numbers are assigned in raster scan order from a top left to a bottom right to the tiles in the picture, and the tiles are processed in the order based on the TileId. In other words, the tiles are coded and decoded in ascending order of the TileId. The CTUs are processed in raster scan order from a top left to a bottom right in each tile, and after the process in one tile ends, CTUs in the next tile are processed.

FIG. 17(c) is a diagram illustrating tiles continuous in a time direction. As illustrated in FIG. 17(c), a video sequence is composed of multiple pictures continuous in the time direction. A tile sequence is composed of one or more tiles of time continuous in the time direction. Note that a Coded Video Sequence (CVS) in the figure is a group of pictures from an intra picture to a picture immediately before the next intra picture in decoding order.

FIG. 18 is an example of syntax for tile information and the like, and is described below in the order of FIGS. 18(b), 18(d), 18(a), and 18(c).

The tile information includes, for example, num_tile_columns_minus1, num_tile_rows_minus1, uniform_spacing_flag, column_width_minus1[i], and row_height_minus1[i], as illustrated in FIG. 18(b), and is signaled with the PPS, for example. Here, num_tile_columns_minus1 and num_tile_rows_minus1 represent values obtained by subtracting 1 from the numbers of tiles in the picture in the horizontal and vertical directions, respectively. uniform_spacing_flag is a flag indicating whether or not a picture is evenly split into tiles. In a case that a value of uniform_spacing_flag is 1, the widths of the respective tiles in the picture are configured to be identical and the heights of those tiles are configured to be identical, and the width and the height can be derived from the numbers of tiles in the picture in the horizontal and vertical directions, respectively.

$$wT = wPict/(num\_tile\_columns\_minus1+1)$$

$$hT = hPict/(num\_tile\_rows\_minus1+1)$$

In a case that the value of uniform_spacing_flag is 0, the widths of the respective tiles in the picture may not be configured to be identical and the height of those tiles may not be configured to be identical, and the width column_width_minus1[i] (wT in FIG. 17) and the height row_height_minus1[i] (hT in FIG. 17) of each tile are coded for each tile.

Tile Boundary Restriction

Since the tile information is signaled with the PPS, the tile position and size can be changed for each picture. On the other hand, in a case that the tile sequence is independently decoded, that is, the tiles having the same TileId can be decoded without referring to information of a tile having different TileId, the tile position and size may not be changed for each picture. That is, in a case that each tile refers to a picture (reference picture) of a different time, the identical tile splitting may be applied in all the pictures in the CVS. In this case, the tiles having the same TileID are configured to have the same upper left coordinates, the same width, and the same height throughout all the pictures in the CVS.

Signaled is that the tile information does not change throughout the CVS, by setting a value of tiles_fixed_structure_flag in vui_parameters( ) illustrated in FIG. 18(d) to 1.

That is, in a case that the value of tiles_fixed_structure_flag is 1, values of num_tile_columns_minus1, num_tile_rows_minus1, uniform_spacing_flag, column_width_minus1[i], row_height_minus1[i], and loop_filter_across_tiles_enabled_flag (on-off of the loop filter at the tile boundary) that are signaled with the PPS may be unique throughout the CVS. In the case that the value of tiles_fixed_structure_flag is 1, the tiles having the same TileId are not changed in the tile position on the picture (the upper left coordinates, width, and height of the tile) in the CVS even in a picture at a different time (Picture Order Count (POC)). In the case that the value of tiles_fixed_structure_flag is 0, the tile sequence may vary in size by time.

FIG. 18(a) is a syntax table that is a portion excerpted from the sequence parameter set SPS. An independent tile flag independent_tile_flag is a flag indicating whether or not the tile sequence can be independently coded and decoded also in the time direction in addition to a spatial direction. In a case that a value of independent_tile_flag is 1, it is meant that the tile sequence can be independently coded and decoded. In this case, the following constraints may be imposed on tile coding and decoding and the syntax of the coded data.

(Constraint 1) In the CVS, the tile does not refer to the information of the tile having different TileId.

(Constraint 2) The numbers of tiles signaled with the PPS in the horizontal and vertical directions in the picture, the widths of the tiles, and the heights of the tiles are identical throughout the CVS. The tiles having the same TileId are not changed in the tile position on the picture (the upper left coordinates, width, and height of the tile) in the CVS even in a picture at a different time (POC). The value of tiles_fixed_structure_flag in vui_parameters( ) is set to 1.

The above (Constraint 1) "the tile does not refer to the information of the tile having different TileId" is described in detail.

Figure 19:
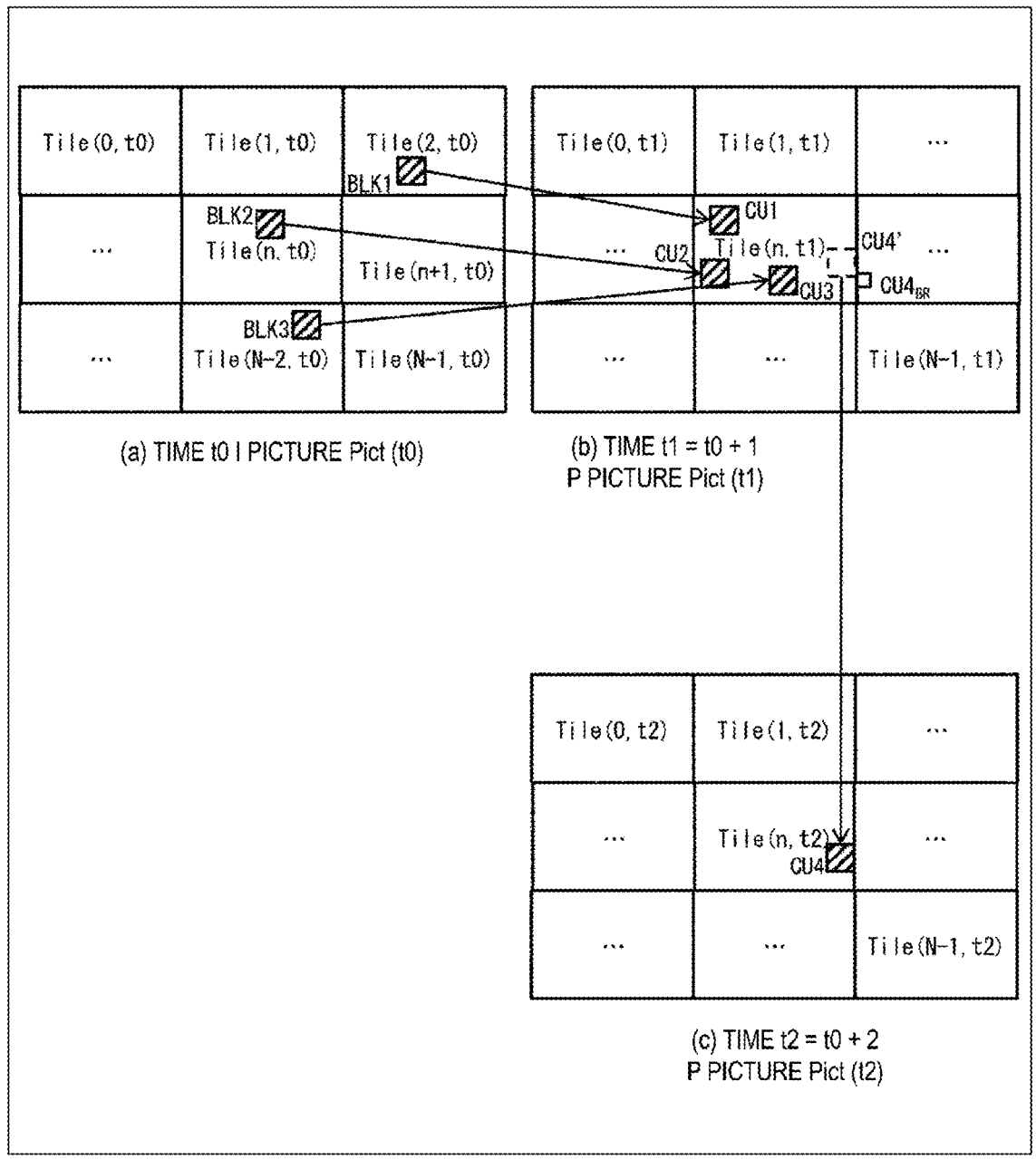
FIG. 19 is a diagram illustrating reference of tiles in a time direction.

FIG. 19 is a diagram illustrating the reference to tiles in the time direction (between different pictures). FIG. 19(a) is an example of splitting an intra picture Pict(t0) at a time t0 into N tiles. FIG. 19(b) is an example of splitting an inter picture Pict(t1) at time t1=t0+1 into N tiles. Pict(t1) refers to Pict(t0). FIG. 19(c) is an example of splitting an inter picture Pict(t2) at a time t2=t0+2 into N tiles. Pict(t2) refers to Pict(t1). In the figure, Tile (n, t) represents a tile having the TileId=n (n=0 . . . N−1) at the time t. In accordance with the above (constraint 2), at any time, the upper left coordinates of the tile having the TileId=n, the width of that tile, and the height of that tile are identical.

In FIG. 19(b), CU1, CU2, and CU3 in a tile Tile (n, t1) refer to blocks BLK1, BLK2, and BLK3 in FIG. 19(a). In this case, BLK1 and BLK3 are blocks contained in tiles outside of a tile Tile (n, t0), and in order to refer to BLK1 and BLK3, not only Tile (n, t0) but also entire Pict(t0) needs to be decoded at the time t0. That is, the tile Tile (n, t1) cannot be decoded by simply decoding the tile sequence corresponding to TileId=n at the times t0 and t1, and a tile sequence of TileId other than TileId=n also needs to be decoded in addition to the tile sequence of TileId=n. Thus, in order to independently decode the tile sequence, reference pixels in the reference pictures that are referred by a motion compensation image for the CU in the tile need to be included in collocated tiles (tiles at identical positions on the reference pictures).

In FIG. 19(c), CU4 neighboring a right end boundary of a tile Tile (n, t2) refers to, as a prediction vector candidate in the time direction, a block CU4BR on the lower right of CU4' in the picture at the time t1 illustrated in FIG. 19(b), and a motion vector of CU4BR is stored as a prediction vector candidate in a prediction vector candidate list (merge candidate list). However, CU4BR is located outside of the collocated tile at CU on the right end of the tile, and Tile (n, t1) as well as at least Tile (n+1, t1) need to be decoded at the time t1 in order to refer to CU4BR. That is, the tile Tile (n, t2) cannot be decoded by simply decoding the tile sequence of TileId=n. This similarly applies to blocks that are neighboring a lower end boundary of the tile. Thus, in order to independently decode the tile sequence, a block on the reference picture that is referred to as the prediction vector candidate in the time direction needs to be included in the collocated tile. A specific implementation method for the above-described constraints is described in the following description for an image decoding device and an image encoding device.

In the case that the value of independent_tile_flag is 0, it is meant that the tile sequence may not necessarily be able to be decoded independently.

Configuration of Image Decoding Device

Figure 20:
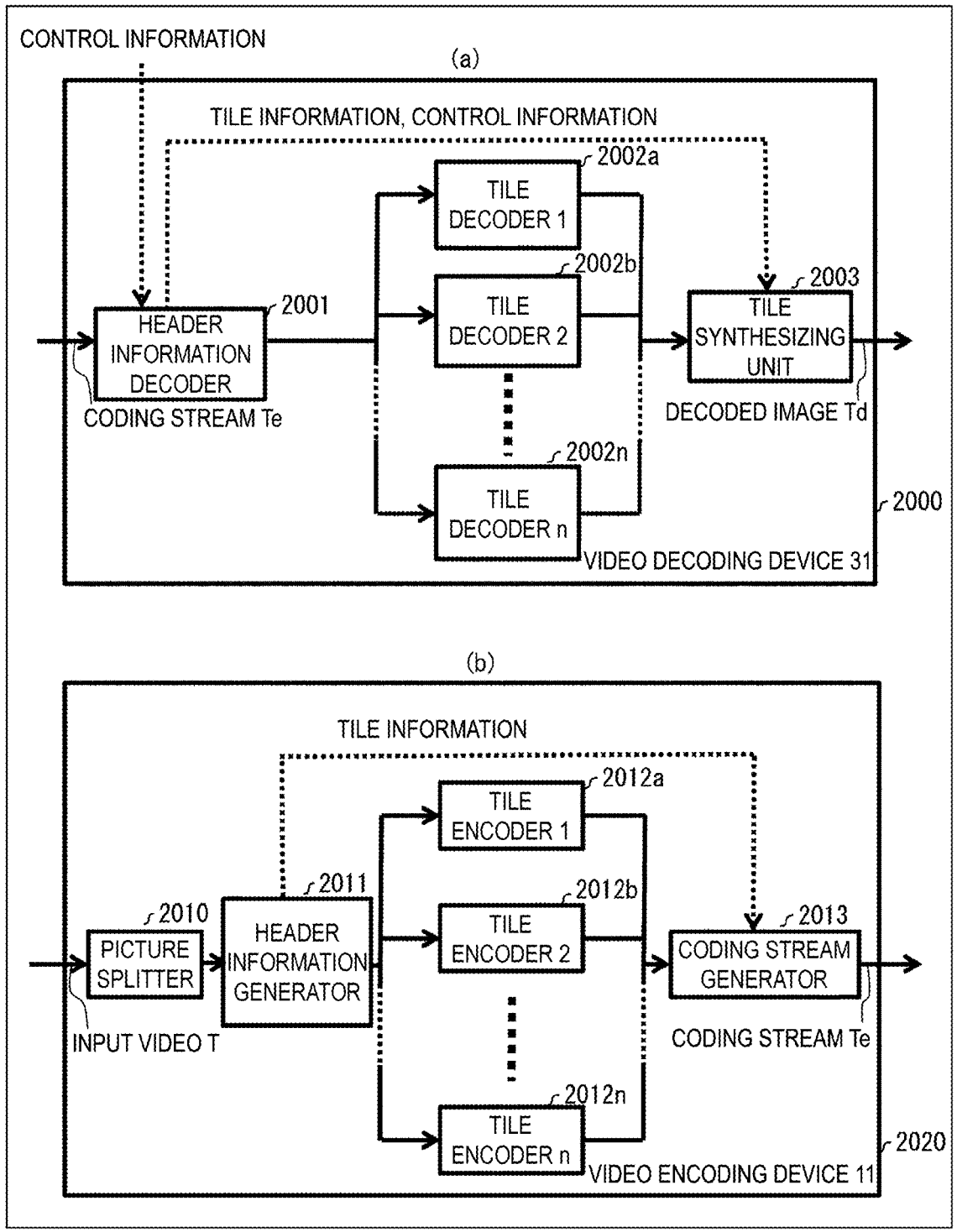
FIG. 20 is a block diagram illustrating a configuration of a video encoding device and a video decoding device according to the present invention.

FIG. 20(a) illustrates an image decoding device (video decoding device) 2000 according to the present invention. The image decoding device 2000 includes a header information decoder 2001, tile decoders 2002a to 2002n, and a tile synthesis unit 2003.

The header information decoder 2001 decodes the coding stream Te input from the outside and coded in units of network abstraction layer (NAL). The header information decoder 2001 derives the tile (TileId) required for display from control information indicating an image area to be displayed on the display or the like input from the outside. The header information decoder 2001 extracts the coding tiles required for display from the coding stream Te and transmits the extracted coding tiles to the tile decoders 2002a to 2002n. Furthermore, the header information decoder 2001 transmits the tile information obtained by decoding the PPS (information regarding tile split) and the TileId of the tile to be decoded to tile synthesis unit 2003.

The tile decoders 2002a to 2002n decode the respective coded tiles and transmit the decoded tiles to the tile synthesis unit 2003.

Here, each of the tile decoders 2002a to 2002n performs the decoding process on the tile sequence treating as one independent video sequence, and thus, does not temporally or spatially refer to the prediction information between the tile sequences in a case of performing the decoding process. That is, each of the tile decoders 2002a to 2002n, in decoding a tile in a picture, does not refer to tiles of other tile sequences (having different TileId).

Since the tile decoders 2002a to 2002n individually decode the tiles, it is possible to perform the decoding process on multiple tiles in parallel as well as independently decode only one tile. As a result, by use of the tile decoders 2002a to 2002n, the decoding process can be efficiently performed, such as that an image required for display can be decoded by performing only the minimum necessary decoding process.

The tile synthesis unit 2003 refers to the tile information transmitted from the header information decoder 2001 and the TileId of the tile to be decoded, and the tiles decoded by the tile decoders 2002a to 2002n, to generate and output the decoded image Td required for display.

Configuration of Tile Decoder

Figure 5:
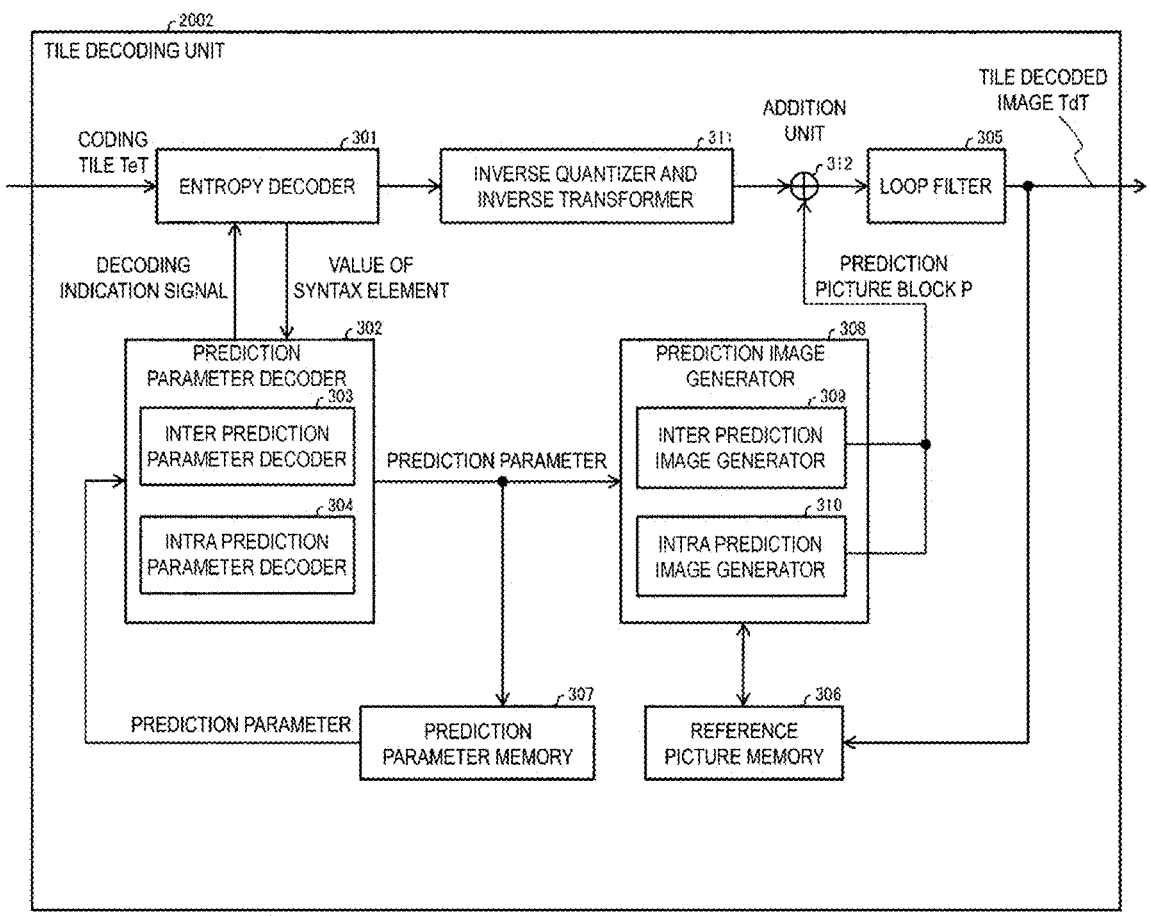
FIG. 5 is a diagram illustrating a configuration of a tile decoder according to the present embodiment.

A configuration of the tile decoders 2002a to 2002n will be described. A configuration of the tile decoder 2002a as an example will be described below with reference to FIG. 5. FIG. 5 is a block diagram illustrating a configuration of 2002, which is one of the tile decoders 2002a to 2002n. The tile decoder 2002 includes an entropy decoder 301, a prediction parameter decoder (prediction image decoding device) 302, a loop filter 305, a reference picture memory 306, a prediction parameter memory 307, a prediction image generator (prediction image generation device) 308, an inverse quantization and inverse transform processing unit 311, and an addition unit 312. Note that there may be a configuration in which the tile decoder 2002 does not include the loop filter 305 in association with a tile encoder 2012 described later.

The prediction parameter decoder 302 includes an inter prediction parameter decoder 303 and an intra prediction parameter decoder 304. The prediction image generator 308 includes an inter prediction image generator 309 and an intra prediction image generator 310.

In addition, examples in which the CTU, the CU, the PU, and the TU are used as the units for processing are described below, but the present invention is not limited to this example, and the process may be performed in units of CU instead of in units of TU or PU. Alternatively, the CTU, the CU, the PU, and the TU may be interpreted as the block, and the process may be interpreted as the process in units of block.

The entropy decoder 301 performs entropy decoding on the coding stream Te input from the outside, and separates and decodes individual codes (syntax elements). Examples of the separated codes include the prediction parameters for generating the prediction image and residual information for generating a difference image.

The entropy decoder 301 outputs a part of the separated codes to the prediction parameter decoder 302. Examples of a part of the separated codes include a prediction mode predMode, a PU split mode part_mode, a merge flag merge_flag, a merge index merge_idx, an inter prediction indicator inter_pred_idc, a reference picture index ref_idx_lX, a prediction vector index mvp_lX_idx, and a difference vector mvdLX. The control of which code to decode is performed based on an indication of the prediction parameter decoder 302. The entropy decoder 301 outputs quantized transform coefficients to the inverse quantization and inverse transform processing unit 311. These quantized transform coefficients are coefficients obtained through quantization by performing, on the residual signal, frequency conversion such as Discrete Cosine Transform (DCT), Discrete Sine Transform (DST), and Karyhnen Loeve Transform (KLT) in coding processing.

The inter prediction parameter decoder 303 decodes an inter prediction parameter with reference to a prediction parameter stored in the prediction parameter memory 307, based on a code input from the entropy decoder 301. The inter prediction parameter decoder 303 outputs the decoded inter prediction parameter to the prediction image generator 308, and also stores the decoded inter prediction parameter in the prediction parameter memory 307. Details of the inter prediction parameter decoder 303 will be described later.

The intra prediction parameter decoder 304 decodes an intra prediction parameter with reference to a prediction parameter stored in the prediction parameter memory 307, based on a code input from the entropy decoder 301. The intra prediction parameter is a parameter used in a processing to predict a CU in one picture, for example, an intra prediction mode IntraPredMode. The intra prediction parameter decoder 304 outputs a decoded intra prediction parameter to the prediction image generator 308, and also stores the decoded intra prediction parameter in the prediction parameter memory 307.

Figure 37:
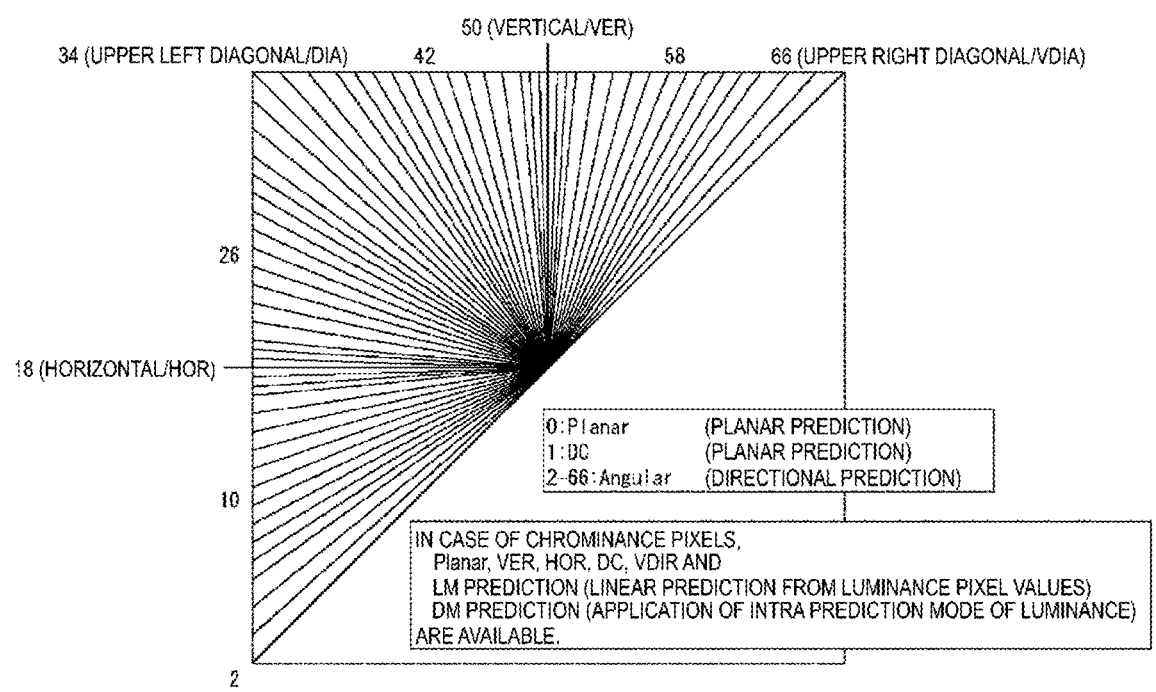
FIG. 37 is a diagram illustrating an intra prediction mode.

The intra prediction parameter decoder 304 may derive different intra prediction modes depending on luminance and chrominance. In this case, the intra prediction parameter decoder 304 decodes a luminance prediction mode IntraPredModeY as a prediction parameter of luminance, and decodes a chrominance prediction mode IntraPredModeC as a prediction parameter of chrominance. The luminance prediction mode IntraPredModeY has 67 modes, which correspond to the planar prediction (0), the DC prediction (1), and the Angular (directional) predictions (2 to 66). The chrominance prediction mode IntraPredModeC uses any of the planar prediction (0), the DC prediction (1), the Angular (directional) predictions (2 to 66), and the LM predictions (67 to 72). The intra prediction parameter decoder 304 decodes a flag indicating whether or not the chrominance prediction is a LM prediction, and in a case that the flag indicates a LM prediction, the intra prediction parameter decoder 304 decodes information regarding the LM prediction (information indicating whether or not it is a CCLM prediction, information specifying a down-sampling method). Here, the LM prediction will be described. The LM prediction is a prediction scheme using a correlation between a luminance component and a color component, in which a prediction image of the chrominance image (Cb, Cr) is generated using a linear model based on the decoded luminance image. The LM prediction includes a Cross-Component Linear Model prediction (CCLM prediction) and a Multiple Model ccLM (MMLM) prediction. The CCLM prediction is a prediction scheme using one linear model for predicting a chrominance from a luminance for one block. The MMLM prediction is a prediction scheme using two or more linear models for predicting a chrominance from a luminance for one block. In a case that a chrominance format is 4:2:0, the luminance image is down-sampled to have a size the same as that of the chrominance image in order to create a linear model. This down-sampling method includes a method using a fixed sampling filter (default sampling filter) and a method of adaptively switching four sampling filters (additional sampling filters). Therefore, decoded as information specifying the downsampling method are information specifying whether the LM prediction is a CCLM prediction or a MMLM prediction, an index specifying whether or not the sampling filter is a default sampling filter, and the sampling filter in a case of using the additional sampling filter. In a case that the flag indicates that a prediction is different from the LM prediction, decoded as IntraPredModeC are the planar prediction (0), the DC prediction (1), the Angular predictions (2 to 66), and the DM prediction (chrominance prediction using the same prediction mode as the luminance prediction mode). FIG. 37 is a diagram illustrating an intra prediction mode. Directions of straight lines corresponding to 2 to 66 in FIG. 37 represent the prediction directions, and more accurately indicate directions of pixels on a reference region R (described later) to which prediction target pixels refer.

The loop filter 305 applies a filter such as a deblocking filter 313, a sample adaptive offset (SAO) 314, and an adaptive loop filter (ALF) 315 to a decoded image of the CU generated by the addition unit 312. Note that the loop filter 305 may not necessarily include the three types of filters as long as the loop filter 305 is paired with the tile encoder 2012, and may include only the deblocking filter 313, for example.

The reference picture memory 306 stores the decoded image of the CU generated by the addition unit 312 in a predefined location for each decoding target picture and CTU or CU.

The prediction parameter memory 307 stores a prediction parameter in a prescribed position for each picture and prediction unit (or a sub-block, a fixed size block, and a pixel) of a decoding target. Specifically, the prediction parameter memory 307 stores an inter prediction parameter decoded by the inter prediction parameter decoder 303, an intra prediction parameter decoded by the intra prediction parameter decoder 304 and a prediction mode predMode separated by the entropy decoder 301. For example, inter prediction parameters stored include a prediction list utilization flag predFlagLX (the inter prediction indicator inter_pred_idc), a reference picture index refIdxLX, and a motion vector mvLX.

To the prediction image generator 308, a prediction mode predMode input from the entropy decoder 301 is input, and a prediction parameter is input from the prediction parameter decoder 302. The prediction image generator 308 reads a reference picture from the reference picture memory 306. The prediction image generator 308 uses the input prediction parameters and the read out reference picture (reference picture block) to generate a prediction image of the PU (block) or sub-block in the prediction mode indicated by the prediction mode predMode.

Here, in a case that the prediction mode predMode indicates an inter prediction mode, the inter prediction image generator 309 uses the inter prediction parameter input from the inter prediction parameter decoder 303 and the read out reference picture (reference picture block) to generate the prediction image of the PU (block) or sub-block by the inter prediction.

For a reference picture list (an L0 list or an L1 list) where a prediction list utilization flag predFlagLX is 1, the inter prediction image generator 309 reads a reference picture block from the reference picture memory 306 in a position indicated by a motion vector mvLX, based on a decoding target PU from reference pictures indicated by the reference picture index refIdxLX. The inter prediction image generator 309 performs interpolation based on the read out reference picture block to generate the prediction image of the PU (interpolation image, motion compensation image). The inter prediction image generator 309 outputs the generated prediction image of the PU to the addition unit 312. Here, the reference picture block is a set of pixels on the reference picture (the reason to be called a block is because it generally has a rectangle shape), and is an area referred to in order to generate the prediction image of the PU or sub-block.

Tile Boundary Padding

The reference picture block (reference block) is a block that is at a position indicated by the motion vector mvLX with reference to a position of the target CU (block) on the reference picture indicated by the reference picture index refIdxLX with respect to the reference picture list of the prediction list utilization flag predFlagLX=1. As described above, there is no assurance that the pixels of the reference block are located within the tile (collocated tile) on the reference picture having the same TileId as the target tile. Therefore, as an example, the reference block can be read without referring to values of the pixels outside the collocated tile by padding the outside of each tile (compensating by the values of pixels on the tile boundary) in the reference picture, as illustrated in FIG. 21(a).

The tile boundary padding (padding outside tile) is achieved by using a pixel value refImg[xRef+i][yRef+j] at the following position xRef+i, yRef+j as a pixel value of a reference pixel position (xIntL+i, yIntL+j) in motion compensation by the motion compensation unit 3091 described below. That is, in referring to the reference pixel, the reference position is achieved by clipping at the positions of the boundary pixels on the top, bottom, left, and right of the tile.

$$x\text{Ref}+i=\text{Clip3}(xTs, xTs+wT-1, x\text{IntL}+i)$$

$$y\text{Ref}+j=\text{Clip3}(yTs, yTs+hT-1, y\text{IntL}+j) \quad \text{(Expression PAD-1)}$$

where, (xTs, yTs) is the upper left coordinates of the target tile in which the target block is located, and wT and hT are a width and height of the target tile.

Note that, xIntL and yIntL assuming that the upper left coordinates of the target block relative to the upper left coordinates of the picture are (xb, yb) and the motion vector is (mvLX[0], mvLX[1]) may be derived by $$x\text{IntL}=xb+(mvLX[0]>>\log 2(M))$$

$$y\text{IntL}=yb+(mvLX[1]>>\log 2(M)). \quad \text{(Expression PAD-2)}$$

where M indicates that an accuracy of the motion vector is 1/M pel.

Figure 21:
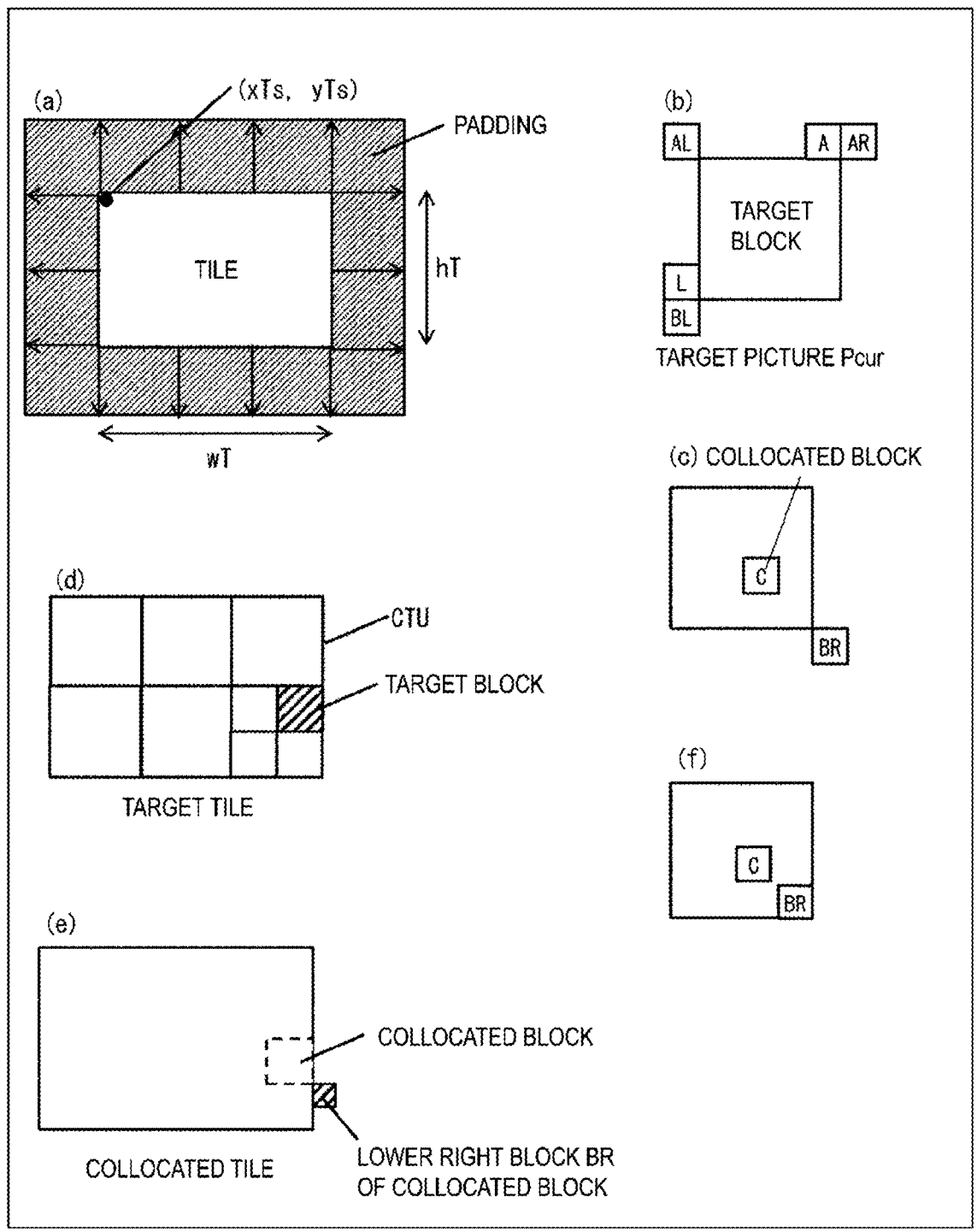
FIG. 21 is a diagram illustrating a positional relationship between a tile boundary, a target block, and a reference block.

By reading the pixel values of the coordinates (xRef+i, yRef+j), the padding in FIG. 21(*a*) can be achieved.

In the case of independent_tile_flag=1, by padding the tile boundary in this manner, the reference pixel is replaced by the pixel value in the collocated tile, even in a case that the motion vector points to the outside of the collocated tile in the inter prediction, and therefore, the tile sequence can be independently decoded by use of the inter prediction.

Tile Boundary Motion Vector Restriction

Other restriction methods of the tile boundary padding include tile boundary motion vector restriction. In this processing, in motion compensation by the motion compensation unit 3091 described later, the motion vector is restricted (clipped) so that the position (xIntL+i, yIntL+j) of the reference pixel is within the collocated tile.

In this processing, in a case that the upper left coordinates (xb, yb) of the target block (target sub-block or target block), the size (W, H) of the block, the upper left coordinates (xTs, yTs) of the target tile, and the width and height of the target tile being wT, hT, the motion vector mvLX of the block is input and the restricted motion vector mvLX is output.

A left end posL, a right end posR, an upper end posU, and a lower end posD of the reference pixel in the generation of the interpolation image of the target block are as below. Note that NTAP is the number of taps of the filter used for generating the interpolation image.

$$posL=xb+(mvLX[0]>>\log 2(M))-\text{NTAP}/2+1$$

$$posR=xb+W-1+(mvLX[0]>>\log 2(M))+\text{NTAP}/2$$

$$posU=yb+(mvLX[1]>>\log 2(M))-\text{NTAP}/2+1$$

$$posD=yb+H-1+(mvLX[1]>>\log 2(M))+\text{NTAP}/2 \quad \text{(Expression CLIP1)}$$

The restrictions for the reference pixels being within the collocated tile are as below.

$$posL>=xTs$$

$$posR<=xTs+wT-1$$

$$posU>=yTs$$

$$posD<=yTs+hT-1 \quad \text{(Expression CLIP2)}$$

The following deformation is possible.

$$posL=xb+(mvLX[0]>>\log 2(M))-\text{NTAP}/2+1>=xTs$$

$$(mvLX[0]>>\log 2(M))>=xTs-xb+\text{NTAP}/2-1$$

$$posR=xb+W-1+(mvLX[0]>>\log 2(M))+\text{NTAP}/2<=xTs+wT-1$$

$$(mvLX[0]>>\log 2(M))<=xTs+wT-1-xb-W+1-\text{NTAP}/2$$

$$posU=yb+(mvLX[1]>>\log 2(M))-\text{NTAP}/2+1>=yTs$$

$$(mvLX[0]>>\log 2(M))>=yTs-yb+\text{NTAP}/2-1$$

$$posD=yb+H-1+(mvLX[1]>>\log 2(M))+\text{NTAP}/2<=yTs+hT-1$$

$$(mvLX[1]>>\log 2(M))<=yTs+hT-1-yb-H+1-\text{NTAP}/2 \quad \text{(Expression CLIP3)}$$

Accordingly, the restrictions on the motion vector may be derived from the following expressions.

$$mvLX[0]=\text{Clip3}(v x \min, v x \max, mvLX[0])$$

$$mvLX[1]=\text{Clip3}(v y \min, v y \max, mvLX[1]) \quad \text{(Expression CLIP4)}$$

where, $$v x \min=(xTs-xb+\text{NTAP}/2-1)<<\log 2(M)$$

$$v x \max=(xTs+wT-xb-W-\text{NTAP}/2)<<\log 2(M)$$

$$v y \min=(yTs-yb+\text{NTAP}/2-1)<<\log 2(M)$$

$$v y \max=(yTs+hT-yb-H-\text{NTAP}/2)<<\log 2(M) \quad \text{(Expression CLIP5)}$$

In the case of independent_tile_flag=1, by restricting the motion vector in this way, the motion vector can always point to the outside of the collocated tile in the inter prediction. Even in this configuration, the tile sequence may be independently decoded using the inter prediction.

In a case that the prediction mode predMode indicates an intra prediction mode, the intra prediction image generator 310 performs an intra prediction by using an intra prediction parameter input from the intra prediction parameter decoder 304 and a read reference picture. Specifically, the intra prediction image generator 310 reads a neighboring PU, which is a picture of a decoding target, in a prescribed range from a decoding target PU among PUs already decoded, from the reference picture memory 306. The prescribed range is, for example, any of neighboring PUs in left, upper left, top, and upper right in a case that a decoding target PU moves in order of so-called raster scan sequentially, and varies according to intra prediction modes. The order of the raster scan is an order to move sequentially from the left edge to the right edge in each picture for each row from the top edge to the bottom edge.

The intra prediction image generator 310 performs the prediction in the prediction mode indicated by the intra prediction mode IntraPredMode based on the read out neighboring PU to generate the prediction image of the PU. The intra prediction image generator 310 outputs the generated prediction image of the PU to the addition unit 312.

In a case that the intra prediction parameter decoder 304 derives the intra prediction mode different in luminance and chrominance, the intra prediction image generator 310 generates a luminance prediction image of the PU by any of the planar prediction (0), the DC prediction (1), and the Angular directional predictions (2 to 66) in accordance with the luminance prediction mode IntraPredModeY, and generates a chrominance prediction image of the PU by any of the planar prediction (0), the DC prediction (1), the Angular predictions (2 to 66), and the LM mode (67 to 72) in accordance with the chrominance prediction mode IntraPredModeC.

Figure 38:
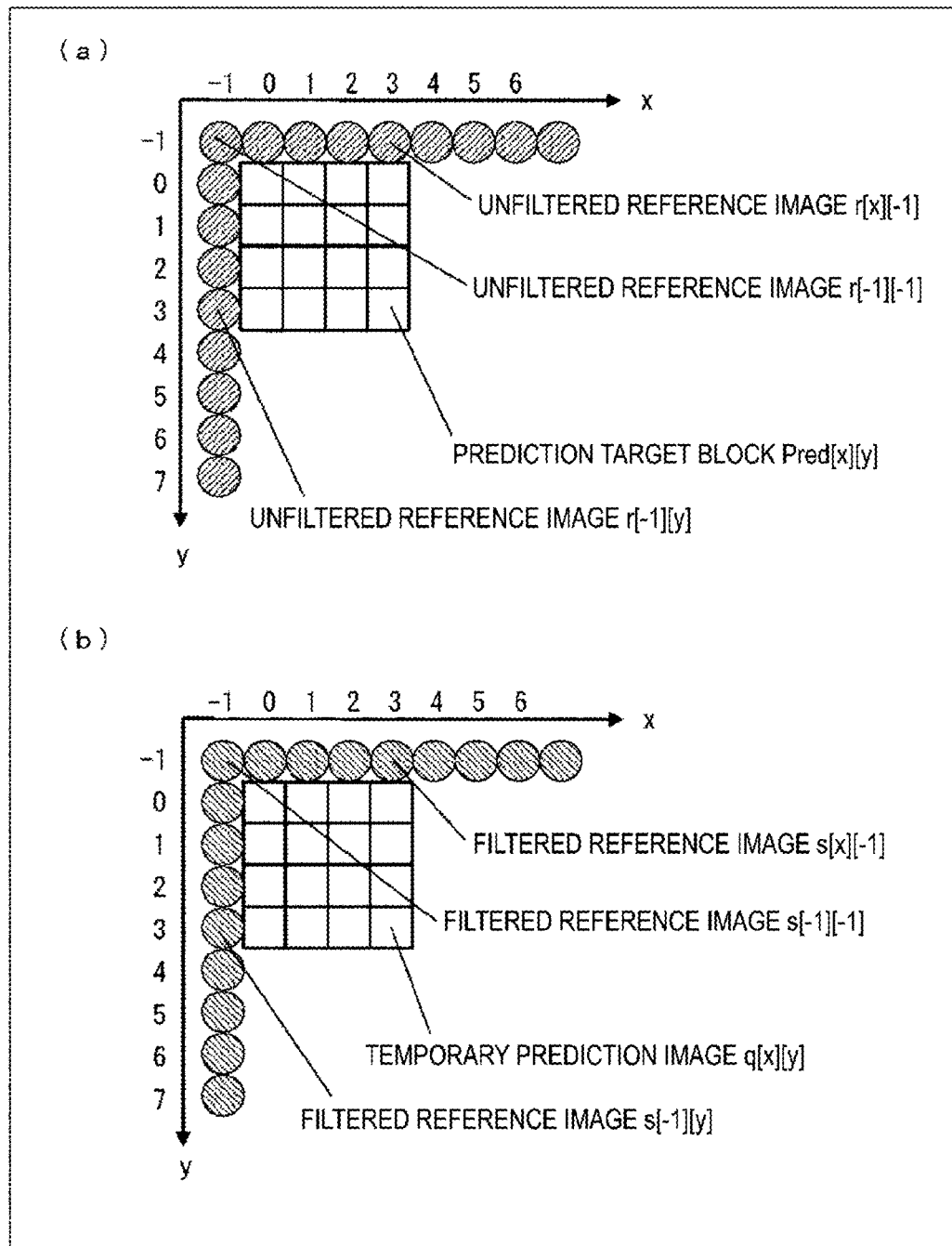
FIG. 38 is a diagram illustrating a prediction target block and unfiltered/filtered reference images.

In the Planar prediction, DC prediction, and Angular prediction, a decoded peripheral region neighboring to (proximate to) the prediction target block is configured as the reference region R. Schematically, these prediction modes are prediction schemes for generating a prediction image by extrapolating pixels on the reference region R in a particular direction. For example, the reference region R may be configured as a reverse L-shaped region (for example, regions indicated by pixels of hashed circles in FIG. 38) including a left and top (or even upper left, upper right, lower left) portion of the prediction target block.

Details of Prediction Image Generator

Next, a configuration of the intra prediction image generator 310 will be described in detail using FIG. 39.

Figure 39:
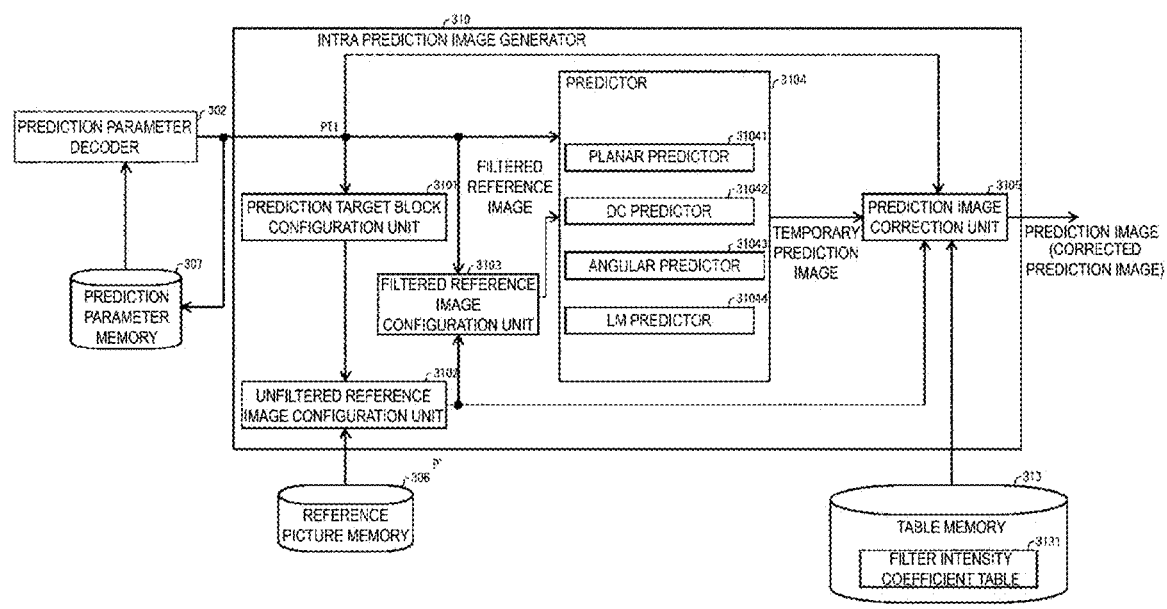
FIG. 39 is a block diagram illustrating a configuration of an intra prediction image generator.

As illustrated in FIG. 39, the intra prediction image generator 310 includes a prediction target block configuration unit 3101, an unfiltered reference image configuration unit 3102 (first reference image configuration unit), a filtered reference image configuration unit 3103 (second reference image configuration unit), a predictor 3104, and a prediction image correction unit 3105 (prediction image correction unit, filter switching unit, weight coefficient changing unit).

The filtered reference image configuration unit 3103 applies a reference pixel filter (first filter) to reference pixels (unfiltered reference image) on the input reference region R to generate a filtered reference image and output the generated filtered reference image to the predictor 3104. The predictor 3104 generates a temporary prediction image (pre-correction prediction image) of the prediction target block, based on the input intra prediction mode, the unfiltered reference image, and the filtered reference image, and outputs the generated image to the prediction image correction unit 3105. The prediction image correction unit 3105 corrects the temporary prediction image in accordance with the input intra prediction mode, and generates a prediction image (corrected prediction image). The prediction image generated by the prediction image correction unit 3105 is output to an adder 15.

Hereinafter, the components included in the intra prediction image generator 310 will be described.

Prediction Target Block Configuration Unit 3101

The prediction target block configuration unit 3101 configures the target CU in the prediction target block, and outputs information on the prediction target block (prediction target block information). The prediction target block information includes at least a prediction target block size, a prediction target block position, and an index indicating whether the prediction target block is a luminance or a chrominance.

Unfiltered Reference Image Configuration Unit 3102

The unfiltered reference image configuration unit 3102 configures a peripheral region neighboring to the prediction target block as the reference region R, based on the prediction target block size and the prediction target block position in the prediction target block information. Subsequently, each pixel value in the reference region R (the unfiltered reference image, the boundary pixels) is set with each decoded pixel value at the corresponding location on the reference picture memory 306. In other words, the unfiltered reference image r[x][y] is configured by the following expression using the decoded pixel value u[px][py] of the target picture expressed with reference to the upper left coordinates of the target picture.

$r[x][y]=u[xB+x][yB+y]$ $x=-1, y=-1 \ldots (BS*2-1)$ and $x=0 \ldots (BS*2-1)$,
$y=-1$  (INTRAP-1)

where, (xB, yB) represent the upper left coordinates of the prediction target block, and BS represents a value of the larger one of the width W and height H of the prediction target block.

In the above expressions, as illustrated in FIG. 38(a), a line r[x][−1] of the decoded pixels neighboring an upper side of the prediction target block and a column r[−1][y] of the decoding pixels neighboring a left side of the prediction target block are unfiltered reference images. Note that, in a case that a decoded pixel value corresponding to a reference pixel position is not present or is not referable, a predetermined value (for example, 1<<(bitDepth−1) in a case that a pixel bit depth is bitDepth) may be configured as an unfiltered reference image, or a referable decoded pixel value that is present neighboring to the corresponding decoded pixel value may be configured as an unfiltered reference image. In addition, "y=−1 . . . (BS*2−1)" indicates that y may take (BS*2+1) values from −1 to (BS*2−1), and "x=0 . . . (BS*2−1)" indicates that x may take (BS*2) values from 0 to (BS*2−1).

In the above expression, as described later with reference to FIG. 38(a), the decoded image included in the row of decoded pixels neighboring to the predicted block upper side and the decoded image included in the column of decoded pixels neighboring to the predicted block left side are unfiltered reference images.

Filtered Reference Image Configuration Unit 3103

The filtered reference image configuration unit 3103 applies (gives) a reference pixel filter (first filter) to the input unfiltered reference image in accordance with the intra prediction mode to derive and output a filtered reference image s[x][y] at each position (x, y) on the reference region R. Specifically, a low-pass filter is applied to the unfiltered reference image at and around the position (x, y) to derive a filtered reference image. Note that the low pass filter need not necessarily be applied to the total intra prediction mode, and the low-pass filter may be applied to at least some intra prediction modes. Note that, the filter that is applied to the unfiltered reference image on the reference region R by the filtered reference image configuration unit 3103 before the input to the predictor 3104 in FIG. 39 is referred to as the "reference pixel filter (first filter)", whereas a filter that corrects the temporary prediction image by the prediction image correction unit 3105 described later is referred to as a "boundary filter (second filter)", the temporary prediction image being derived by the predictor 3104 by using the unfiltered reference pixel value.

For example, as in an HEVC intra prediction, in the case of the DC prediction or in the case that the prediction target block size is 4×4 pixels, the unfiltered reference image may be used directly as a filtered reference image. Whether to apply the low pass filter may be switched by way of the flag decoded from the coded data. Note that in the case that the intra prediction mode is the LM prediction, the predictor 3104 does not directly refer to the unfiltered reference image, and thus, the filtered reference pixel value s[x][y] may not be output from the filtered reference image configuration unit 3103.

Configuration of Intra predictor 3104

The intra predictor 3104 generates the temporary prediction image (temporary prediction pixel values, pre-correction prediction image) of the prediction target block based on the intra prediction mode, the unfiltered reference image, and the filtered reference pixel value, and outputs the generated image to the prediction image correction unit 3105. The predictor 3104 includes therein a Planar predictor 31041, a DC predictor 31042, an Angular predictor 31043, and a LM predictor 31044. The predictor 3104 selects a specific predictor in accordance with the input intra prediction mode to input the unfiltered reference image and the filtered reference image. A relationship between the intra prediction mode and the corresponding predictor is as follows.

Planar prediction—Planar predictor 31041
DC prediction—DC predictor 31042
Angular prediction—Angular predictor 31043
LM prediction—LM predictor 31044

The predictor 3104, in an intra prediction mode, generates a prediction image of the prediction target block (temporary prediction image q[x][y]), based on the filtered reference image. In other intra prediction modes, the unfiltered reference image may be used to generate the temporary prediction image q[x][y]. The reference pixel filter may be turned on in the case of using the filtered reference image, and the reference pixel filter may be turned off in the case of using the unfiltered reference image.

Hereinafter, an example will be described in which the unfiltered reference image r[ ][ ] is used to generate the temporary prediction image q[x][y] in the case of the LM prediction, and the filtered reference image s[ ][ ] is used to generate the temporary prediction image q[x][y] in the case of the Planar prediction, the DC prediction, and the Angular prediction, but the selection of the unfiltered reference image and the filtered reference image is not limited to this example. For example, whether to use the unfiltered reference image or the filtered reference image may be switched depending on a flag that is explicitly decoded from the encoded data, or may be switched based on a flag derived from another coding parameter. For example, in the case of the Angular prediction, in a case that a difference between the intra prediction mode number of the prediction target block and the intra prediction mode number of the vertical prediction or the horizontal prediction is small, the unfiltered reference image may be used (the reference pixel filter may be turned off), otherwise the filtered reference image may be used (the reference pixel filter may be turned on).

Planar Prediction

The Planar predictor 31041 linearly adds multiple filtered reference images in accordance with a distance between the prediction target pixel position and the reference pixel position to generates a temporary prediction image, and outputs the generated image to the prediction image correction unit 3105. For example, the pixel value q[x][y] of the temporary prediction image is derived from the following expression using the filtered reference pixel value s[x][y] and the width W and height H of the prediction target block described above.

$$Q[x][y]=((W-1-x)*s[-1][y]+(x+1)*s[W][-1]+(H-1-y)*s[x][-1]+(y+1)*s[-1][H]+\max(W,H))>>(k+1) \quad \text{(INTRAP-2)}$$

where, it is defined as x=0 . . . W−1, y=0>>H−1, and k=log 2(max(W, H)).

DC Prediction

The DC predictor 31042 derives an DC prediction value corresponding to an average value of the filtered reference image s[x][y] to be input, and outputs a temporary prediction image q[x][y] having a pixel value of the derived DC prediction value.

Angular Prediction

The Angular predictor 31043 generates the temporary prediction image q[x][y] using the filtered reference image s[x][y] in the prediction direction (reference direction) indicated by the intra prediction mode, and outputs the generated image to the prediction image correction unit 3105. In the Angular prediction, the reference region R neighboring to the top or left of the prediction target block is configured as a main reference region R in accordance with a value of a main direction flag bRefVer, and a filtered reference image on the main reference region R is set to a main reference image. The temporary prediction image is generated by referring to the main reference image in units of rows or columns within the prediction target block. In a case that the value of the main direction flag bRefVer is 1 (a main direction is the vertical direction), a generation unit of the temporary prediction image is configured as a row, and the reference region R on the upper side of the prediction target block is set as the main reference region R. The main reference image refMain[x] is set by the following expression using the filtered reference image s[x][y].

$$\text{refMain}[x]=s[-1+x][-1]x=0 \ldots 2*nS$$

$$\text{refMain}[x]=s[-1][-1+((x*\text{invAngle}+128)>>8)]x= \\ -nS \ldots -1 \quad \text{(INTRAP-3)}$$

where, invAngle corresponds to a value obtained by scaling an inverse of a slope intraPredAngle determined depending on distances in the vertical/horizontal directions between the prediction target pixel position and the main reference region R, and the prediction direction. According to the above expressions, in a range where x is 0 or greater, a filtered reference image on the reference region R neighboring to the upper side of the prediction target block is set in refMain[x]. In a range where x is less than 0, a filtered reference image on the reference region R neighboring to the left side of the prediction target block is set in refMain[x] based on the prediction direction. The temporary prediction image q[x][y] is calculated by the following expression.

$$q[x][y]=((32-i\text{Fact})*\text{refMain}[x+i\text{Idx}+1]+ \\ i\text{Fact}*\text{refMain}[x+i\text{Idx}+2]+16)>>5 \quad \text{(INTRAP-4)}$$

where, iIdx and iFact represent pixel positions in the main reference region R used to generate the target prediction pixel value calculated based on the distance (y+1) between the prediction target pixel position and the main reference region R in the vertical direction, and the slope intraPredAngle. iIdx represents a pixel position with an integer precision and iFact represents a pixel position with a decimal precision, which are derived with the following expression.

$$i\text{Idx}=((y+1)*\text{intraPredAngle})>>5$$

$$i\text{Fact}=((y+1)*\text{intraPredAngle})\&\ 31 \quad \text{(INTRAP-5)}$$

In a case that the value of the main direction flag bRefVer is 0 (a main direction is the horizontal direction), the generation unit of the temporary prediction image is configured as a column, and the reference region R on the left side of the prediction target block is set as the main reference region R. The main reference image refMain[x] is set by the following expression using the filtered reference pixel value s[x][y].

$$\text{refMain}[x]=s[-1][-1+x]x=0 \ldots nS$$

$$\text{refMain}[x]=s[-1+((x*\text{invAngle}+128)>>8)][-1]x= \\ -nS \ldots -1 \quad \text{(INTRAP-6)}$$

The temporary prediction image q[x][y] is calculated by the following expression.

$$q[x][y]=((32-iFact)*refMain[y+iIdx+1]+iFact*refMain[y+iIdx+2]+16)>>5 \quad \text{(INTRAP-7)}$$

where, iIdx and iFact represent pixel positions in the main reference region R used to generate the prediction target pixel value calculated based on the distance (x+1) between the prediction target pixel position and the main reference region R in the horizontal direction, and the slope intraPredAngle. iIdx represents a pixel position with an integer precision and iFact represents a pixel position with a small accuracy, which are derived with the following expression.

$$iIdx=((x+1)*intraPredAngle)>>5$$

$$iFact=((x+1)*intraPredAngle)\&\ 31 \quad \text{(INTRAP-8)}$$

LM Prediction

The LM predictor 31044 predicts a pixel value of a chrominance, based on a pixel value of a luminance.

Figure 40:
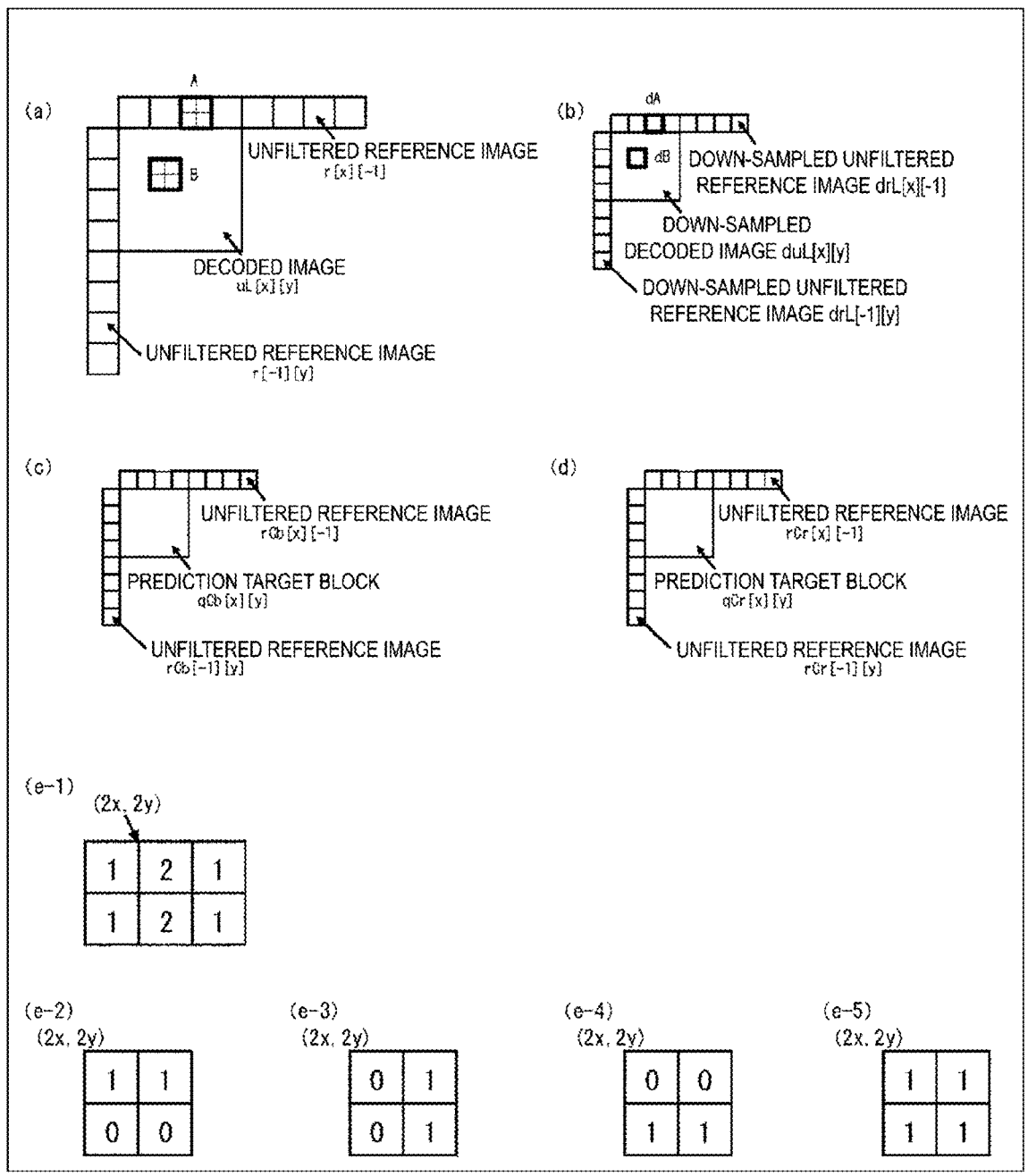
FIG. 40 is a diagram illustrating a CCLM prediction process.

The CCLM prediction process will be described with reference to FIG. 40. FIG. 40 is a diagram illustrating a situation in which the decoding process on the luminance component has ended and the prediction process on the chrominance component is being performed in the target block. FIG. 40(*a*) illustrates a decoded image uL[ ][ ] of a luminance component of a target block, and FIGS. 40(*c*) and 40(*d*) illustrate temporary prediction images qCb[ ][ ] and qCr[ ][ ] of Cb and Cr components, respectively. In FIGS. 40(*a*), 40(*c*) and 40(*d*), regions rL[ ][ ], rCb[ ][ ], and rCr[ ] outside the respective target blocks are unfiltered reference images neighboring to the respective target blocks. FIG. 40(*b*) is a diagram in which the target block of the luminance component and the unfiltered reference images illustrated in FIG. 40(*a*) are downsampled, and duL[ ][ ] and drL[ ] are a decoded image of the luminance component and the unfiltered reference images, respectively, after downsampling. Next, a downsampling filter used to generate FIG. 40(*b*) from FIG. 40(*a*) is illustrated in FIG. 40(*e*). FIG. 40(*e*-1) is a fixed sampling filter (default sampling filter) and FIGS. 40(*e*-2) to 40(*e*-5) are four kinds of additional sampling filters. For example, expressions for calculating one pixel of dA or dB in FIG. 40(*b*) from four pixels of A or B in FIG. 40(*a*) are described below.

In a case of the default sampling filter (FIG. 40(*e*-1)):

$$duL[x][y]=(uL[2x-1][2y]+2*uL[2x][2y]+uL[2x+1][2y]+uL[2x-1][2y+1]+2*uL[2x][2y+1]+uL[2x+1][2y+1]+4)>>3$$

$$drL[x][y]=(rL[2x-1][2y]+2*rL[2x][2y]+rL[2x+1][2y]+rL[2x-1][2y+1]+2*rL[2x][2y+1]+rL[2x+1][2y+1]+4)>>3 \quad \text{(Expression CCLM-1)}$$

In a case of the additional sampling filter:
Filter index 1 (FIG. 40(*e*-2))

$$duL[x][y]=(uL[2x][2y]+uL[2x+1][2y]+1)>>1$$

$$drL[x][y]=(rL[2x][2y]+rL[2x+1][2y]+1)>>1 \quad \text{(Expression CCLM-2)}$$

Filter index 2 (FIG. 40(*e*-3))

$$duL[x][y]=(uL[2x+1][2y]+uL[2x+1][2y+1]+1)>>1$$

$$drL[x][y]=(rL[2x+1][2y]+rL[2x+1][2y+1]+1)>>1$$

Filter index 3 (FIG. 40(*e*-4))

$$duL[x][y]=(uL[2x][2y+1]+uL[2x+1][2y+1]+1)>>1$$

$$drL[x][y]=(rL[2x][2y+1]+rL[2x+1][2y+1]+1)>>1$$

Filter index 4 (FIG. 40(*e*-5))

$$duL[x][y]=(uL[2x][2y]+uL[2x+1][2y]+uL[2x][2y+1]+uL[2x+1][2y+1]+2)>>2$$

$$drL[x][y]=(rL[2x][2y]+rL[2x+1][2y]+rL[2x][2y+1]+rL[2x+1][2y+1]+2)>>2$$

Here, (2x, 2y) is replaced with the upper left coordinates of A and B in FIG. 40(*a*), and (x, y) is replaced with the upper left coordinates of dA and dB in FIG. 40(*b*).

The temporary prediction images of Cb and Cr components are generated from the luminance images duL[ ][ ] and drL[ ][ ] downsampled by use of any of these filters above.

Figure 41:
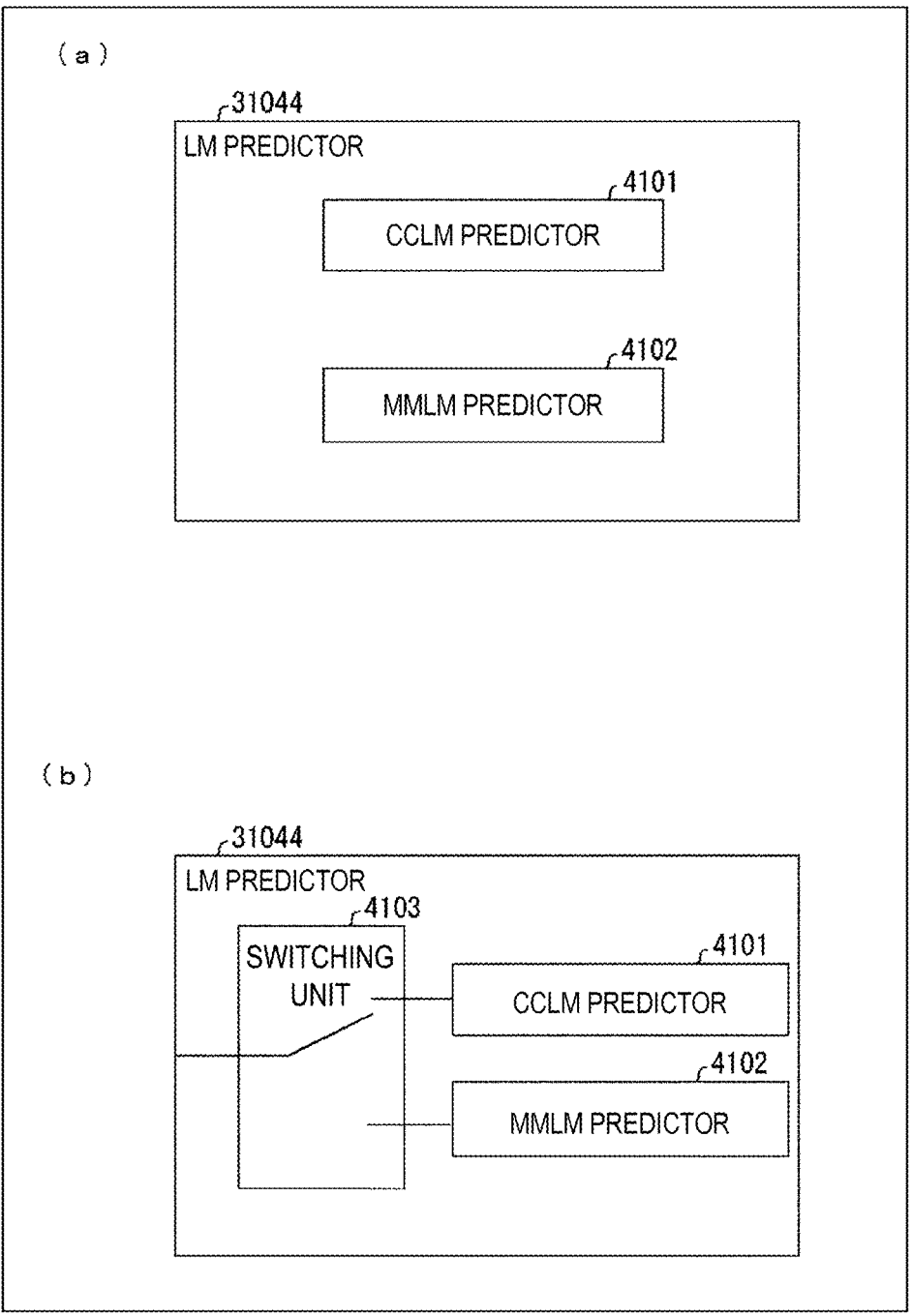
FIG. 41 is a block diagram illustrating a configuration of an LM predictor.

FIG. 41 is a block diagram illustrating an example of a configuration of the LM predictor 31044 included in the intra prediction image generator 310. As illustrated in FIG. 41(*a*), the LM predictor 31044 includes a CCLM predictor 4101 and a MMLM predictor 4102.

The CCLM predictor 4101 downsamples the luminance image using any of the filters described above in the case that the chrominance format is 4:2:0, and calculates the decoded image duL[ ][ ] of the downsampled luminance component in FIG. 40(*b*) and the unfiltered reference image drL[ ][ ].

Next, the CCLM predictor 4101 derives the parameters (CCLM parameters) (a, b) of the linear model from the unfiltered reference image drL[ ][ ] of the downsampled luminance component, and the unfiltered reference images rCb[ ][ ] and rCr[ ][ ] of the Cb and Cr components. Specifically, a linear model (aC, bC) is calculated that minimizes a square error SSD between the unfiltered reference image drL[ ][ ] of the luminance component and the unfiltered reference image rC[ ][ ] of the chrominance component.

$$SSD=\Sigma\Sigma(rC[x][y]-(aC*drL[x][y]+bC)) \quad \text{(Expression CCLM-3)}$$

where $\Sigma\Sigma$ is the sum for x and y. In the case of the Cb component, rC[ ][ ] is rCb[ ][ ] and (aC, bC) is (aCb, bCb), and in the case of the Cr component, rC[ ][ ] is rCr[ ][ ] and (aC, bC) is (aCr, bCr).

In order to utilize correlation between prediction errors of the Cb component and the Cr component, a linear model aResi is calculated that minimizes a square error SSD between the unfiltered reference image rCb[ ][ ] of the Cb component and the unfiltered reference image rCr[ ][ ] of the Cr component.

$$SSD=\Sigma\Sigma(rCr[x][y]-(aResi*rCb[x][y])) \quad \text{(Expression CCLM-4)}$$

where $\Sigma\Sigma$ is the sum for x and y. These CCLM parameters are used to generate the temporary prediction images qCb[ ][ ] and qCr[ ][ ] of the chrominance component using the following expressions.

$$qCb[x][y]=aCb*duL[x][y]+bCb$$

$$qCr[x][y]=aCr*duL[x][y]+aResi*ResiCb[x][y]+bCr \quad \text{(Expression CCLM-5)}$$

where, ResiCb[ ][ ] is a prediction error of the Cb component.

The MMLM predictor 4102 is used in a case that the relationship between the unfiltered reference images of the luminance component and the chrominance component is categorized into two or more linear models. In a case that there are multiple regions in the target block, such as a foreground and a background, the linear model between the luminance component and the chrominance component is different for each region. In such a case, multiple linear models may be used to generate a temporary prediction image of the chrominance component from the decoded image of the luminance component. For example, in a case of two linear models, the pixel values of the unfiltered reference images of the luminance components are divided into two at a certain threshold th_mmlm, and a linear model is calculated that minimizes the square error SSD between the unfiltered reference image drL[ ][ ] of the luminance component and the unfiltered reference image rC [ ][ ] of the chrominance component for a category 1 in which the pixel value is equal to or smaller than the threshold th_mmlm and a category 2 in which the pixel value is greater than the threshold th_mmlm.

$$SSD1=\Sigma\Sigma(rC[x][y]-(a1C*drL[x][y]+b1))$$
$$(\text{if } drL[x][y]<=\text{th\_mmlm})$$

$$SSD2=\Sigma\Sigma(rC[x][y]-(a2C*drL[x][y]+b2))(\text{if } drL[x][y]>\text{th\_mmlm}) \quad \text{(Expression CCLM-6)}$$

where, ΣΣ is a sum for x and y, in the case of the Cb component, rC[ ][ ] is rCb[ ][ ] and (a1C, b1C) is (a1Cb, b1Cb), and in the case of the Cr component, rC[ ][ ] is rCr[ ][ ] and (a1C, b1C) is (a1Cr, b1Cr).

The threshold th_mmlm may be an average of the unfiltered reference image drL[x][y] of the luminance component.

$$\text{th\_mmlm}=(\Sigma\Sigma drL[x][y]+(W+H)/4)/(W/2+H/2) \quad \text{(Expression CCLM-7)}$$

Alternatively, the threshold th_mmlm may be an average of the decoded image duL[x][y] of the luminance component.

$$\text{th\_mmlm}=(\Sigma\Sigma duL[x][y]+(W*H)/8)/(W*H/4) \quad \text{(Expression CCLM-8)}$$

where, W and H represent the width and height of the target block, respectively.

Since the MMLM has a fewer number of samples of the unfiltered reference image available for derivation of each linear model than the CCLM, the MMLM may not properly operate in a case that the target block size is small or the number of samples is small. Thus, as illustrated in FIG. 41(b), a switching unit 4103 is provided in the LM predictor 31044, and in a case that any of conditions described below is satisfied, the MMLM is turned off and the CCLM prediction is performed.

The target block size is equal to or smaller than TH_MMLMB (TH_MMLMB is 8×8, for example)

The number of samples of the unfiltered reference image rCb[ ][ ] of the target block is smaller than TH_MMLMR (TH_MMLMR is 4, for example)

No unfiltered reference image of the target block is on both the upper side and the left side of the target block These conditions can be determined by the size and position information of the target block, and thus, the signaling of the flag indicating whether or not the CCLM is used may be omitted.

In a case that the threshold th_mmlm is configured as the average of the unfiltered reference image drL[x][y] of the luminance component, in case that the decoded image duL[ ][ ] of the luminance component is concentrated on one side of th_mmlm, for example, in a case that ⅞ pixels of duL[ ][ ] is concentrated in one category, the MMLM is turned off. In this case, the flag indicating whether or not the CCLM is used may be signaled to notify that the MMLM is turned off (CCLM is selected).

In a case that a part of the unfiltered reference image is outside the tile, the MMLM is less likely to be selected. Thus, in the case that a portion of the unfiltered reference image is outside the tile, the default sampling filter may be used in downsampling without informing information required for downsampling so that a required amount of codes is reduced and the MMLM is likely to be selected.

In the case that a portion of the unfiltered reference image is outside the tile, the LM prediction may be turned off. In the blocks for which the intra prediction is used, the flag indicating whether or not the CCLM prediction is used is signaled in the first area of the intra prediction information of the chrominance component, and thus, the amount of codes can be reduced by not signaling the flag. That is, the on-off control of the CCLM is performed at the tile boundary.

Typically, in a case that the chrominance component of the target block has a higher correlation with the luminance component in the target block at the same position as itself than the same chrominance component as itself in the neighboring block, the LM prediction is applied in the intra prediction, a more accurate prediction image is generated, and the coding efficiency is increased by reducing the prediction residuals. As described above, by reducing the information required for the LM prediction and making the LM prediction more likely to be selected, even in a case that the reference image neighboring to the target block is outside the tile, a decrease in the coding efficiency can be suppressed while independently intra-predicting the tile.

Note that since the LM prediction generates the temporary prediction image by using the unfiltered reference image, the temporary prediction image by the LM prediction is not subjected to the correction process in the prediction image correction unit 3105.

Note that the configuration described above is an example of the predictor 3104, and the configuration of the predictor 3104 is not limited to the above configuration.

Configuration of Prediction Image Correction Unit 3105

The prediction image correction unit 3105 corrects the temporary prediction image that is the output of the predictor 3104 in accordance with the intra prediction mode. Specifically, the prediction image correction unit 3105 weighted-adds (weighted-averages), for each pixel of the temporary prediction image, the unfiltered reference image and the predicted prediction image in accordance with the distance between the reference region R and the target prediction pixel to output a prediction image (corrected prediction image) Pred that is a corrected temporary prediction image. Note that in some intra prediction modes, the prediction image correction unit 3105 may not necessarily correct the temporary prediction image, and the output of the predictor 3104 as it is may be used as the prediction image. Additionally, the output of the predictor 3104 (the temporary prediction image, the pre-correction prediction image) and the output of the prediction image correction unit 3105 (the prediction image, the corrected prediction image) may be configured to be switched to each other in accordance with a flag explicitly derived from the coded data or a flag derived from the coding parameter.

A process for deriving the prediction pixel value Pred[x][y] at the position (x, y) within the prediction target block using the boundary filter in the prediction image correction unit 3105 will be described with reference to FIG. 42. FIG. 42(a) is a derivation expression for the prediction image Pred[x][y]. The prediction image Pred[x][y] is derived by weighted-adding (weighted-averaging) the temporary prediction image q[x][y] and the unfiltered reference image (for example, r[x][−1], r[−1][y], r[−1][−1]). The boundary filter is a weighted-addition of the unfiltered reference image of the reference region R and the temporary prediction image. Here, rshift represents a predetermined positive integer value corresponding to an adjustment term for expressing a distance weight k[ ] as an integer, and is referred to as a normalization adjustment term. For example, rshift=4 to 10 is used. For example, rshift=6.

A weight coefficient for the unfiltered reference image is derived by right shifting a reference intensity coefficient C=(c1v, c1h, c2v, c2h) predetermined for each prediction direction by a distance weight k (k[x] or k[y]) that depends on the distance (x or y) to the reference region R. More specifically, as a weight coefficient (first weight coefficient w1v) for the unfiltered reference image r[x][−1] on the upper side of the prediction target block, the reference intensity coefficient c1v is right shifted by the distance weight k[y] (vertical distance weight). As a weight coefficient (second weight coefficient w1h) for the unfiltered reference image r[−1][y] on the left side of the prediction target block, the reference intensity coefficient c1h is right shifted by the distance weight k[x] (horizontal distance weight). Additionally, as a weight coefficient (third weight coefficient w2) for the unfiltered reference image r[−1][−1] in the upper left of the prediction target block, a sum of the reference intensity coefficient c2v being right shifted by the distance weight k[y] and the reference intensity coefficient c2h being right shifted by the distance weight k[x] is used.

FIG. 42(b) is a derivation expression for a weight coefficient b[x][y] for the temporary prediction pixel value q[x][y]. The weight coefficient b[x][y] is derived so that the sum of the products of the weight coefficient and the reference intensity coefficient matches (1<<rshift). This value is configured intending to normalize the product of the weight coefficient and the reference intensity coefficient taking the right shift operation of rshift in FIG. 42(a) into consideration.

FIG. 42(c) is a derivation expression for the distance weight k[x]. The distance weight k[x] is set with a value floor(x/dx) that monotonically increases in accordance with the horizontal distance x between the target prediction pixel and the reference region R. Here, dx represents a predetermined parameter according to the size of the prediction target block.

FIGS. 42(d) and 42(e) illustrate an example of dx. In FIG. 42(d), dx=1 is set in a case that the width W of the prediction target block is 16 or less, and dx=2 is set in a case that W is greater than 16. In FIG. 42(e), dx=¼, ½, or 1 is set in a case that the width W of the prediction target block is 4, 8, or 16, and dx=2 is set in a case that W is greater than 16. In FIG. 42(e), the small size block is designed to be more quickly unaffected by the unfiltered reference image as farther away from the block boundary.

Also for the distance weight k[y], the definition can be utilized in which the horizontal distance x is replaced with the vertical distance y at the distance weight k[x] described above. The values of the distance weights k[x] and k[y] become smaller as the values of x and y are larger, respectively.

According to the method for deriving the target prediction image using the above expressions in FIG. 42, the larger the reference distance (x, y) which is the distance between the target prediction pixel and the reference region R is, the larger the values of the distance weights (k[x], k[y]) become. Thus, the value of the weight coefficient for the unfiltered reference image resulting from the right shifting the predefined reference intensity coefficient by the distance weight is a small value. Therefore, the closer to the reference region R the position within the prediction target block is, the larger the weight of the unfiltered reference image become for the prediction image being derived by correcting the temporary prediction image. In general, the closer to the reference region R the position is, the more likely the unfiltered reference image becomes to be suitable as an estimate of the target prediction block as compared to the temporary prediction image. Therefore, the prediction image derived by the expressions in FIG. 42 has a higher prediction accuracy compared to the case that the temporary prediction image is used as the prediction image. In addition, according to the expressions in FIG. 42, the weight coefficient using the unfiltered reference image can be derived by multiplying the reference intensity coefficient by the distance weight. Therefore, by calculating the distance weight in advance for each reference distance and holding it in a table, a weight coefficient can be derived without using a right shift operation or a division.

Note that the reference distance is defined as the distance between the prediction target pixel and the reference region R, and examples of the reference distance include the pixel positions (x, y) within the prediction target block, but other variables representing the distance between the prediction target image and the reference region R may be used as the reference distance. For example, the distance between the prediction target pixel and the pixel on the closest reference region R may be defined as the reference distance. The distance between the prediction target pixel and the pixel on the reference region R neighboring to the upper left position of the prediction target block may be defined as the reference distance. Also, in a case that the reference distance is defined by a distance between two pixels, the distance may be a distance in a broad sense. The broad distance d (a, b) in a broad sense meets each property of non-negativity $d(a, b) \geq 0$, symmetry d(a, b)=d(b, a), and triangle inequality $d(a, b)+d(b, c) \geq d(a, c)$ for any three points a, b, c∈X. Note that in the following description, the reference distance is represented by the reference distance x, but x is not limited to the horizontal distance, and can be applied to any reference distance. For example, in a case that a calculation expression for the distance weight k[x] is illustrated, the expression can also be applied to the distance weight k[y] calculated using the vertical reference distance y as a parameter.

Figure 43:
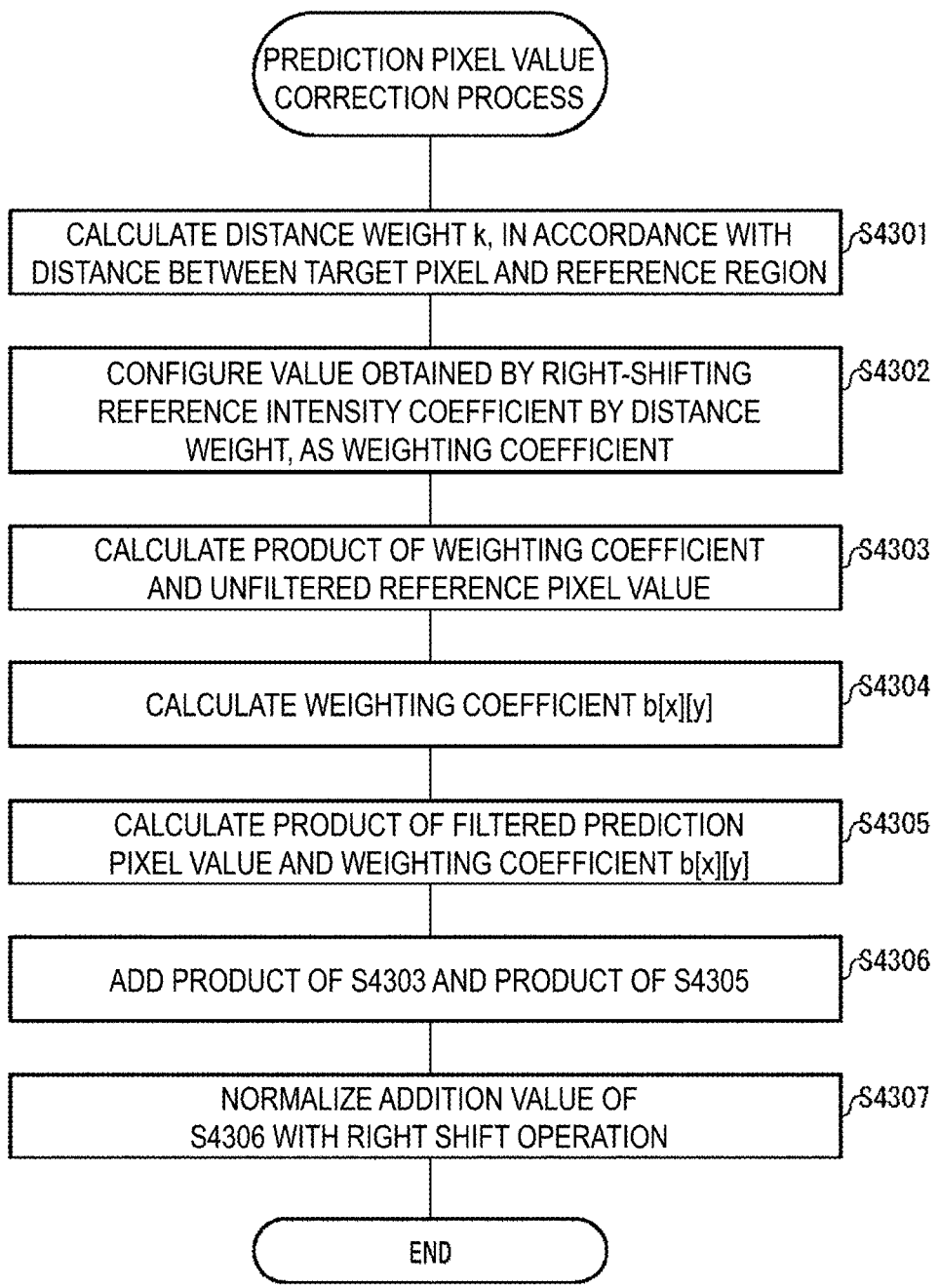
FIG. 43 is a flowchart illustrating operation of a prediction image correction unit.

Hereinafter, an operation of the prediction image correction unit 3105 will be described with reference to FIG. 43. FIG. 43 is a flowchart illustrating an example of the operation of the prediction image correction unit 3105.

(S4301) The prediction image correction unit 3105 derives the distance weight k[x] in the x direction and the distance weight k[y] in the y direction in accordance with the distance (x or y) between the prediction target pixel (x, y) and the reference region R, respectively.

(S4302) The prediction image correction unit 3105 multiplies each reference intensity coefficient by each distance weight derived at S4301 to derive the following weight coefficients.

First weight coefficient $w1v=c1v>>k[y]$

Second weight coefficient $w1h=c1h>>k[x]$

Third weight coefficient $w2=(c2v>>k[y])+(c2h>>k[x])$ (S4303) The prediction image correction unit 3105 calculates a product of each weight coefficient (w1v, w1h, w2) derived at S4302 and the corresponding unfiltered reference pixel value (r[x][−1], r[−1][y], r[−1][−1]).

Product of $r[x][-1]$ and $w1v, m1=w1v*r[x][-1]$

Product of $r[-1][y]$ and $w1h, m2=w1h*r[-1][y]$

Product of $r[-1][-1]$ and $w2, m3=w2*r[-1][-1]$ (S4304) The prediction image correction unit 3105 derives a weight coefficient b[x][y] from the following expression so that the total sum of the first weight coefficient w1v, the second weight coefficient w1h, the third weight coefficient w2, and the weight coefficient b[x][y] is (1<<rshift) for the prediction target pixel (x, y).

$$b[x][y]=(1<<rshift)-w1v-w1h+w2$$

(S4305) The prediction image correction unit 3105 calculates the product m4 of the temporary prediction image q[x][y] and the weight coefficient b[x][y].

$$m4=b[x][y]*q[x][y]$$

(S4306) The prediction image correction unit 3105 derives a total sum of the products m1, m2, and m3 derived at S4304, and m4 derived at S4305, and a rounding adjustment term (1<<(rshift−1)) from the following expression.

$$sum=m1+m2-m3+m4+(1<<(rshift-1))$$

(S4307) The prediction image correction unit 3105 derives the prediction image (corrected prediction image) Pred[x][y] by performing right shift operation on the addition value sum derived at S4306 with the normalization adjustment term rshift as described below.

$$Pred[x][y]=sum>>rshift$$

Note that the rounding adjustment term (1<<(rshift−1)) is preferable, but is not limited thereto. For example, the rounding adjustment term may be 0 or other predetermined constants.

Note that the reference intensity coefficient C (c1v, c2v, c1h, c2h) may be different for each prediction direction.

The prediction image correction unit 3105 generates the prediction image (corrected prediction image) Pred[ ][ ] within the prediction target block by repeating the process indicated in S4301 to S4307 for all of the pixels within the prediction target block. Note that the operation of the prediction image correction unit 3105 is not limited to the above-described steps, and can be changed in a performable range.

Examples of Filter Mode and Reference Intensity Coefficient C

The reference intensity coefficient C (c1v, c2v, c1h, c2h) of the prediction image correction unit 3105 (boundary filter) is dependent on the intra prediction mode IntraPredMode, and is derived by referring to a table ktable corresponding to the intra prediction mode. An example of a reference intensity coefficient table is illustrated in FIG. 44.

Flow of Prediction Image Generation Process

Figure 45:
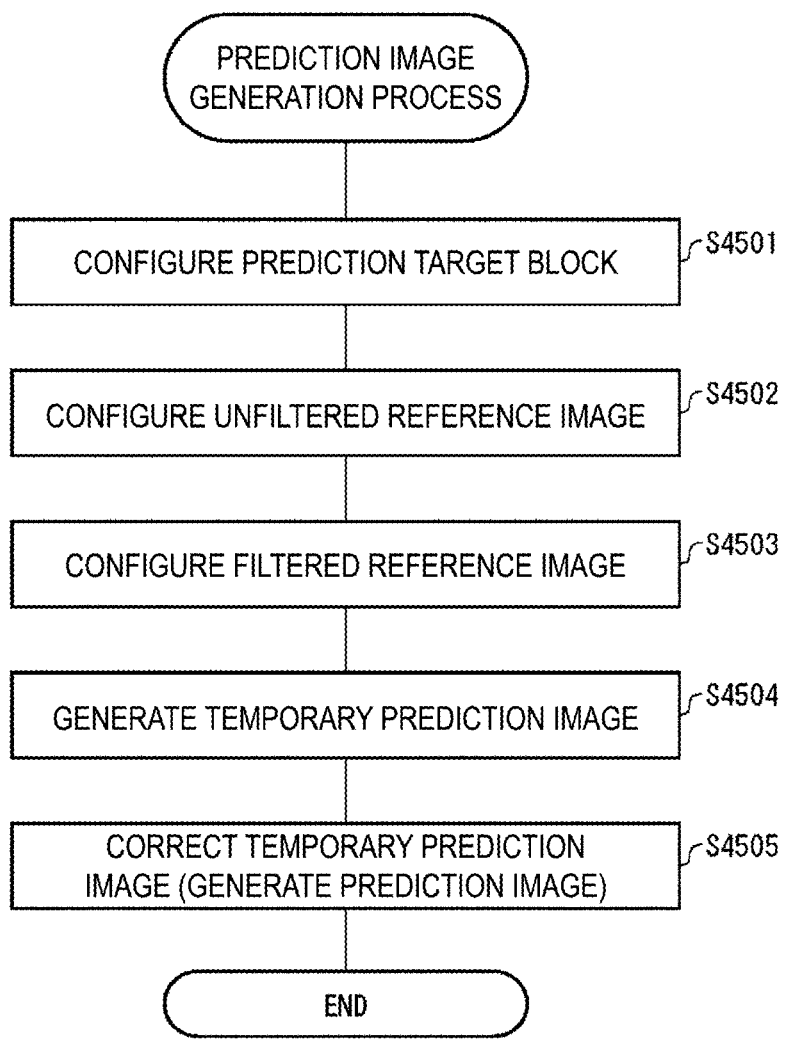
FIG. 45 is a flowchart illustrating operation of the intra prediction image generator.

Next, an overview of the prediction image generation process in units of block (or CU or PU) in the intra prediction image generator 310 will be described with reference to a flowchart in FIG. 45.

(S4501) The prediction target block configuration unit 3101 configures the prediction target block and outputs the prediction target block information to the unfiltered reference image configuration unit 3102.

(S4502) The unfiltered reference image configuration unit 3102 sets the decoded pixel value read from the reference picture memory to the unfiltered reference image and outputs the unfiltered reference image to the filtered reference image configuration unit 3103 and the prediction image correction unit 3105.

(S4503) The filtered reference image configuration unit 3103 applies the reference pixel filter to the unfiltered reference image set at S4502 to derive a filtered reference image and output the derived image to the predictor 3104.

(S4504) The predictor 3104 generates and outputs a temporary prediction image of the prediction target block from the intra prediction mode and the filtered reference image derived at S4503.

(S4505) The prediction image correction unit 3105 corrects the temporary prediction image derived at S4504, based on the intra prediction mode and the unfiltered reference image set at S4502 to generate and output the prediction image Pred (corrected prediction image).

In the above-described configuration, the reference intensity coefficient C (c1v, c2v, c1h, c2h) of the prediction image correction unit 3105 (boundary filter) is dependent on the intra prediction mode IntraPredMode, and is derived by referring to the table based on the intra prediction mode. The reference intensity coefficient C of the boundary filter may be used not only as weight coefficients for the nearest upper pixel r[x][−1], the nearest left pixel r[−1][y], and the nearest upper left pixel r[−1][−1] of the prediction target pixel (x, y), but also as weight coefficients for the nearest right pixel and the nearest left lower pixel, for example.

Note that the unfiltered reference image r[−1][−1] is necessary for the correction process of the prediction image, but in a case that the prediction target block shares the border with the tile boundary, a configuration of the following tile boundary boundary filter configuration is used because r[−1][−1] cannot be referred to.

Tile Boundary Boundary Filter

Figure 46:
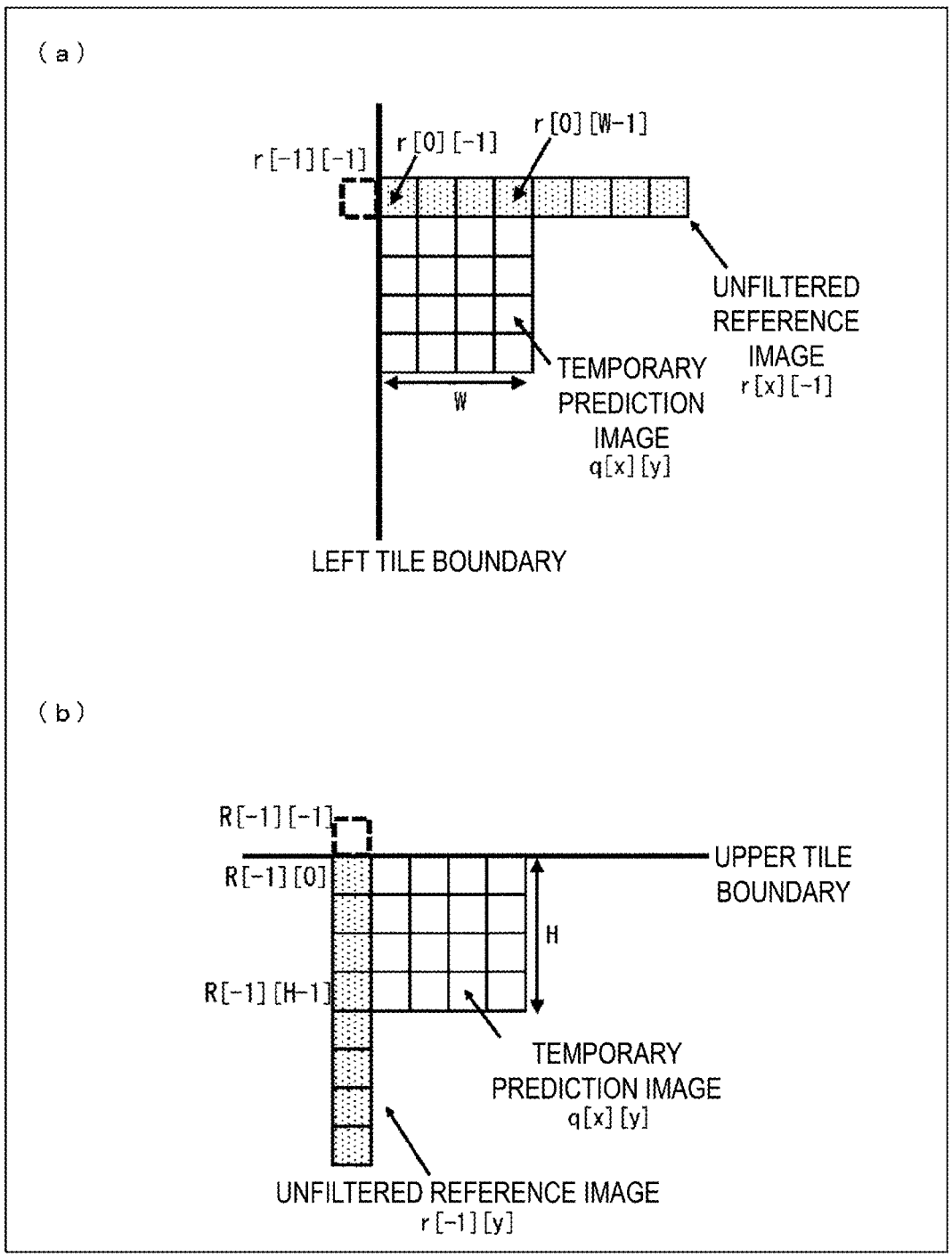
FIG. 46 is a diagram illustrating a reference pixel of a boundary filter at a tile boundary.

As illustrated in FIG. 46, the intra prediction image generator 310 uses pixels in a position that can be referred to instead of the upper left boundary pixel r[−1][−1], in a case that the prediction target block shares the border with the tile boundary, to apply a boundary filter.

FIG. 46(a) is a diagram illustrating a process for deriving the prediction pixel value Pred[x][y] at the position (x, y) within the prediction target block using the boundary filter in a case that the prediction target block shares the border with the boundary on the left side of the tile. The blocks neighboring to the left side of the prediction target block are outside the tile and cannot be referred to, but the pixels of the block neighboring to the upper side of the prediction target block can be referred to. Thus, the near upper left on-boundary pixel r[0][−1] is referred to, instead of the upper left boundary pixel r[−1][−1], and the boundary filter illustrated in FIG. 47(a) is applied instead of that in FIGS. 42(a) and 42(b) to derive the prediction pixel value Pred[x][y]. That is, the intra prediction image generator 310 derives the prediction image Pred[x][y] by calculation referring to the temporary prediction pixel q[x][y], the upper boundary pixel r[x][−1], and the near upper left on-boundary pixel r[0][−1] and weighted-adding (weighted-averaging).

Alternatively, the near upper right on-boundary pixel r[W−1][−1] is referred to, instead of the upper left boundary pixel r[−1][−1], and the boundary filter illustrated in FIG. 47(b) is applied instead of that in FIGS. 42(a) and 42(b) to derive the prediction pixel value Pred[x][y]. Here, W is the width of the prediction target block. That is, the intra prediction image generator 310 derives the prediction pixel value Pred[x][y] by calculation referring to the temporary prediction pixel q[x][y], the upper boundary pixel r[x][−1], and the near upper right on-boundary pixel r[W−1][−1] and weighted-adding (weighted-averaging).

FIG. 46(b) is a diagram illustrating a process for deriving the prediction pixel value Pred[x][y] at the position (x, y) within the prediction target block using the boundary filter in a case that the prediction target block shares the border with the boundary on the upper side of the tile. The blocks neighboring to the upper side of the prediction target block are outside the tile and cannot be referred to, but the pixels of the block neighboring to the left side of the prediction target block can be referred to. Thus, the near upper left left-boundary pixel r[−1][0] is referred to, instead of the upper left boundary pixel r[−1][−1], and the boundary filter illustrated in FIG. 47(c) is applied instead of that in FIGS. 42(a) and 42(b) to derive the prediction pixel value Pred[x][y]. That is, the intra prediction image generator 310 derives the prediction image Pred[x][y] by calculation referring to the temporary prediction pixel q[x][y], the left boundary pixel r[−1][y], and the near upper left left-boundary pixel r[−1][0] and weighted-adding (weighted-averaging).

Alternatively, the near lower left left-boundary pixel r[−1][H−1] is referred to, instead of the upper left boundary pixel r[−1][−1], and the boundary filter illustrated in FIG. 47(d) is applied instead of that in FIGS. 42(a) and 42(b) to derive the prediction pixel value Pred[x][y]. Here, H is the height of the prediction target block. That is, the intra prediction image generator 310 derives the prediction image Pred[x][y] by calculation referring to the temporary prediction pixel q[x][y], the left boundary pixel r[−1][y], and the near lower left left-boundary pixel r[−1][H−1] and weighted-adding (weighted-averaging).

By replacing the upper left boundary pixel r[−1][−1] with a referable pixel in this manner, even in a case that one of the left side or the upper side of the prediction target block shares the border with the tile boundary, the boundary filter can be applied while the tile is independently intra-predicted, and the coding efficiency can be increased.

Tile Boundary Boundary Filter 2

A configuration is described in which, in the unfiltered reference image configuration unit 3102 of the intra prediction image generator 310, in a case that a unfiltered reference image not referable is present, an unfiltered reference image is generated from a referable reference image to apply the boundary filter to the tile boundary. In this configuration, a boundary pixel (unfiltered reference image) r[x][y] is derived in accordance with the process including the following steps.

Step 1: In a case that r[−1][H*2−1] is not referable, pixels from x=−1, y=H*2−1 to x=−1, y=−1 are sequentially scanned. In a case that a referable reference pixel r[−1][y] is found during the scanning, the scanning is ended and r[−1][y] is configured as r[−1][H*2−1]. Subsequently, in a case that r[W*2−1][−1] is not referable, pixels from x=W*2−1, y=−1 to x=0, y=−1 are sequentially scanned. In a case that a referable reference pixel r[x][−1] is found during the scanning, the scanning is ended and r[x][−1] is configured as r[W*2−1][−1].

Step 2: Pixels from x=−1, y=H*2−2 to x=−1, y=−1 are sequentially scanned, and in a case that r[−1][y] is not referable during the scanning, r[−1][y+1] is configured as r[−1][y].

Step 3: Pixels from x=0 . . . W*2−2, y=−1 to x=0, y=−1 are sequentially scanned, and in a case that r[x][−1] is not referable, r[x+1][−1] is configured as r[x][−1].

Note that, the case that the boundary pixel r[x][y] is not referable is a case that the reference pixel is not present in the same tile as the target pixel, a case that the reference pixel is not present in the same slice as the target pixel, or a case that the reference pixel is outside a picture boundary. The above process is also referred to as a boundary pixel substitution process (unfiltered image substitution process).

The inverse quantization and inverse transform processing unit 311 dequantizes the quantized transform coefficients input from the entropy decoder 301 to find transform coefficients. The inverse quantization and inverse transform processing unit 311 performs inverse frequency transform such as inverse DCT, inverse DST, and inverse KLT on the found transform coefficients to compute a prediction residual signal. The inverse quantization and inverse transform processing unit 311 outputs the computed residual signal to the addition unit 312.

The addition unit 312 adds the prediction image of the PU input from the inter prediction image generator 309 or intra prediction image generator 310 and the residual signal input from the inverse quantization and inverse transform processing unit 311 for each pixel to generate a decoded image of the PU. The addition unit 312 outputs the decoded image of the generated block to at least any one of the deblocking filter 313, the SAO (sample adaptive offset) unit 314, or the ALF 315.

Configuration of Inter Prediction Parameter Decoder

Next, a description is given of a configuration of the inter prediction parameter decoder 303.

Figure 12:
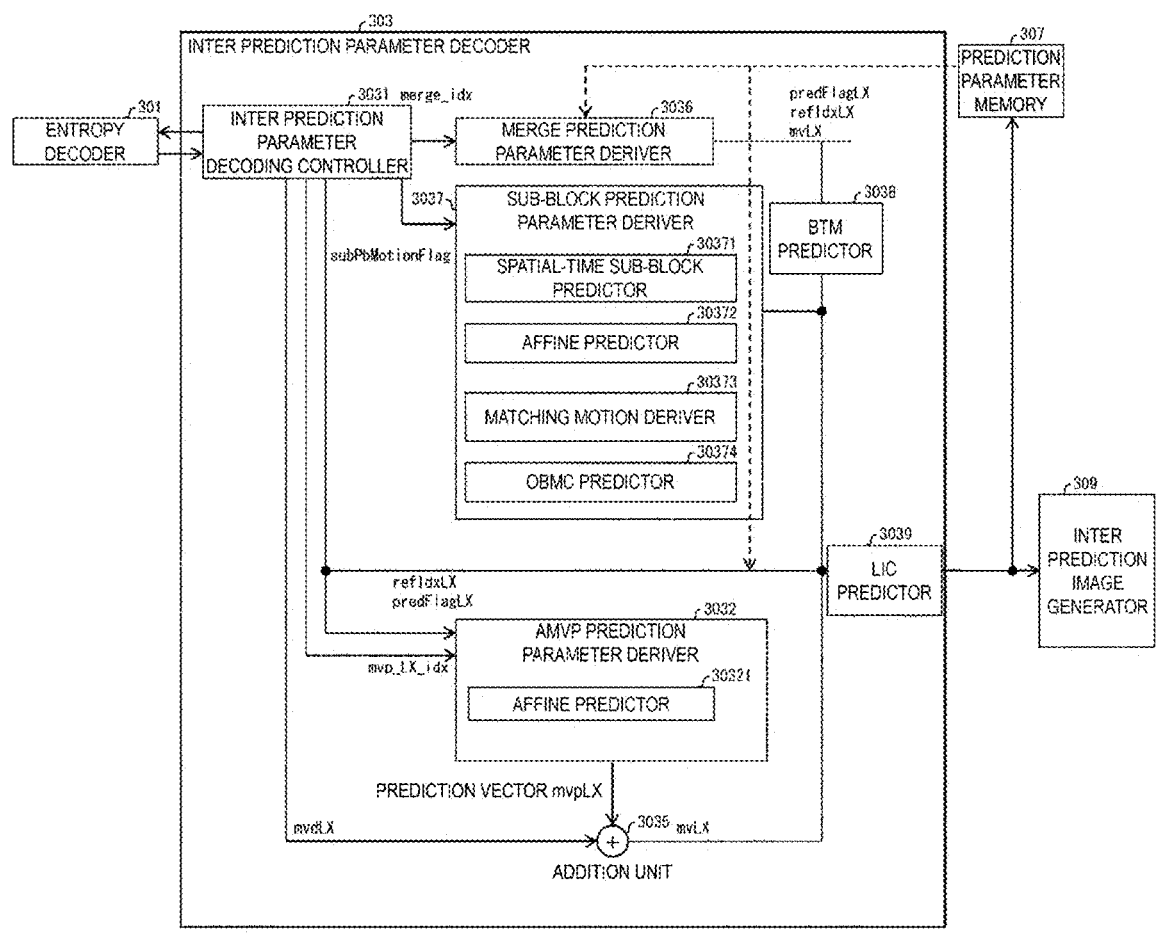
FIG. 12 is a diagram illustrating a configuration of an inter prediction parameter decoder according to the present embodiment.

FIG. 12 is a schematic diagram illustrating the configuration of the inter prediction parameter decoder 303 according to the present embodiment. The inter prediction parameter decoder 303 includes an inter prediction parameter decoding control unit 3031, an AMVP prediction parameter deriver 3032, an addition unit 3035, a merge prediction parameter deriver 3036, and a sub-block prediction parameter deriver 3037.

The inter prediction parameter decoding control unit 3031 instructs the entropy decoder 301 to decode the code (syntax element) associated with the inter prediction to extract the code (syntax element) included in the coded data, for example, the PU split mode part_mode, the merge flag merge_flag, the merge index merge_idx, the inter prediction indicator inter_pred_idc, the reference picture index ref_Idx_lX, the prediction vector index mvp_lX_idx, and the difference vector mvdLX.

The inter prediction parameter decoding control unit 3031 first extracts the merge flag merge_flag. An expression that the inter prediction parameter decoding control unit 3031 "extracts a certain syntax element" means instructing the entropy decoder 301 to decode a certain syntax element to read the syntax element from the coded data.

In a case that the merge flag merge_flag is 0, that is, indicates the AMVP prediction mode, the inter prediction parameter decoding control unit 3031 uses the entropy decoder 301 to extract the AMVP prediction parameter from the coded data. Examples of the AMVP prediction parameter include the inter prediction indicator inter_pred_idc, the reference picture index refIdxLX, the prediction vector index mvp_lX_idx, and the difference vector mvdLX. The AMVP prediction parameter deriver 3032 derives the prediction vector mvpLX from the prediction vector index mvp_lX_idx. Details will be described below. The inter prediction parameter decoding control unit 3031 outputs the difference vector mvdLX to the addition unit 3035. The addition unit 3035 adds the prediction vector mvpLX and the difference vector mvdLX to derive a motion vector.

In a case that the merge flag merge_flag is 1, that is, indicates the merge prediction mode, the inter prediction parameter decoding control unit 3031 extracts the merge index merge_idx as a prediction parameter related to the merge prediction. The inter prediction parameter decoding control unit 3031 outputs the extracted merge index merge_idx to the merge prediction parameter deriver 3036 (details of which are described later), and outputs a sub-block prediction mode flag subPbMotionFlag to the sub-block prediction parameter deriver 3037. The sub-block prediction parameter deriver 3037 splits the PU into multiple sub-blocks depending on a value of the sub-block prediction mode flag subPbMotionFlag to derive a motion vector in units of sub-block. Specifically, in the sub-block prediction mode, a prediction block is predicted in units of block as small as 4×4 or 8×8. In the tile encoder 2012 described later, for a method in which the CU is split into multiple partitions (PU of 2N×N, N×2N, N×N, and the like) and a syntax of the prediction parameter is coded in units of partition, multiple sub-blocks are brought together into one or more sets in the sub-block prediction mode and the syntax of the prediction parameter is coded for each of the sets, and therefore, motion information of many sub-blocks can be coded using a small amount of codes.

To be more specific, the sub-block prediction parameter deriver 3037 includes at least one of a spatial-temporal sub-block predictor 30371, an affine predictor 30372, a matching motion deriver 30373, and an OBMC predictor 30374 that perform sub-block prediction in the sub-block prediction mode.

Sub-Block Prediction Mode Flag

Here, a method, in the tile decoder 2002 and the tile encoder 2012 (details will be described later), for deriving the sub-block prediction mode flag subPbMotionFlag which indicates whether a prediction mode for a certain PU is the sub-block prediction mode will be described. The tile decoder 2002 and the tile encoder 2012 derive the sub-block prediction mode flag subPbMotionFlag, based on which of a spatial sub-block prediction SSUB, a temporal sub-block prediction TSUB, an affine prediction AFFINE, and a matching motion derivation MAT described later is used. For example, in a case that a prediction mode selected for a certain PU is N (for example, N is a label indicating the selected merge candidate), the sub-block prediction mode flag subPbMotionFlag may be derived by the following expression.

subPbMotionFlag=(N==TSUB)||(N==SSUB)||
(N==AFFINE)||(N==MAT)

Here, || represents a logical sum (this similarly applies below).

The tile decoder 2002 and the tile encoder 2012 may be configured to perform some of the spatial sub-block prediction SSUB, the temporal sub-block prediction TSUB, the affine prediction AFFINE, the matching motion derivation MAT, and the OBMC prediction OBMC. In other words, in a case that the tile decoder 2002 and the tile encoder 2012 are configured to perform the spatial sub-block prediction SSUB and the affine prediction AFFINE, the sub-block prediction mode flag subPbMotionFlag may be derived as described below.

subPbMotionFlag=(N==SSUB)||(N==AFFINE)

Figure 7:
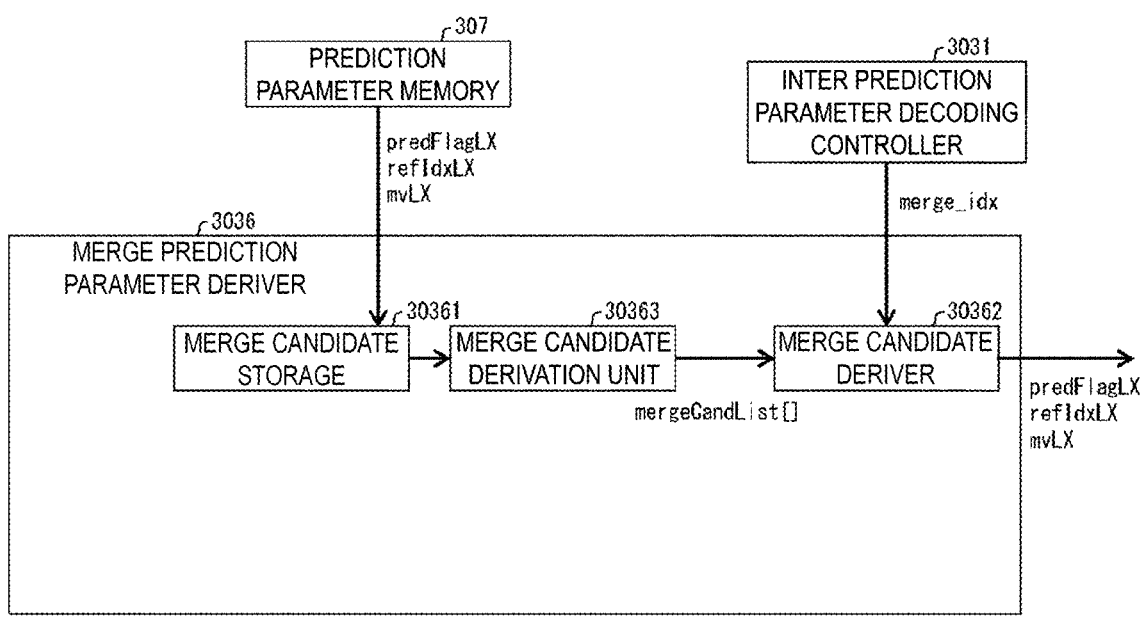
FIG. 7 is a diagram illustrating a configuration of a merge prediction parameter deriver according to the present embodiment.

FIG. 7 is a schematic diagram illustrating a configuration of the merge prediction parameter deriver 3036 according to the present embodiment. The merge prediction parameter deriver 3036 includes a merge candidate deriver 30361, a merge candidate selection unit 30362, and a merge candidate storage 30363. The merge candidate storage 30363 stores therein merge candidates input from the merge candidate deriver 30361. Note that the merge candidate includes the prediction list utilization flag predFlagLX, the motion vector mvLX, and the reference picture index refIdxLX. The merge candidate stored in the merge candidate storage 30363 is assigned with an index according to a prescribed rule.

The merge candidate deriver 30361 uses, without change, a motion vector and reference picture index refIdxLX of a neighboring PU already subjected to the decoding process to derive a merge candidate. The affine prediction may be used as another way to derive a merge candidate. This method is described below in detail. The merge candidate deriver 30361 may use the affine prediction for spatial merge candidate derivation process, temporal merge candidate derivation process, combined merge candidate derivation process, and zero merge candidate derivation process which are described later. Note that the affine prediction is performed in units of sub-block, and the prediction parameter is stored in the prediction parameter memory 307 for each sub-block. Alternatively, the affine prediction may be performed in units of pixel.

Spatial Merge Candidate Derivation Process

In the spatial merge candidate derivation process, the merge candidate deriver 30361 reads out the prediction parameter (prediction list utilization flag predFlagLX, motion vector mvLX, reference picture index refIdxLX) stored in the prediction parameter memory 307 according to a prescribed rule, derives a merge candidate as the read out prediction parameter, and stores the merge candidate in a merge candidate list mergeCandList[ ] (prediction vector candidate list mvpListLX[ ]). The read out prediction parameters are prediction parameters related to each of the PUs in a predefined range from the decoding target PU (for example, all or some of PUs adjoining lower left ends L and BL, upper left end AL, and upper right ends A and AR of the decoding target PU illustrated in FIG. 21(b)).

Temporal Merge Candidate Derivation Process

In a temporal merge derivation process, the merge candidate deriver 30361 reads out, in the reference picture illustrated in FIG. 21(c), the prediction parameter for a lower right (block BR) of the collocated block or a block (block C) including the coordinates of the center of the decoding target PU from the prediction parameter memory 307, and stores the read out prediction parameter as a merge candidate in the merge candidate list mergeCandList[ ]. The block BR, whose motion vector is farther from a position of the block that is to be a spatial merge candidate than a motion vector of the block C, is more likely to have a motion vector different from a motion vector of the spatial merge candidate. Thus, the block BR is added to the merge candidate list mergeCandList[ ] on a priority basis, and in a case that the block BR does not have a motion vector (for example, an intra prediction block) or in a case that the block BR is located outside the picture, the motion vector for the block C is added to the prediction vector candidate. The addition of a different motion vector as a prediction candidate increases the prediction vector option and increases the coding efficiency. As a method of specifying the reference picture, the reference picture index refIdxLX specified in the slice header may be used, or a minimum one of the reference picture indices refIdxLX of the PUs neighboring to the decoding target PU may be used to indicate the reference picture, for example.

For example, the merge candidate deriver 30361 may derive the position of the block C (xColCtr, yColCtr) and the position of the block BR (xColBr, yColBr) according to the following expression.

$xColCtr = xPb + (W >> 1)$ $yColCtr = yPb + (H >> 1)$ $xColBr = xPb + W$ $yColBr = yPb + H$ (Expression BR0)

where, (xPb, yPb) represents the upper left coordinates of the target block, and (W, H) represents the width and height of the target block.

Note that a block X refers to a block on a reference picture including a position X, and prediction parameters (motion vector, reference picture list, or the like) of the block X indicate prediction parameters belonging to the block X.

Tile Boundary BR, BRmod

Here, the block BR, which is one of the blocks referred to as the temporal merge candidate illustrated in FIG. 21(c), is positioned outside the tile as illustrated in FIG. 21(e) in a case that the target block is located at the right end of the tile as illustrated in FIG. 21(d). Thus, the merge candidate deriver 30361 may configure the position of the block BR to the lower right in the collocated block as illustrated in FIG. 21(f). This position is also referred to as BRmod. The position of BRmod (xColBr, yColBr) may be derived, for example, at a block boundary position according to the following expression.

$$xColBr = xPb + W - 1$$

$$yColBr = yPb + H - 1 \quad \text{(Expression BR1)}$$

Furthermore, to make the position of BRmod a multiple of the M-th power of 2, a process of left shifting may be added after right shifting described below. For example, M may be preferably 2, 3, 4, or the like. In a case that this restricts the position of reference to the motion vector, the memory required to store the motion vector can be reduced.

$$xColBr = ((xPb + W - 1) >> M) << M$$

$$yColBr = ((yPb + H - 1) >> M) << M \quad \text{(Expression BR2)}$$

Figure 49:
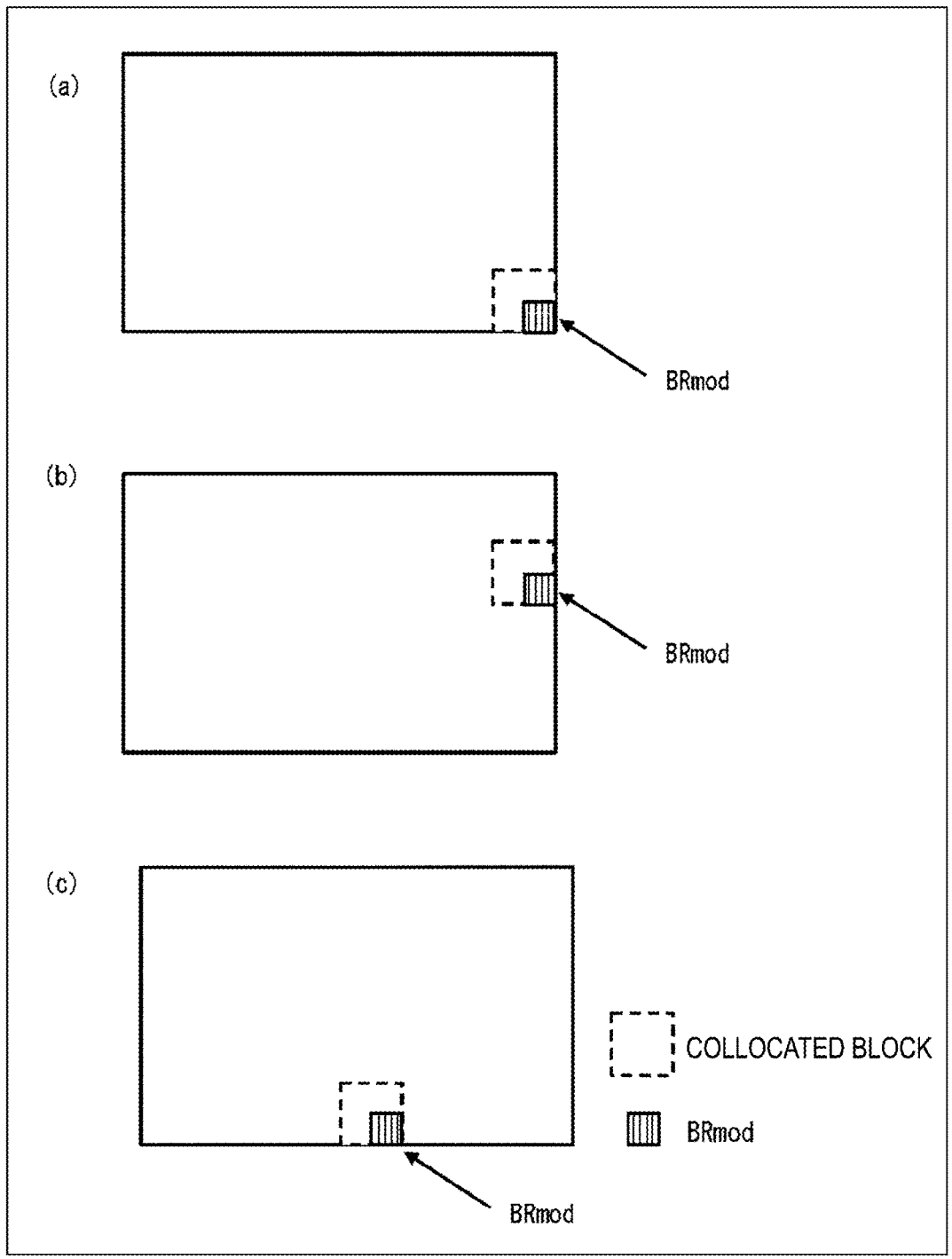
FIG. 49 is another diagram illustrating a positional relationship of a tile boundary, a target block, and a reference block.

The merge candidate deriver 30361 may derive the position of the reference block BRmod by (Expression BR1) and (Expression BR2), as in FIGS. 49(a) and 49(c), even in a case that the target block (collocated block) is located at the lower right end or the lower end of the tile.

Figure 50:
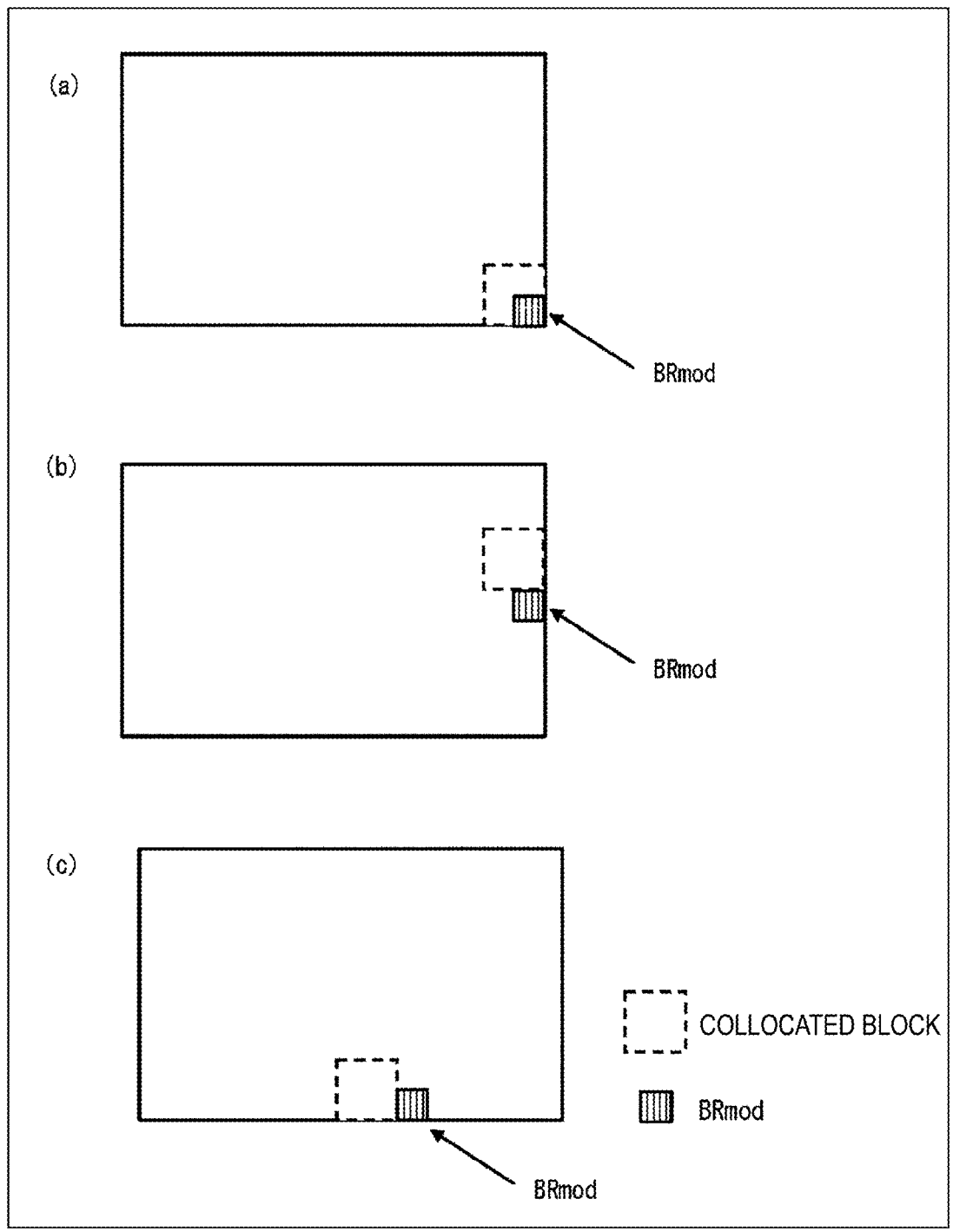
FIG. 50 is another diagram illustrating a positional relationship of a tile boundary, a target block, and a reference block.

The merge candidate deriver 30361 may derive the position of BRmod (xColBr, yColBr) by the following expressions indicating the position within the block boundary, as in FIG. 50(b), in the case that the target block (collocated block) is located at the right end of the tile.

$$xColBr = xPb + W - 1$$

$$yColBr = yPb + H \quad \text{(Expression BR1')}$$

Also in (Expression BR1'), the position may be configured as a multiple of the M-th power of 2 (position within a round block).

$$xColBr = ((xPb + W - 1) >> M) << M$$

$$yColBr = ((yPb + H) >> M) << M \quad \text{(Expression BR2')}$$

The merge candidate deriver 30361 may derive the position of BRmod (xColBr, yColBr) by the following expressions indicating the position within the block boundary, as in FIG. 50(c), in the case that the target block is located at the lower end of the tile.

$$xColBr = xPb + W$$

$$yColBr = yPb + H - 1 \quad \text{(Expression BR1'')}$$

or $$xColBr = ((xPb + W) >> M) << M$$

$$yColBr = ((yPb + H - 1) >> M) << M \quad \text{(Expression BR2'')}$$

Since the block outside the tile is not referred to at the position within the block boundary or the position within the round block, the block BR (or BRmod) in the lower right position can be referred to as a temporal merge candidate. For example, assuming that a function that derives TileId at a certain position (x, y) is getTileID(x, y), getTileID(xColBr, yColBr)!=getTileID(xPb, yPb) holds, which can be applied to the case that "TileId of the tile containing BR" is different from "TileId of the tile containing the target block", but the position of BR (BRmod) may be derived according to any of the above expressions. In the case of independent_tile_flag=1, the lower right BRmod within the collocated block may be configured. For example, the merge candidate deriver 30361 may derive the block BR at a block boundary position (Expression BR0) in the case of independent_tile_flag=0, or derive the block BR at positions (Expression BR1), (Expression BR1'), and (Expression BR1'') within the block boundary in the case of independent_tile_flag=1. The round positions (Expression BR2), (Expression BR2'), and (Expression BR2'') may be used as the positions within the block boundary.

In summary, in a case that the upper left coordinates of the target tile are (xTs, yTs) and the width and height of the target tile are wT and hT, the lower right position can be derived as follows.

if $((xPb+W<xTs+wT) \&\& (yPb+H<yTs+hT))$ $$xColBr = xPb + W$$

$$yColBr = yPb + H \quad \text{(Expression BR0)}$$

else if $(yPb+H<yTs+hT)$ $$xColBr = xPb + W - 1$$

$$yColBr = yPb + H \quad \text{(Expression BR1')}$$

else if $(xPb+W<xTs+wT)$ $$xColBr = xPb + W$$

$$yColBr = yPb + H - 1 \quad \text{(Expression BR1'')}$$

else $$xColBr = xPb + W - 1$$

$$yColBr = yPb + H - 1 \quad \text{(Expression BR1)}$$

For the above positions (Expression BR1), (Expression BR1'), and (Expression BR1''), the positions (Expression BR2), (Expression BR2'), and (Expression BR2'') after rounding may be used.

In this way, the lower right block position of the collocated block is configured as the position BRmod within the collocated tile illustrated in FIG. 21(f) and the like so that in the case of independent_tile_flag=1, the tile sequence can be independently decoded without decreasing the coding efficiency using the merge prediction in the time direction.

Combined Merge Candidate Derivation Process

In the combined merge derivation process, the merge candidate deriver 30361 combines motion vectors and reference picture indices of two different derived merge candidates which are already derived and stored in the merge candidate storage 30363 as motion vectors for L0 and L1, respectively to derive a combined merge candidate, and stores the derived combined merge candidate in the merge candidate list mergeCandList[ ].

Note that in a case that the motion vector derived in the above-described spatial merge candidate derivation process, temporal merge candidate derivation process, and combined merge candidate derivation process points to even a part of the outside of the collocated tile of the tile where the target block is located, the motion vector may be clipped and corrected to point only to an inside of the collocated tile. This process requires the tile encoder 2002 and the tile decoder 2012 to select the same process.

Zero Merge Candidate Derivation Process

In the zero merge candidate derivation process, the merge candidate deriver 30361 derives a merge candidate which has a reference picture index refIdxLX of 0 and both an X component and Y component of 0 of a motion vector mvLX, and stores the derived merge candidate in the merge candidate list mergeCandList[ ].

The merge candidate derived by the merge candidate deriver 30361 is stored in the merge candidate storage 30363. The order of storing in the merge candidate list mergeCandList[ ] is {L, A, AR, BL, AL, BR/C, a combined merge candidate, and a zero merge candidate}. L, A, AR, BL, AL, BR/C are prediction parameters for the blocks at the positions illustrated in FIGS. 21(b) and 21(c). BR/C means that in a case that the block BR is not available, the block C is used. Alternatively, in a case of performing the sub-block prediction described later, the order of storing in the merge candidate list mergeCandList[ ] is {L, A, AR, BL, ATMVP, STMVP, AL, TMVP (BR/C), a combined merge candidate, and a zero merge candidate} in FIG. 24. Note that reference blocks not available (block outside the tile, intra prediction, etc.) are not stored in the merge candidate list.

In a case that the motion vectors stored in the merge candidate list mergeCandList[ ] which includes multiple motion vectors that refer to the padding region illustrated in FIG. 21(a), the merge candidate deriver 30361 may leave the motion vector initially stored in the merge candidate list, and remove the other motion vectors referring to the padding regions from the merge candidate list. Alternatively, the merge candidate deriver 30361, in a case of storing the motion vector in the merge candidate list, may check whether the motion vector points to the padding region, and not to store the motion vectors pointing to the second and subsequent padding regions in the merge candidate list mergeCandList[ ].

Alternatively, in a case that multiple motion vectors pointing to the padding region are stored in the merge candidate list mergeCandList[ ], the merge candidate deriver 30361 may leave a minimum motion vector among the multiple motion vectors pointing to the padding region and remove other motion vectors from the merge candidate list. A magnitude of the motion vector is calculated, for example, from a sum of absolute values of the horizontal and vertical components of the motion vector. Alternatively, the merge candidate deriver 30361 may leave a motion vector the closest to the tile boundary among the multiple motion vectors pointing to the padding region and remove the other motion vectors from the merge candidate list.

The merge candidate selection unit 30362 selects, as an inter prediction parameter for the target PU, a merge candidate assigned with an index corresponding to the merge index merge_idx input from the inter prediction parameter decoding control unit 3031, among the merge candidates stored in the merge candidate list mergeCandList[ ] of the merge candidate storage 30363. The merge candidate selection unit 30362 stores the selected merge candidate in the prediction parameter memory 307 and outputs the merge candidate to the prediction image generator 308.

Sub-Block Predictor

Next, a sub-block predictor will be described.

Time Space Sub-Block Predictor 30371

The spatial-temporal sub-block predictor 30371 derives a motion vector of a sub-block obtained by splitting the target PU, from a motion vector of a PU on the reference picture (for example, the immediately preceding picture) temporally neighboring to the target PU, or a motion vector of a PU spatially neighboring to the target PU. Specifically, by scaling the motion vector of the PU on the reference picture based on the reference picture referred to by the target PU, a motion vector spMvLX[xi][yi] (xi=xPb+BW*i, yj=yPb+BH*j, i=0, 1, 2, . . . , W/BW−1, j=0, 1, 2, . . . , H/BH−1) of each sub-block in the target PU is derived (temporal sub-block prediction). Here, (xPb, yPb) represents the upper left coordinates of the target PU, W and H represent the size of the target PU, and BW and BH represent the size of the sub-block.

Additionally, by calculating a weighted average of a motion vector of a PU neighboring to the target PU in accordance with a distance from a sub-block obtained by splitting the target PU, the motion vector spMvLX[xi][yi] (xi=xPb+BW*i, yj=yPb+BH*j, i=0, 1, 2, . . . , W/BW−1, j=0, 1, 2, . . . , H/BH−1) of each sub-block in the target PU may be derived (spatial sub-block prediction).

The temporal sub-block prediction candidate TSUB or the spatial sub-block prediction candidate SSUB is selected as one mode of the merge mode (merge candidate).

As specific spatial-temporal sub-block prediction methods, Adaptive Temporal Motion Vector Prediction (ATMVP) and Spatial-Temporal Motion Vector Prediction (STMVP) will be described.

Motion Vector Scaling

First, a method for deriving a scaling of a motion vector is described. Assuming a motion vector Mv, a picture Pic1 including a block having a motion vector Mv, a reference picture Pic2 of the motion vector Mv, a post-scaling motion vector sMv, a picture Pic3 including a block having a post-scaling motion vector sMv, and a reference picture Pic4 referred to by the post-scaling motion vector sMv, a derivative function MvScale(Mv, Pic1, Pic2, Pic3, Pic4) of sMv is represented by the following expression.

$$sMv2=MvScale(Mv,Pic1,Pic2,Pic3,Pic4)=Clip3(-R1, R1-1,\text{sign}(distScaleFactor*Mv)*((abs (distScaleFactor*Mv)+round1-1)>>shift1))$$

$$distScaleFactor=Clip3(-R2,R2-1,(tb*tx+ round2)>>shift2)$$

$$tx=(16384+abs(td)>>1)/td$$

$$td=DiffPicOrderCnt(Pic1,Pic2)$$

$$tb=DiffPicOrderCnt(Pic3,Pic4) \quad \text{(Expression MVSCALE-1)}$$

Here, round1, round2, shift1, and shift2 are rounded and shifted values for division using an inverse, and are, for example, round1=1<<(shift1−1), round2=1<<(shift2−1), shift1=8, shift2=6, and so on. DiffPicOrderCnt(Pic1, Pic2) is a function that returns a difference in time information (for example, POC) between Pic1 and Pic2. R1 and R2 restrict a range of values to perform the process with limited accuracy, and are, for example, R1=32768, R2=4096, and so on.

A scaling function MvScale(Mv, Pic1, Pic2, Pic3, Pic4) may also be the following expression.

MvScale(Mv,Pic1,Pic2,Pic3,Pic4)=
 Mv*DiffPicOrderCnt(Pic3,Pic4)/DiffPicOrder-
 Cnt(Pic1,Pic2)  (Expression MVSCALE-2)

That is, Mv may be scaled depending on a ratio of the difference in the time information between Pic1 and Pic2 to the difference in the time information between Pic3 and Pic4.

ATMVP, Tile Boundary ATMVP

The ATMVP is a scheme in which a motion vector is derived for each sub-block of a target block based on motion vectors of spatial neighboring blocks (L, A, AR, BL, AL) of the target block of the target picture PCur illustrated in FIG. 21(b) to generate a prediction image in units of sub-block, and is performed in the following procedure and is processed in the following procedure.

Step 1) Initial Vector Derivation

An initial available neighboring block is determined in the order of the spatial neighboring blocks L, A, AR, BL, and AL. In a case that an available neighboring block is found, then a motion vector and reference picture included in that block are transferred to step 2 as an initial vector IMV and an initial reference picture IRef of the ATMVP. In a case that all neighboring blocks are not available (non available), the ATMVF is turned off and the process is terminated. The meaning of "ATMVP is turned off" is that the motion vector by the ATMVP is not stored in the merge candidate list.

Here, the meaning of "available neighboring block" is that, for example, the position of the neighboring block is contained in the target tile, and the neighboring block includes a motion vector.

Step 2) Initial Vector Tile Boundary Check

Whether or not the block referred to by the target block using IMV is within the collocated tile on the initial reference picture IRef is checked. In a case that this block is within the collocated tile, the IMV and the IRef are transferred to step 3 as a block level motion vector BMV and reference picture BRef, respectively, of the target block. In a case that the block is not within the collocated tile, whether or not a block that is referred to using sIMV derived from IMV using the scaling function MvScale(IMV, PCur, IRef, PCur, RefPicListX[refIdx]) is within the collocated tile is checked, on a reference picture RefPicListX[RefIdx] (RefIdx=0 . . . the number of reference pictures−1) stored in the reference picture list RefPicListX. In a case that this block is within the collocated tile, the sIMV and the RefPicListX [RefIdx] are transferred to step 3 as a block level motion vector BMV and reference picture BRef, respectively, of the target block.

Note that in a case that no such block is found in all reference pictures stored in the reference picture list, the ATMVF is turned off and the process is terminated.

Step 3) Sub-Block Motion Vector

Figure 22:
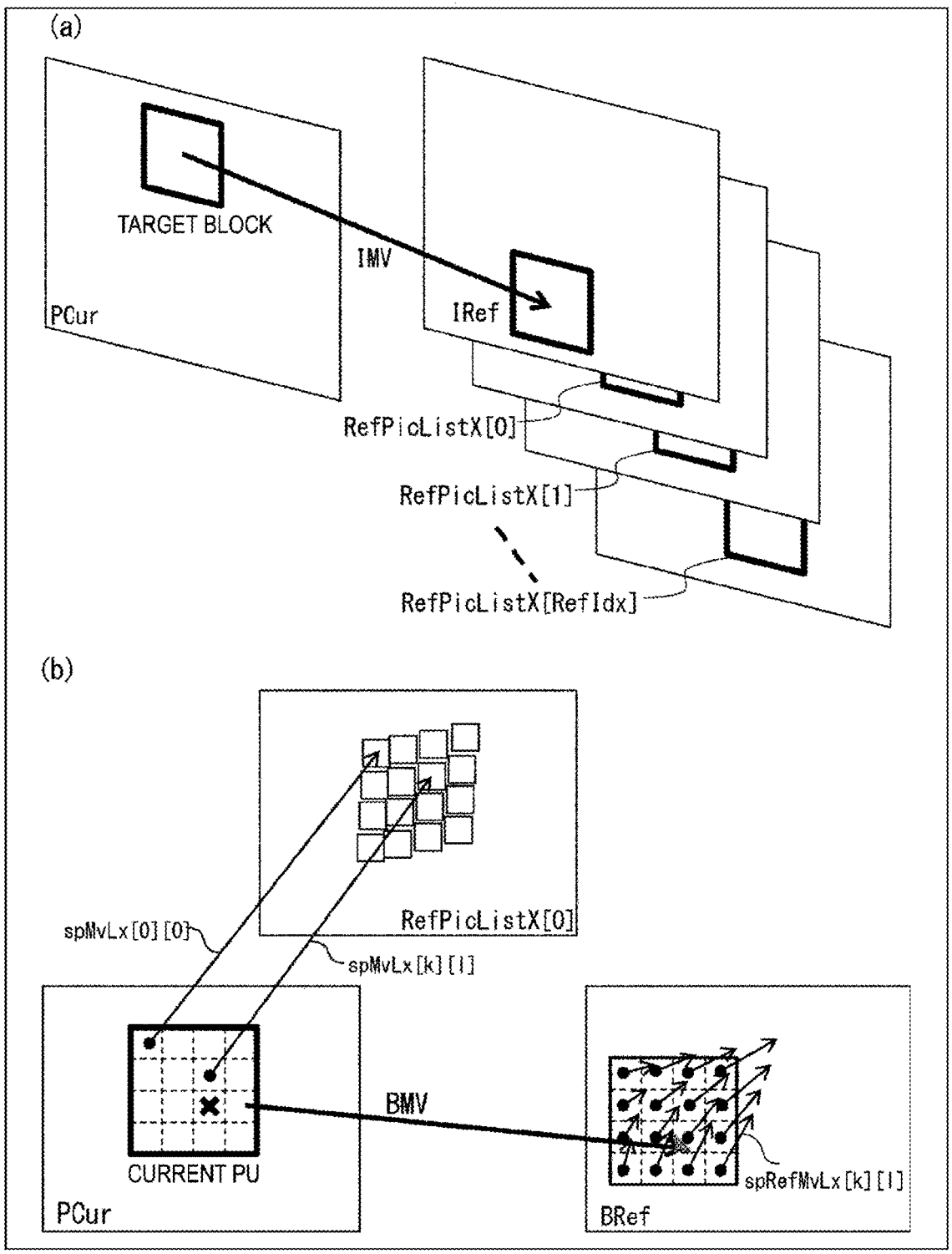
FIG. 22 is a diagram illustrating an ATMVP process.

As illustrated in FIG. 22(b), on the reference picture BRef, a block at a position shifted from the target block by the motion vector BMV is split into sub-blocks to obtain information on a motion vector SpRefMvLX[k][l] (k=0 . . . NBW−1, l=0 . . . NBH−1) and a reference picture SpRef [k][l] included in each sub-block. Here, NBW and NBH represent the numbers of horizontal and vertical sub-blocks, respectively. In a case that a certain sub-block (k1, l1) includes no motion vector, the block level motion vector BMV and reference picture BRef are set as a motion vector SpRefMvLX[k1][l1] and a reference picture SpRef[k1][l1] of the sub-block (k1, l1).

Step 4) Motion Vector Scaling

A motion vector SpMvLX[k][l] of each sub-block on the target block is derived by the scaling function MvScale( ) from the motion vector SpRefMvLX[k][l] and the reference picture SpRef[k][l] of each sub-block on the reference picture.

SpMvLX[k][l]=MvScale(SpRefMvLX[k][l],Bref,SpRef
 [k][l],PCur,RefPicListX[refIdx0])  (Expression ATMVP-1)

where, RefPicListX[refIdx0]) represents a sub-block level reference picture of the target block, and for example, reference picture RefPicListX[refIdxATMVP] or refIdx-ATMVP=0 is applied.

Note that the sub-block level reference picture of the target block may be a reference picture indicated by an index (collocated_ref_idx) used in the prediction motion vector derivation in the time direction signaled in the slice header, as illustrated in FIG. 18(c), rather than the reference picture RefPicListX[refIdx0]. In this case, the sub-block level reference picture of the target block is RefPicListX[collocated_ref_idx], and the calculation expression for the sub-block level motion vector SpMvLX[k][l] of the target block is described below.

SpMvLX[k][l]=MvScale(SpRefMvLX[k][l],Bref,SpRef
 [k][l],PCur,RefPicListX[collocated_
 ref_idx]))  (Expression ATMVP-2)

Step 5) Sub-Block Vector Tile Boundary Check

In the sub-block level reference picture of the target block, whether or not the sub-block to which the target sub-block refers using SpMvLX[k][l] is within the collocated tile is checked. In a case that a destination to which a sub-block motion vector SpMvLX[k2][l2] points is not within the collocated tile in a certain sub-block (k2, l2), any of the following processes 1 (process 1A to process 1D) is performed.

[Process 1A] Tile Boundary Padding

The tile boundary padding (padding outside tile) is achieved by clipping the reference position at the positions of the boundary pixels on the top, bottom, right, and left of the tile as already described above. For example, assuming that upper left coordinates of a target sub-block relative to upper left coordinates of a picture are (xs, ys), a width and height of the target sub-block are BW and BW, respectively, upper left coordinates of a target tile in which the target sub-block is located are (xTs, yTs), a width and height of the target tile are wT and hT, respectively, and a motion vector is spMvLX[k2][l2], a sub-block level reference pixel (xRef, yRef) is derived according to the following expression.

xRef+i=Clip3(xTs,xTs+wT−1,xs+(SpMvLX[k2]
 [l2][0]>>log 2(M))+i)

yRef+j=Clip3(yTs,yTs+hT−1,ys+(SpMvLX[k2]
 [l2][1]>>log 2(M))+j)  (Expression ATMVP-3)

[Process 1B] Tile Boundary Motion Vector Restriction (Motion Vector Restriction Outside Tile)

The sub-block motion vector SpMvLX[k2][l2] is clipped so that the sub-block level motion vector SpMvLX[k2][l2] does not refer to the outside of the tile. The tile boundary motion vector restriction is as described above.

[Process 1C] Tile Boundary Motion Vector Replacement (Replacement Outside Tile Motion Vector with Substitution)

In a case that a destination to which the sub-block motion vector SpMvLX[k2][l2] points is not within the collocated tile, the substitution motion vector SpMvLX[k3][l3] within the collocated tile is copied. For example, (k3, l3) may be a sub-block neighboring to (k2, l2) or a center of the block.

SpMvLX[k2][l2][0]=SpMvLX[k3][l3][0]

SpMvLX[k2][l2][1]=SpMvLX[k3][l3][1]  (Expression ATMVP-4)

[Process 1D] Tile Boundary ATMVP Off (ATMVP Outside Tile Off)

In a case that the number of sub-blocks exceeds a prescribed threshold, and a destination to which the sub-block motion vector SpMvLX[k2][l2] points is not within the collocated tile for each of the sub-blocks, the ATMVP is turned off and the process is terminated. For example, the prescribed threshold may be ½ of the total number of sub-blocks within the target block.

Note that the process 1 requires the tile encoder 2002 and the tile decoder 2012 to select the same process.

Step 6) The ATMVP is stored in the merge candidate list. An example of the order of the merge candidates stored in the merge candidate list is illustrated in FIG. 24. From among this list, the merge_idx derived by the inter prediction parameter decoding control unit 3031 is used to select a merge candidate for the target block.

In a case that the ATMVP is selected as a merge candidate, an image on a reference picture RefPicListX[refIdx-ATMVP] shifted from each sub-block of the target block by SpMvLX[k][l] and sets the read out image as a prediction image, as illustrated in FIG. 22(b).

Figure 23:
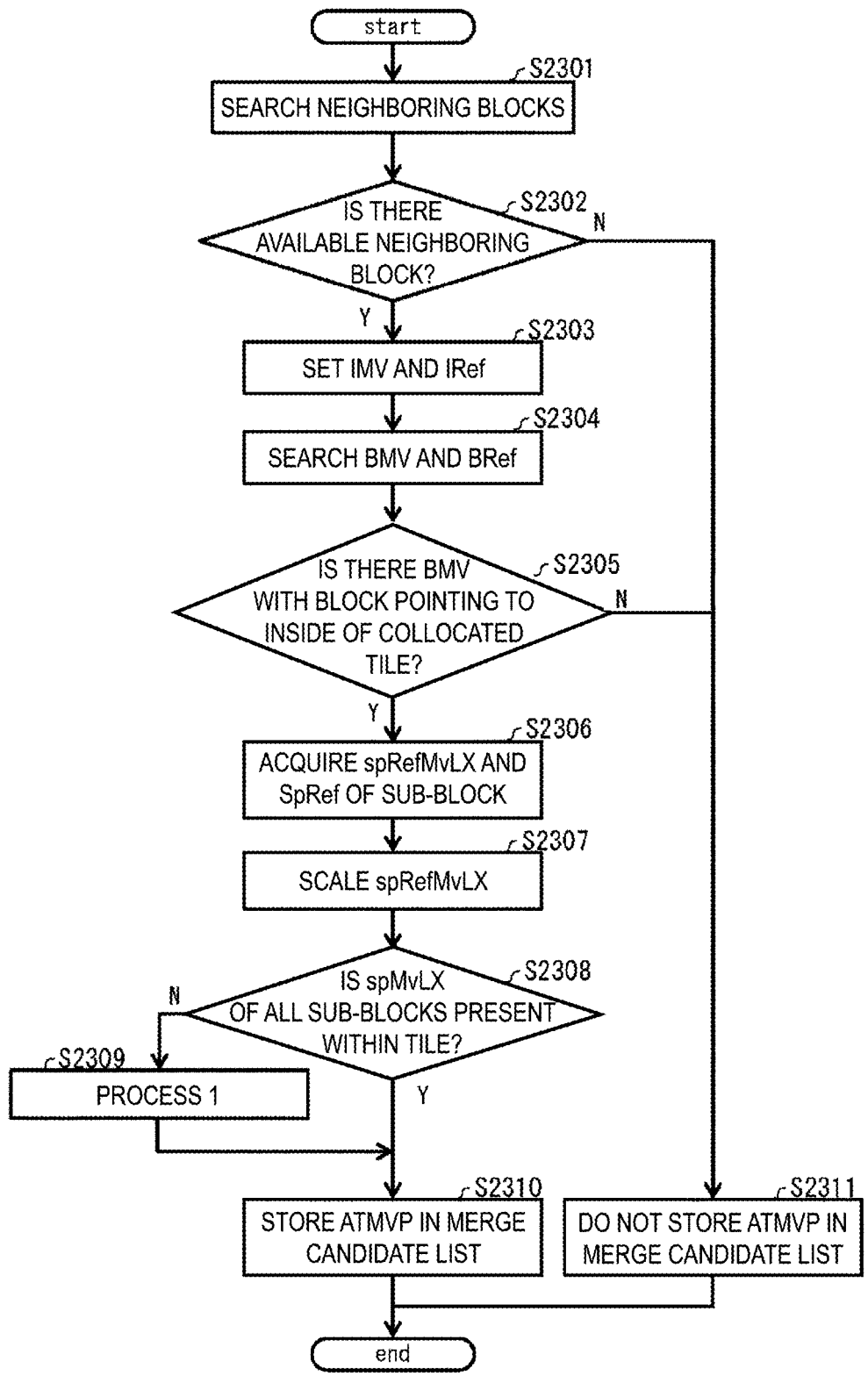
FIG. 23 is a flowchart illustrating operation of the ATMVP process.

The merge candidate list derivation process for the ATMVP described in step 1) to step 6) above will be described with reference to the flowchart in FIG. 23.

The spatial-temporal sub-block predictor 30371 searches five neighboring blocks of the target block (S2301).

The spatial-temporal sub-block predictor 30371 determines the presence or absence of the initial available neighboring block, and proceeds to S2303 in a case that there is an available neighboring block or proceeds to S2311 in a case that there is no available neighboring block (S2302).

The spatial-temporal sub-block predictor 30371 configures the motion vector and reference picture included in the available neighboring block as the initial vector IMV and initial reference picture IRef of the target block (S2303).

The spatial-temporal sub-block predictor 30371 searches the block based motion vector BMV and reference picture BRef of the target block, based on the initial vector IMV and initial reference picture IRef of the target block (S2304).

The spatial-temporal sub-block predictor 30371 determines the presence or absence of the block-based motion vector BMV with the reference block pointing to the inside of the collocated tile, and in a case that the BMV is present, acquires the BRef and proceeds to S2306, or in a case that the BMV is not present, proceeds to S2311 (S2305).

The spatial-temporal sub-block predictor 30371 acquires the sub-block based motion vector SpRefMvLX[k][l] and reference picture SpRef [k][l] of the collocated block using the block based motion vector BMV and reference picture BRef of the target block (S2306).

The spatial-temporal sub-block predictor 30371 uses the motion vector SpRefMvLX[k][l] and the reference picture SpRef to derive the sub-block based motion vector spMvLX [k][l] of the target block by scaling in a case that the reference picture is configured as RefPicListX[refIdx-ATMVP] (S2307).

The spatial-temporal sub-block predictor 30371 determines whether or not all blocks to each of which the motion vector spMvLX[k][l] points refer to the inside of the collocated tile on the reference picture RefPicListX[refIdx-ATMVP]. In a case that all blocks refer only to the inside of the collocated tile, the process proceeds to S2310, otherwise proceeds to S2309 (S2308).

The spatial-temporal sub-block predictor 30371, in a case that at least a part of the block shifted by the motion vector spMvLX[k][l] is outside the collocated tile, copies a sub-block level motion vector of a neighboring sub-block having a sub-block level motion vector of which the sub-block after the shift is within the collocated tile (S2309).

The spatial-temporal sub-block predictor 30371 stores an ATMVP motion vector in the merge candidate list mergeCandList[ ] illustrated in FIG. 24 (S2310).

The spatial-temporal sub-block predictor 30371 does not store an ATMVP motion vector in the merge candidate list mergeCandList[ ] (S2311).

Note that, in addition to copying the motion vector of the neighboring block, the process in S2309 may be the padding process on the tile boundary of the reference picture or the clipping process on the sub-block level motion vector of the target block as described in 5). In a case that the number of sub-blocks that are not available is greater than a prescribed threshold, the ATMVP may be turned off and the process may proceed to S2311.

The above process derives the merge candidate list for the ATMVP.

By deriving the ATMVP motion vector to generate the prediction image in this manner, the reference pixel is replaced by the pixel value in the collocated tile, even in a case that the motion vector points to the outside of the collocated tile in the inter prediction, and therefore, the tile can be independently inter-predicted. Thus, even in a case that some of the reference pixels are not included in the collocated tile, the ATMVP can be selected as one of the merge candidates. Then, in a case that the performance is higher than that of a merge candidate other than the ATMVP, the ATMVP can be used to generate the prediction image, so the coding efficiency can be increased.

STMVP

The STMVP is a scheme in which a motion vector is derived for each sub-block of a target block, based on motion vectors of spatial neighboring blocks (a, b, c, d, . . . ) of the target block of the target picture PCur illustrated in FIG. 25(a) and collocated blocks (A', B', C', D', . . . ) of the target block illustrated in FIG. 25(b) to generate a prediction image in units of sub-block. FIG. 25(a) is an example of sub-blocks A, B, C, and D obtained by splitting a target block. Reference signs A', B', C', and D' in FIG. 25(b) represent the collocated blocks of the sub-blocks A, B, C, and D, respectively, in FIG. 25(a). Reference signs Ac', Bc', Cc', and Dc' in FIG. 25(b) represent regions centered at the collocated blocks A', B', C', and D', respectively, and reference signs A'br, B'br, C'br, and D'br represent regions located at the lower right of the collocated blocks A', B', C', and D', respectively. Note that the regions A'br, B'br, C'br, and D'br may not be at the lower right positions outside the collocated blocks A', B', C', and D', respectively, illustrated in FIG. 25(b), but may be at the lower right positions inside the of the collocated blocks A', B', C', and D', respectively, illustrated in FIG. 25(g). In FIG. 25(g), the regions A'br, B'br, C'br, and D'br are located within the collocated tile. The STMVP is performed in the following procedure.

Step 1) A target block is split into sub-blocks, and an initial available block is determined from an upper neighboring block of the sub-block A in the right direction. In a case that an available neighboring block is found, then a motion vector and reference picture included in the initial block are taken as a STMVP upper vector mvA_above and reference picture RefA_above, and a count cnt=1 is set. In a case that no available neighboring block is found, the count cnt=0 is set.

Step 2) An initial available block is determined from a left neighboring block b of the sub-block A in the downward direction. In a case that an available neighboring block is found, then a motion vector and reference picture included in the initial block are taken as a left vector mvA_left and reference picture RefA_left, and the count cnt is incremented by one. In a case that no available neighboring block is found, the count cnt is not updated.

Step 3) In the collocated block A' of the sub-block A, whether or not the lower right position region A'br and a region A'c are available is checked in this order. In a case that an available region is found, then an initial motion vector and reference picture included in that block are taken as a collocated vector mvA_col and reference picture RefA_col, and the count is incremented by one. In a case that no available block is found, the count cnt is not updated.

Step 4) In a case of cnt=0 (there is no available motion vector), the STMVP is turned off and the process is terminated.

Step 5) In a case that ctn is not zero, the time information of the target picture PCur and the reference picture RefPicListX[collocated_ref_idx] of the target block is used to scale the available motion vectors found in step 1) to step 3). The scaled motion vectors are represented by smvA_above, smvA_left, and smvA_col.

smvA_above=MvScale(mvA_above,PCur,RefA_above,PCur,RefPicListX[collocated_ref_idx])

smvA_left=MvScale(mvA_left,PCur,RefA_left,PCur,RefPicListX[collocated_ref_idx])

smvA_col=MvScale(mvA_col,PCur,RefA_col,PCur,RefPicListX [collocated_ref_idx])　　(Expression STMVP-1)

The unavailable motion vector is set to 0.

Here, the scaling function MvScale(Mv, Pic1, Pic2, Pic3, Pic4) is a function for scaling the motion vector My as described above.

Step 6) An average of smvA_above, smvA_left, and smvA_col is calculated and set as a motion vector spMvLX [A] of the sub-block A. The reference picture of the sub-block A is RefPicListX[collocated_ref_idx].

spMvLX[A]=(smvA_above+smvA_left+smvA_col)/cnt　　(Expression STMVP-2)

For integer computation, for example, the derivation may be as follows. In the case of cnt==2, assuming two vectors mvA_cnt0 and mvA_cnt1 in this order, the derivation may be according to the following expression.

spMvLX[A]=(smvA_cnt0+smvA_cnt1)>>1

For cnt==3, the derivation may be according to the following expression.

spMvLX[A]=(5*smvA_above+5*smvA_left+6*smvA_col)>>4

Step 7) Checked is whether or not a block at a position obtained by shifting the collocated block by spMvLX[A] is within the collocated tile, in the reference picture RefPicListX[collocated_ref_idx]. In a case that a part of or all of the block is not within the collocated tile, any of the following processes 2 (process 2A to process 2D) is performed.

[Process 2A] Tile Boundary Padding

The tile boundary padding (padding outside tile) is achieved by clipping the reference position at the positions of the boundary pixels on the top, bottom, right, and left of the tile as already described above. For example, assuming that upper left coordinates of the sub-block A relative to upper left coordinates of the picture are (xs, ys), a width and height of the sub-block A are BW and BH, respectively, upper left coordinates of a target tile in which the sub-block A is located are (xTs, yTs), and a width and height of the target tile are wT and hT, respectively, a reference pixel (xRef, yRef) of the sub-block A is derived according to the following expression.

xRef+i=Clip3(xTs,xTs+wT−1,xs+(SpMvLX[A][0] >>log 2(M))+i)

yRef+j=Clip3(yTs,yTs+hT−1,ys+(SpMvLX[A][1]>>log 2(M))+j)　　(Expression STMVP-3)

Note that the process 2 requires the tile encoder 2002 and the tile decoder 2012 to select the same process.

[Process 2B] Tile Boundary Motion Vector Restriction

The sub-block level motion vector spMvLX[A] is clipped so that the sub-block level motion vector spMvLX[A] does not refer to the outside of the tile. The tile boundary motion vector restriction is as described above.

[Process 2C] Tile Boundary Motion Vector Replacement (Replacement by Substitution Motion Vector)

In a case that a destination to which the sub-block motion vector SpMvLX[k2][l2] points is not within the collocated tile, the substitution motion vector SpMvLX[k3][l3] within the collocated tile is copied. For example, (k3, l3) may be a sub-block neighboring to (k2, l2) or a center of the block.

SpMvLX[k2][l2][0]=SpMvLX[k3][l3][0]

SpMvLX[k2][l2][1]=SpMvLX[k3][l3][1]　　(Expression STMVP-4)

[Process 2D] Tile Boundary STMVP Off

In a case that the number of sub-blocks exceeds a prescribed threshold, for each of which sub-blocks a destination to which the sub-block motion vector SpMvLX[k2][l2] points is not within the collocated tile, the STMVP is turned off and the process is terminated. For example, the prescribed threshold may be ½ of the total number of sub-blocks within the target block.

Figure 25:
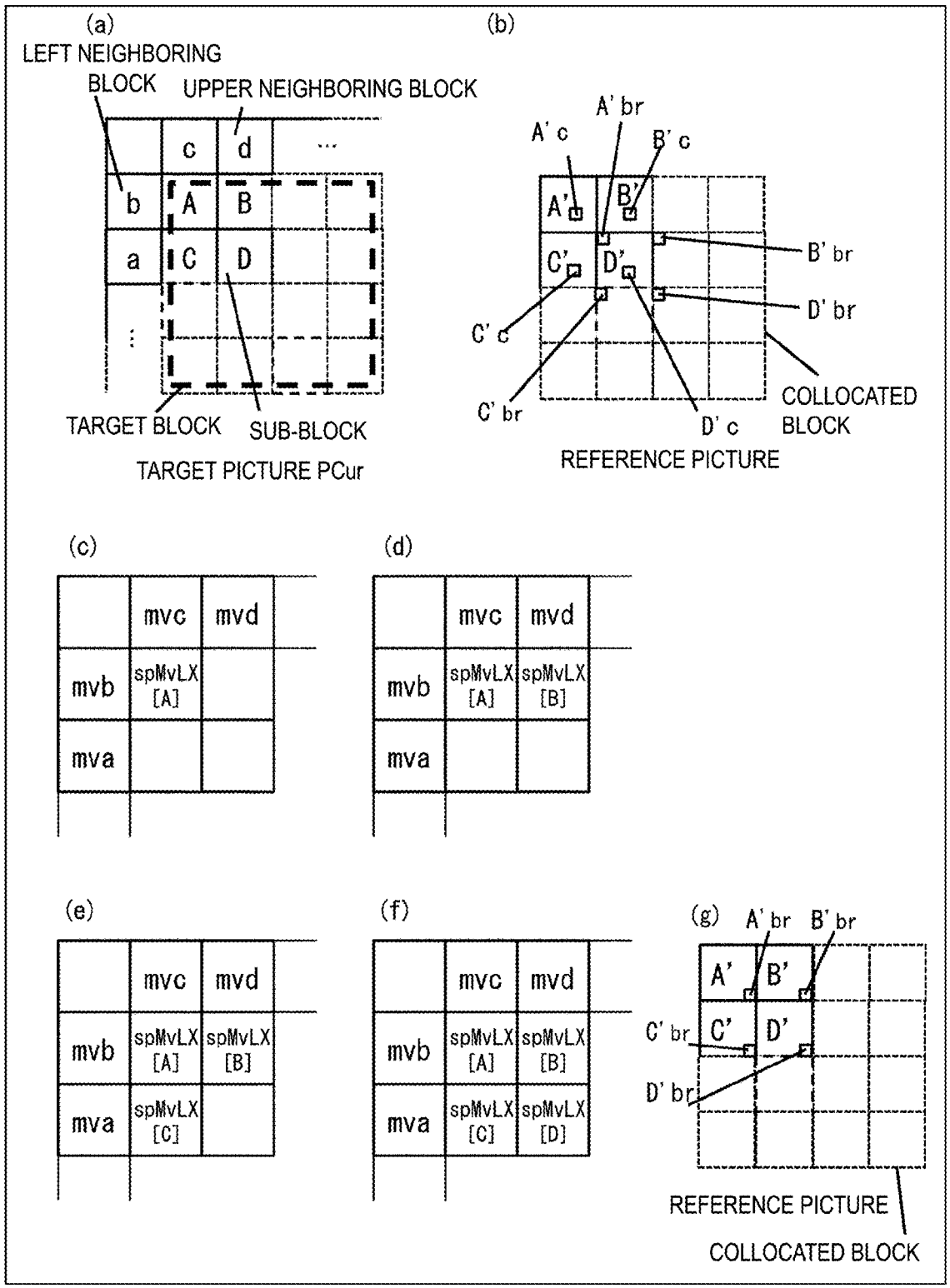
FIG. 25 is a diagram illustrating an STMVP process.

Step 8) The processes in steps 1) to 7) described above are performed on each sub-block of the target block, such as the sub-blocks B, C, and D, and the motion vectors of the sub-blocks are determined as in FIGS. 25(*d*), 25(*e*), and 25(*f*). However, in sub-block B, the upper neighboring block is searched from d in the right direction. In the sub-block C, the upper neighboring block is A and the left neighboring block is searched from a in the downward direction. In the sub-block D, the upper neighboring block is B and the left neighboring block is C.

Step 9) The STMVP motion vector is stored in the merge candidate list. An example of the order of the merge candidates stored in the merge candidate list is illustrated in FIG. 24. From this list, the merge_idx derived by the inter prediction parameter decoding control unit 3031 is used to select a merge candidate for the target block.

In a case that the STMVP is selected as a merge candidate, an image on a reference picture RefPicListX[collocated_ref_idx] shifted from each sub-block of the target block by the motion vector is read and sets the read out image as a prediction image.

Figure 26:
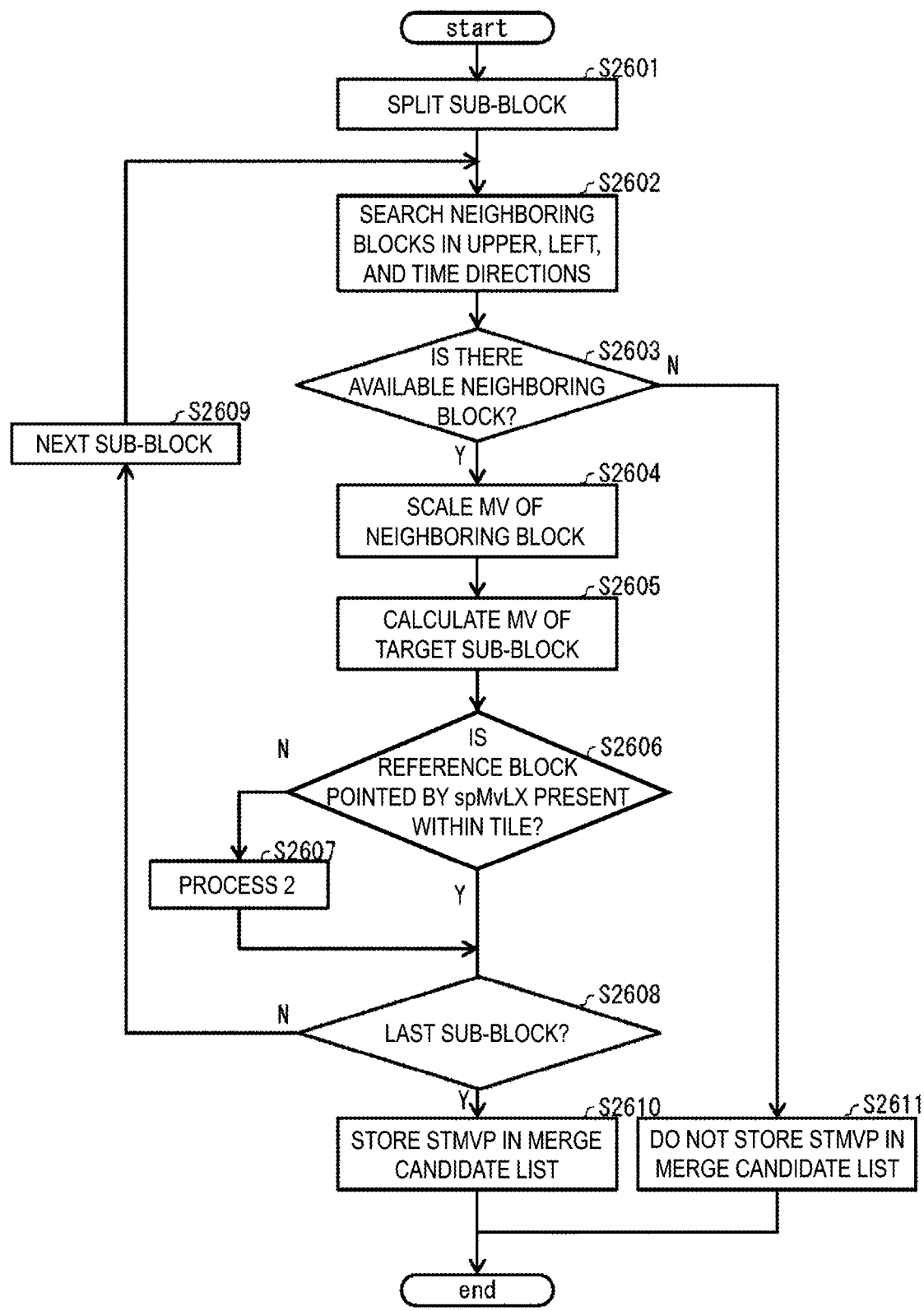
FIG. 26 is a flowchart illustrating operation of the STMVP process.

The merge candidate list derivation process for the STMVP described in step 1) to step 9) will be described with reference to the flowchart in FIG. 26(*a*).

The spatial-temporal sub-block predictor 30371 splits the target block into sub-blocks (S2601).

The spatial-temporal sub-block predictor 30371 searches upper and left neighboring blocks of the sub-block in the time direction (S2602).

The spatial-temporal sub-block predictor 30371 determines the presence or absence of the available neighboring block, and proceeds to S2604 in a case that there is an available neighboring block or proceeds to S2610 in a case that there is no available neighboring block (S2603).

The spatial-temporal sub-block predictor 30371 scales the motion vector included in the available neighboring block in accordance with temporal distances between the target picture and the reference pictures of the multiple neighboring blocks (S2604).

The spatial-temporal sub-block predictor 30371 calculates an average of the scaled motion vectors and sets the calculated average as a motion vector spMvLX[ ] of the target sub-block (S2605).

The spatial-temporal sub-block predictor 30371 determines whether or not a block obtained by shifting the collocated sub-block on the reference picture by a motion vector spMvLX[ ] is within the collocated tile, and proceeds to S2608 in a case that the block is within the collocated tile, or proceeds to S2607 in a case that even a part of the block is not within the collocated tile (S2606).

The spatial-temporal sub-block predictor 30371 clips the motion vector spMvLX[ ] in the case that the block shifted by the motion vector spMvLX[ ] is outside of the collocated tile (S2607).

The spatial-temporal sub-block predictor 30371 checks whether or not the sub-block under the process is the last sub-block of the target block (S2608), and proceeds to S2610 in the case of the last sub-block, and otherwise, changes a processing target to the next sub-block and proceeds to S2602 (S2609), and then, repeatedly performs S2602 to S2608.

The spatial-temporal sub-block predictor 30371 stores an STMVP motion vector in the merge candidate list merge-CandList[ ] illustrated in FIG. 24 (S2610).

The spatial-temporal sub-block predictor 30371, in the case of no available motion vector, does not store an STMVP motion vector in the merge candidate list merge-CandList[ ] and terminates the process (S2611).

Note that, in addition to the clipping process on the motion vector of the target sub-block, the process in S2607 may be the padding process on the tile boundary of the reference picture as described in step 7).

The above process derives the merge candidate list for the STMVP.

By deriving the STMVP motion vector to generate the prediction image in this manner, the reference pixel is replaced by the pixel value in the collocated tile, even in a case that the motion vector points to the outside of the collocated tile in the inter prediction, and therefore, the tile can be independently inter-predicted. Thus, even in a case that some of the reference pixels are not included in the collocated tile, the STMVP can be selected as one of the merge candidates. Then, in a case that the performance is higher than that of a merge candidate other than the STMVP, the STMVP can be used to generate the prediction image, so the coding efficiency can be increased.

Affine Predictor

The affine predictors 30372 and 30321 derive affine prediction parameters for the target PU. In the present embodiment, motion vectors (mv0_x, mv0_y) (mv1_x, mv1_y) of two control points (V0, V1) of the target PU are derived as the affine prediction parameters. Specifically, the motion vector of each control point may be derived by prediction from a motion vector of a neighboring PU of the target PU (affine predictor 30372), or the motion vector of each control point may be derived from a sum of a prediction vector derived as the motion vector of the control point and a differential vector derived from the coded data (affine predictor 30321).

Sub-Block Motion Vector Derivation Process

Hereinafter, as an example of a further specific embodiment configuration, a flow of the process in which the affine predictors 30372 and 30321 derive the motion vector mvLX of each sub-block using the affine prediction will be described in steps. The process in which the affine predictors 30372 and 30321 derive the motion vector mvLX of the target sub-block using the affine prediction includes three steps (STEP 1) to (STEP 3) described below.

(STEP 1) Derivation of Control Point Vector

In this step, a motion vector of each of representative points of the target block (here, a point V0 at the upper left of the block and a point V1 at the upper right of the block) are derived as two control points used in the affine prediction for the affine predictors 30372 and 30321 to derive candidates. Note that a point on the target block is used for the representative point of the block. In the present specification, the representative point of the block used for the control point of the affine prediction is referred to as a "block control point".

Figure 30:
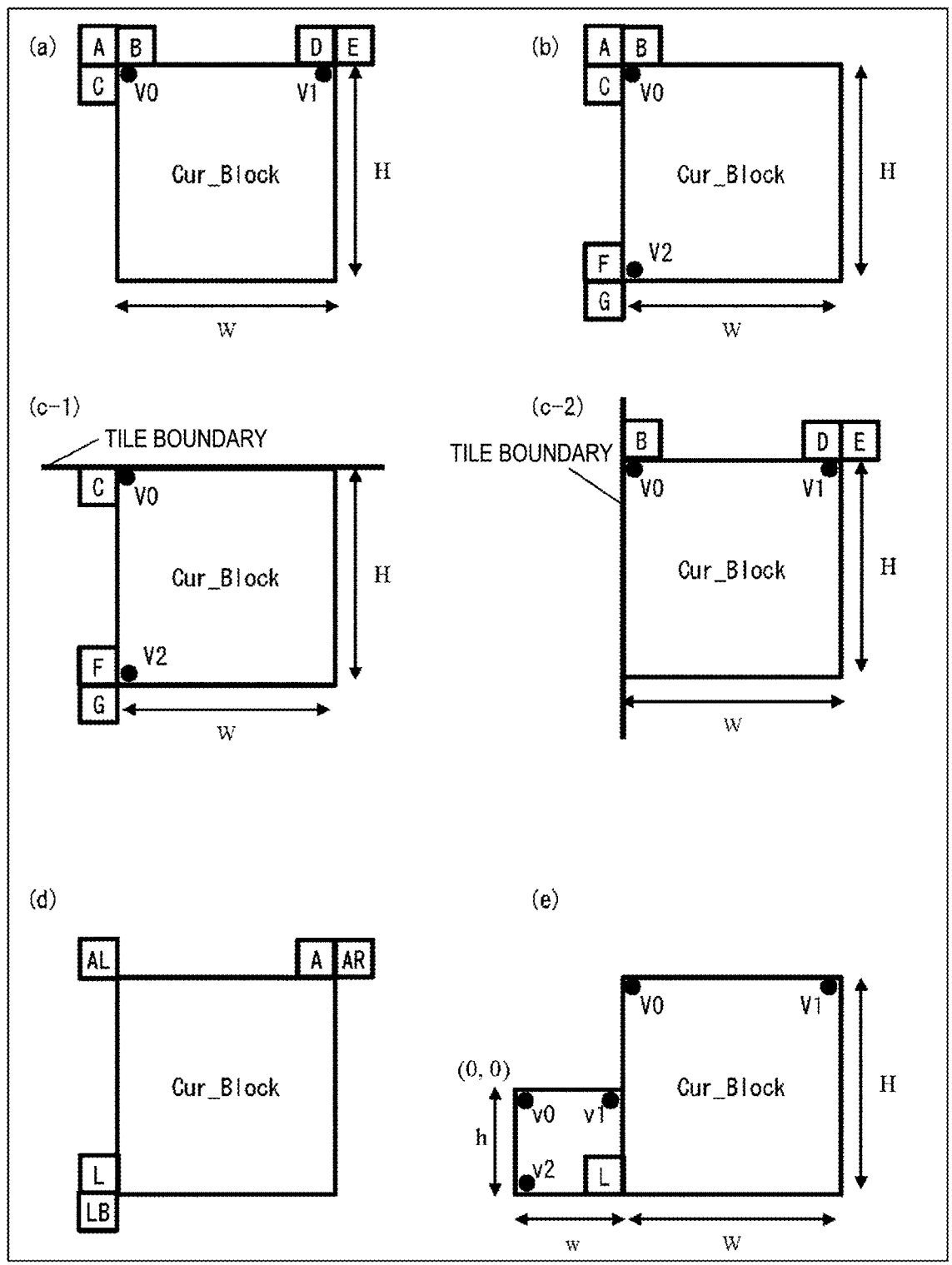
FIG. 30 is a diagram illustrating an example of positions of reference blocks used to derive motion vectors of control points in affine prediction.

First, processes in the AMVP mode and the merge mode (STEP 1) will be described with reference to FIG. 30. FIG. 30 is a diagram illustrating an example of a position of a reference block utilized for derivation of motion vectors of control points in the AMVP mode and the merge mode.

Derivation of Motion Vector of Control Point in AMVP Mode

The affine predictor 30321 adds prediction vectors mvpVNLX and difference vectors of two control points (V0, V1) to derive a motion vector mvN=(mvN_x, mvN_y). N represents the control point.

More specifically, the affine predictor 30321 derives the prediction vector candidate of the control point VN (N=0 . . . 1), and stores the derived candidate in a prediction vector candidate list mvpListVNLX[ ]. Moreover, the affine predictor 30321 derives a motion vector (mvN_x, mvN_y) of the control point VN from a prediction vector index mvpVN_LX_idx of the point VN from the coded data, and a difference vector mvdVNLX according to the following expression.

$$\text{mv}N\_x = \text{mv}NLX[0] = \text{mv}pListVNLX[\text{mv}pVN\_LX\_\text{idx}][0] + \text{mv}dVNLX[0]$$

$$\text{mv}N\_y = \text{mv}NLX[1] = \text{mv}pListVNLX[\text{mv}pVN\_LX\_\text{idx}][1] + \text{mv}dVNLX[1] \qquad \text{(Expression AFFIN-1)}$$

As illustrated in FIG. 30(a), the affine predictor 30321 refers to mvpV0_LX_idx to select, as a reference block (AMVP reference block), any one of blocks A, B, and C neighboring to one of the representative points. Then, the motion vector of the selected AMVP reference block is taken as a prediction vector mvpV0LX of the representative point V0. Furthermore, the affine predictor 30321 refers to mvpV1_LX_idx to select, as an AMVP reference block, any one of blocks D and E. Then, the motion vector of the selected AMVP reference block is taken as a prediction vector mvpV1LX of the representative point V1. Note that the position of the control point in (STEP 1) is not limited to the above position, and instead of V1, may be a position of a point V2 at the lower left of the block illustrated in FIG. 30(b). In this case, any of the blocks F and G is selected as AMVP reference block by referring to mvpV2_LX_idx. Then, the motion vector of the selected AMVP reference block is taken as a prediction vector mvpV2LX of the representative point V2.

For example, as illustrated in FIG. 30(c-2), in a case that the left side of the target block shares the border with the tile boundary, the control points are V0 and V1, and the reference block of the control point V0 is the block B. In this case mvpV0_L0_idx is not required. Note that, in a case that the reference block B is an intra prediction, the affine prediction may be turned off (affine prediction is not performed, affine_flag=0), or the prediction vector of the control point V1 may be copied to the prediction vector of the control point V0 to perform the affine prediction. These may be made by performing the same process as the affine predictor 11221 of the tile encoder 2012.

Additionally, as illustrated in FIG. 30(c-1), in a case that the upper side of the target block shares the border with the tile boundary, the control points are V0 and V2, and the reference block of the control point V0 is the block C. In this case mvpV0_L0_idx is not required. Note that, in a case that the reference block C is an intra prediction, the affine prediction may be turned off (affine prediction is not performed), or the prediction vector of the control point V2 may be copied to the prediction vector of the control point V0 to perform the affine prediction. These may be made by performing the same process as the affine predictor 11221 of the tile encoder 2012.

Derivation of Motion Vectors of Control Points in Merge Mode

The affine predictor 30372 refers to the prediction parameter memory 307, and checks whether or not affine prediction is used for blocks including L, A, AR, LB, and AL as illustrated in FIG. 30(d). The affine predictor 30372 searches the blocks L, A, AR, LB, and AL in this order, selects a first-detected block using affine prediction (the block is herein L of FIG. 30(d)) as a reference block (merge reference block), and derives its motion vectors of the block.

The affine predictor 30372 derives motion vectors (mvN_x, mvN_y) (N=0 . . . 1) of control points (for example, V0 and V1), based on motion vectors (mvvN_x, mvvN_y) (N=0 . . . 2) of a block including three points (a point v0, a point v1, and a point v2 of FIG. 30(e)) of the selected merge reference block. Note that, in the example illustrated in FIG. 30(e), the target block has a width W and a height H, and the merge reference block (in the example of the figure, a block including L) has a width w and a height h.

$$mv0\_x = mv0LX[0] = mvv0\_x + (mvv1\_x - mvv0\_x)/w*w - (mvv2\_y - mvv0\_y)/h*(h-H)$$

$$mv0\_y = mv0LX[1] = mvv0\_y + (mvv2\_y - mvv0\_y)/h*w + (mvv1\_x - mvv0\_x)/w*(h-H)$$

$$mv1\_x = mv1LX[0] = mvv0\_x + (mvv1\_x - mvv0\_x)/w*(w+W) - (mvv2\_y - mvv0\_y)/h*(h-H)$$

$$mv1\_y = mv1LX[1] = mvv0\_y + (mvv2\_y - mvv0\_y)/h*(w+W) + (mvv1\_x - mvv0\_x)/w*(h-H) \quad \text{(Expression AFFINE-2)}$$

In a case that reference pictures of the derived motion vectors mv0 and mv1 are different from a reference picture of the target block, scaling may be performed based on an inter-picture distance between each of the reference pictures and the target picture.

Next, in a case that the motion vectors (mvN_x, mvN_y) (N=0 . . . 1) of the control points V0 and V1 that are derived in (STEP 1) by the affine predictors 30372 and 30321 point to the outside of the tile (in the reference picture, a part or all of blocks at positions shifted from the collocated block by mvN are not present within the collocated tile), any one of Process 4 (Process 4A to Process 4D) described below is performed.

[Process 4A] Tile Boundary Padding

A tile boundary padding process is performed in STEP 3. In this case, an additional process is not particularly performed in (STEP 1). The tile boundary padding (out-of-tile padding) is, as described above, implemented by clipping a reference position at positions of upper, lower, right, and left boundary pixels of the tile. For example, a sub-block level reference pixel (xRef, yRef) is derived according to the following expression:

$$xRef + i = Clip3(xTs, xTs + wT - 1, xs + (SpMvLX[k2][l2][0] >> \log 2(M)) + i)$$

$$yRef + j = Clip3(yTs, yTs + hT - 1, ys + (SpMvLX[k2][l2][1] >> \log 2(M)) + j) \quad \text{(Expression AFFINE-3)}$$

where (xs, ys) represents upper left coordinates of the target sub-block with respect to upper left coordinates of the picture, W and H respectively represent width and height of the target block, (xTs, yTs) represents upper left coordinates of the target tile at which the target sub-block is located, and wT and hT respectively represent width and height of the target tile.

[Process 4B] Tile Boundary Motion Vector Restriction

The sub-block motion vector spMvLX[k2][l2] is clipped so that the sub-block level motion vector spMvLX[k2][l2] does not refer to the outside of the tile. The tile boundary motion vector restriction is as described above.

[Process 4C] Tile Boundary Motion Vector Replacement (Alternative Motion Vector Replacement)

A motion vector is copied from a neighboring sub-block that has a motion vector pointing to the inside of the collocated tile.

[Process 4D] Turn Off Tile Boundary Affine

In a case that it is determined that the outside of the collocated tile is referred to, affine_flag=0 is set (affine prediction is not performed). In this case, the above process is not performed.

Note that, in Process 4, the affine predictor of the tile encoder 2002 and the affine predictor of the tile decoder 2012 need to select the same process.

(STEP 2) Derivation of Sub-Block Vector

This is a step in which the affine predictors 30372 and 30321 derive a motion vector of each sub-block included in the target block, based on the motion vectors of the block control points (control points V0 and V1, or V0 and V2), which are representative points of the target block derived in (STEP 1). In (STEP 1) and (STEP 2), a motion vector spMvLX of each sub-block is derived. Note that, although the following description concerns an example of the control points V0 and V1, a motion vector of each sub-block can also be derived using the control points V0 and V2 through a similar process, only by replacing the motion vector of V1 with the motion vector of V2.

Figure 13:
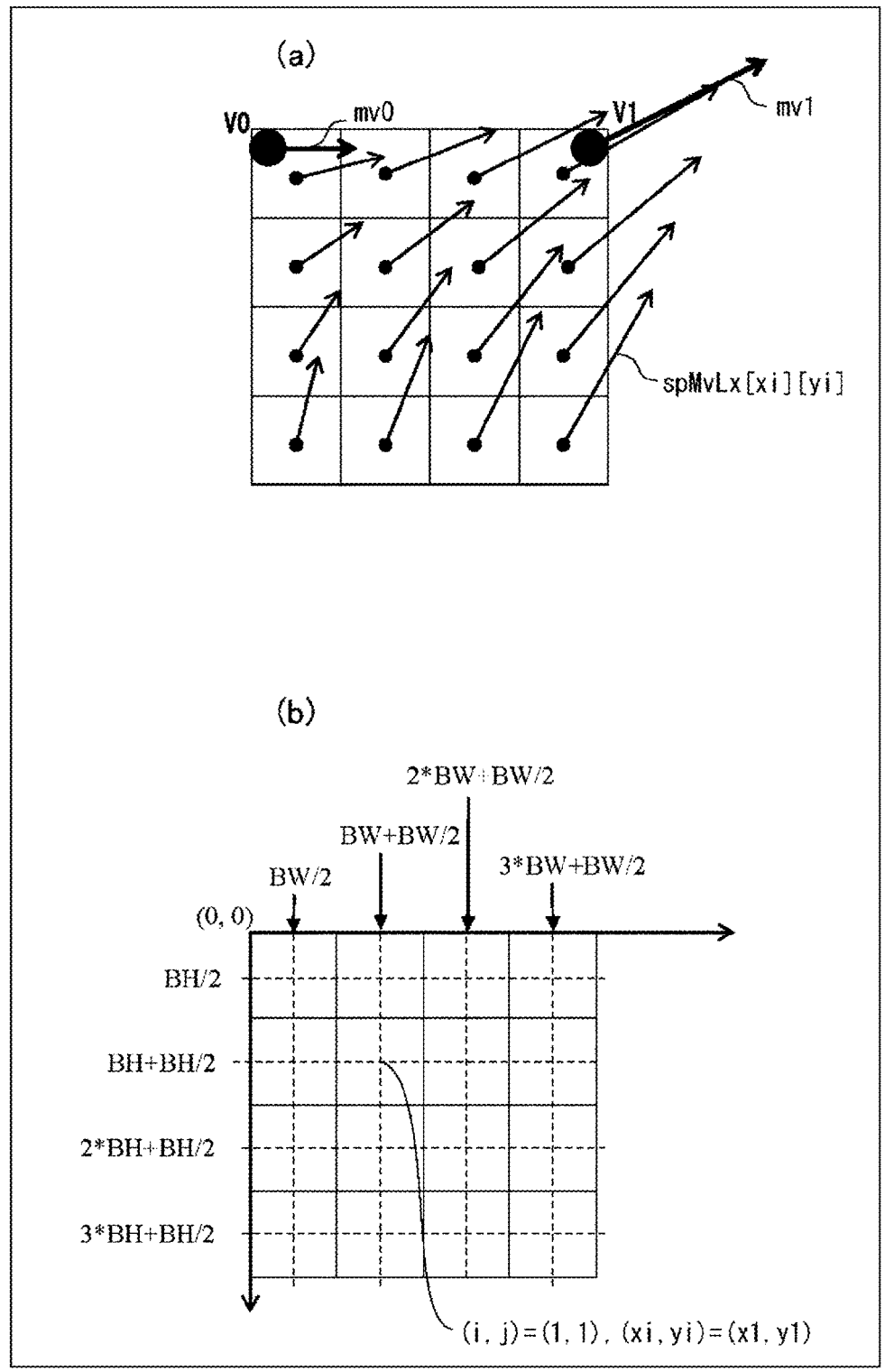
FIG. 13 is a diagram illustrating an example of deriving a motion vector spMvLX[xi][yi] of each sub-block constituting a PU being a target of motion vector prediction.

FIG. 13(a) is a diagram illustrating an example in which a motion vector spMvLX of each sub-block constituting the target block is derived based on the motion vector (mv0_x, mv0_y) of the control point V0 and the motion vector (mv1_x, mv1_y) of V1. As illustrated in FIG. 13(a), the motion vector spMvLX of each sub-block is derived as a motion vector of each point that is located at the center of each sub-block.

Based on the motion vectors (mv0_x, mv0_y) and (mv1_x, mv1_y) of the control points V0 and V1, the affine predictors 30372 and 30321 derive a motion vector spMvLX[xi][yi] (xi=xb+BW*i, yj=yb+BH*j, i=0, 1, 2, . . . , W/BW−

1, j=0, 1, 2, . . . , H/BH−1) of each sub-block in the target PU, according to the following expression:

$$spMvLX[xi][yi][0]=mv0\_x+(mv1\_x-mv0\_x)/W*(xi+BW/2)-(mv1\_y-mv0\_y)/W*(yi+BH/2)$$

$$spMvLX[xi][yi][1]=mv0\_y+(mv1\_y-mv0\_y)/W*(xi+BW/2)+(mv1\_x-mv0\_x)/W*(yi+BH/2) \quad \text{(Expression AFFINE-4)}$$

where xb and yb represent upper left coordinates of the target PU, W and H respectively represent width and height of the target block, and BW and BH respectively represent width and height of the sub-block.

FIG. 13(b) is a diagram illustrating an example in which the target block (width W, height H) is split into sub-blocks having a width BW and a height BH.

Points of a sub-block position (i, j) and sub-block coordinates (xi, yj) each correspond to an intersection between the broken line in parallel with the x axis and the broken line in parallel with the y axis of FIG. 13(b). In FIG. 13(b), as an example, a point of a sub-block position (i, j)=(1, 1), and a point of sub-block coordinates (xi, yj)=(x1, y1)=(BW+BW/2, BH+BH/2) for the sub-block position (1, 1) are indicated.

(STEP 3) Sub-Block Motion Compensation

This is a step in which the motion compensation unit 3091 performs motion compensation for each sub-block in a case of affine_flag=1, based on the prediction list use flag predFlagLX, the reference picture index refIdxLX, and the motion vectors spMvLX of the sub-blocks derived in (STEP 2), which are input from the inter prediction parameter decoder 303. Specifically, a block located at the position shifted by the motion vector spMvLX from the position of the target sub-block on the reference picture indicated by the reference picture index refIdxLX is read from the reference picture memory 306, and is then filtered, and a motion compensation image PredLX is thereby generated.

In a case that the motion vectors of the sub-blocks derived in (STEP 2) point to the outside of the tile, the tile boundary is padded to read pixels.

Note that, in a case that there is affine_flag notified from the tile encoder 2002, the tile decoder 2012 may perform the above process only in a case of affine_flag=1.

Figure 31:
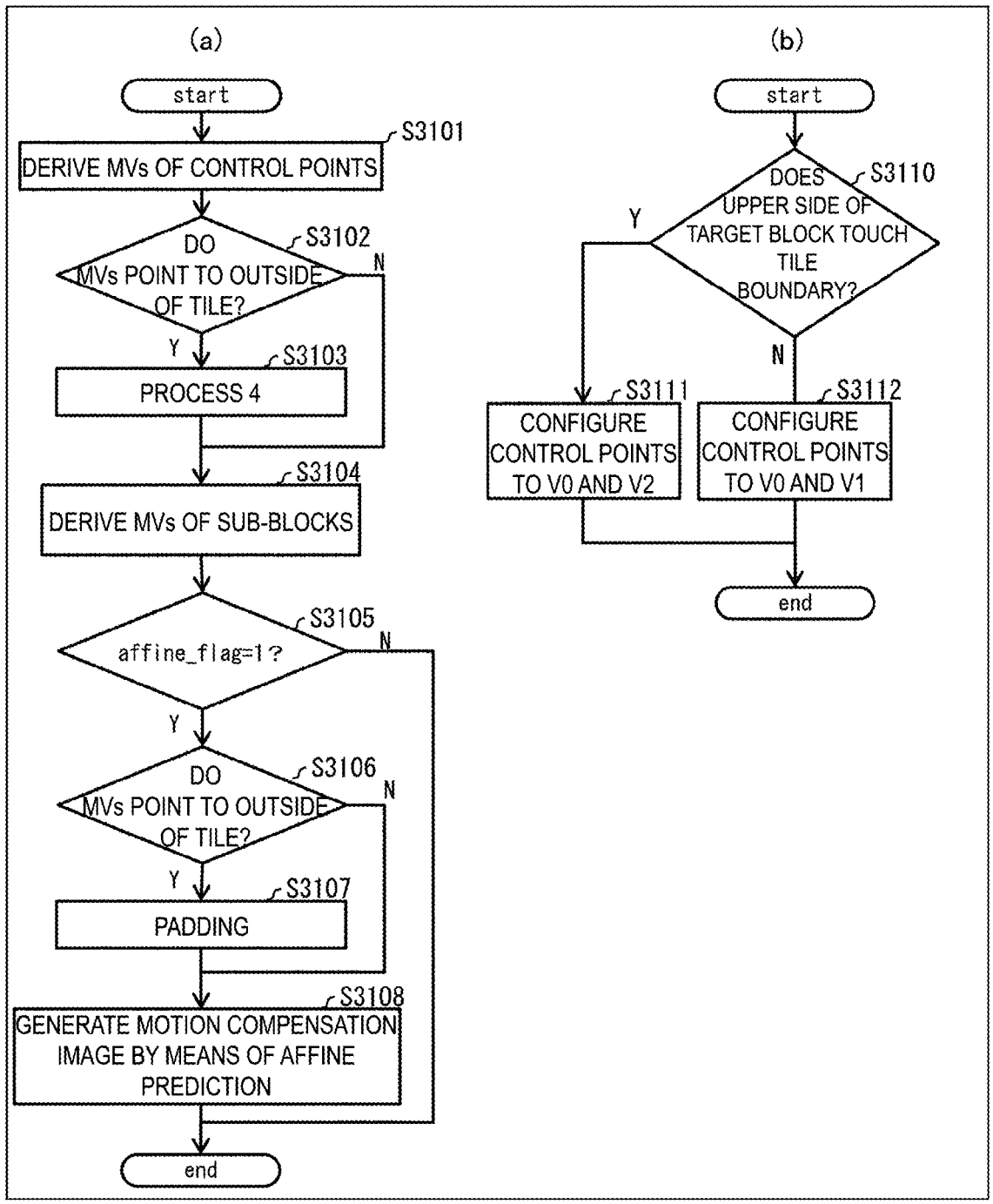
FIG. 31 is a flowchart illustrating operation of affine prediction.

FIG. 31(a) is a flowchart illustrating operation of the above affine prediction.

The affine predictors 30372 and 30321 derive motion vectors of control points (S3101).

Next, the affine predictors 30372 and 30321 determine whether or not the derived motion vectors of the control points point to the outside of the tile (S3102). In a case that the motion vectors do not point to the outside of the tile (N in S3102), the process proceeds to S3104. In a case that at least a part of the motion vectors points to the outside of the tile (Y in S3102), the process proceeds to S3103.

In a case that at least a part of the motion vectors points to the outside of the tile, the affine predictors 30372 and 30321 perform any one of Process 4 described above; that is, for example, clip the motion vectors, and make a modification so that the motion vectors point to the inside of the tile.

S3101 to S3103 are a process corresponding to (STEP 1) described above.

The affine predictors 30372 and 30321 derive a motion vector of each sub-block, based on the derived motion vectors of the control points (S3104). S3104 is a process corresponding to (STEP 2) described above.

The motion compensation unit 3091 determines whether or not affine_flag is 1 (affine_flag=1) (S3105). In a case that affine_flag is not 1 (N in S3105), the motion compensation unit 3091 does not perform affine prediction, and ends the affine prediction process. In a case that affine_flag is 1 (Y in S3105), the process proceeds to S3106.

The motion compensation unit 3091 determines whether or not the motion vectors of the sub-blocks point to the outside of the tile (3106). In a case that the motion vectors do not point to the outside of the tile (N in S3106), the process proceeds to S3108. In a case that at least a part of the motion vectors points to the outside of the tile (Y in S3106), the process proceeds to S3107.

In a case that at least a part of the motion vectors of the sub-blocks points to the outside of the tile, the motion compensation unit 3091 pads the tile boundary (S3107).

The motion compensation unit 3091 generates a motion compensation image by means of affine prediction, by using the motion vectors of the sub-blocks (S3108).

S3105 to S3108 are a process corresponding to (STEP 3) described above.

FIG. 31(b) is a flowchart illustrating an example of determining control points in a case of AMVP prediction in S3101 of FIG. 31(a).

The affine predictor 30321 determines whether or not the upper side of the target block touches the tile boundary (S3110). In a case of touching the upper boundary of the tile (Y in S3110), the process proceeds to S3111, and the control points are configured to V0 and V2 (S3111). Otherwise (N in S3110), the process proceeds to S3112, and the control points are configured to V0 and V1 (S3112).

In affine prediction, even in a case that a neighboring block is located outside of the tile or in a case that the motion vectors point to the outside of the tile, the reference pixel can be replaced with a pixel value within the tile, by configuring the control points, deriving motion vectors for affine prediction, and then generating a prediction image as described above. As a result, decrease in the frequency of using the affine prediction process can be prevented, and inter prediction can be independently performed on the tiles. Therefore, coding efficiency can be enhanced.

Matching Motion Deriver 30373

Figure 14:
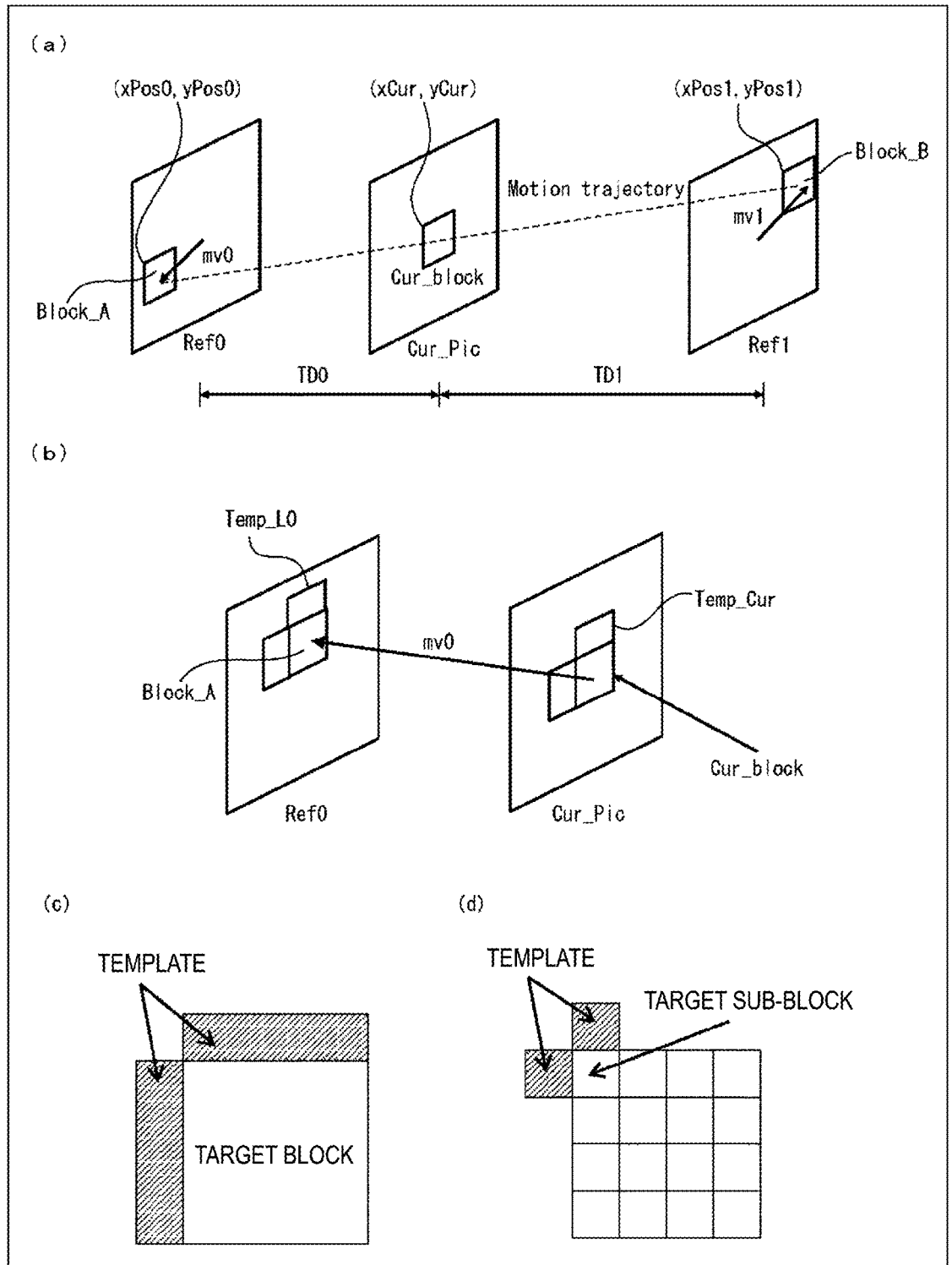
FIG. 14 is a diagram for illustrating Bilateral matching and Template matching. (a) of FIG. 14 illustrates Bilateral matching. (b) of FIG. 14 illustrates Template matching. (c) of FIG. 14 illustrates a template of a target block in a case that the template of the target block is present within a tile. (d) of FIG. 14 illustrates a template of a target sub-block.

The matching motion deriver 30373 performs a matching process of any one of bilateral matching and template matching, and thereby derives a motion vector spMvLX of a block or a sub-block constituting a PU. FIG. 14 is a diagram for illustrating (a) Bilateral matching, and (b) Template matching. A matching motion derivation mode is selected as one merge candidate (matching candidate) of the merge mode.

Based on the assumption that an object moves at a constant speed, the matching motion deriver 30373 derives a motion vector by matching of regions of multiple reference pictures. In bilateral matching, based on the assumption that a certain object passes a certain region of a reference picture A, a target PU of a target picture Cur_Pic, and a certain region of a reference picture B at a constant speed, a motion vector of the target PU is derived by matching between the reference pictures A and B. In template matching, based on the assumption that a motion vector of a neighboring region of a target PU and a motion vector of the target PU are equal, a motion vector is derived by matching of a neighboring region Temp_Cur (template) of the target PU and a neighboring region Temp_L0 of a reference block on a reference picture. The matching motion deriver splits the target PU into multiple sub-blocks, and performs bilateral matching or template matching (described later) for each of the split sub-blocks, and thereby derives a motion vector spMvLX[xi][yi] (xi=xPb+BW*i, yj=yPb+BH*j, i=0, 1, 2, . . . , W/BW−1, j=0, 1, 2, . . . , H/BH−1) of the sub-block.

As illustrated in FIG. 14(a), in bilateral matching, two reference pictures are referred to in order to derive a motion vector of a target block Cur_block of a target picture Cur_Pic. More specifically, first, Block_A and Block_B are configured. Block_A is a region within a reference picture Ref0 (referred to as a reference picture A) that is indicated by the reference picture index refIdxL0, and that has upper left coordinates (xPos0, yPos0) that are determined according to:

$$(xPos0, yPos0) = (xCur+mv0[0], yCur+mv0[1]) \quad \text{(Expression FRUC-1)}$$

where (xCur, yCur) represents coordinates of the target block Cur_block.

For example, Block_B is, for example, a region within a reference picture Ref1 (referred to as a reference picture B) that is indicated by the reference picture index refIdxL1, and that has upper left coordinates (xPos1, yPos1) that are determined according to:

$$(xPos1, yPos1) = (xCur+mv1[0], xCur+mv1[1]) = (xCur-mv0[0]*\text{DiffPicOrderCnt}(Cur\_Pic, Ref1)/\text{DiffPicOrderCnt}(Cur\_Pic, Ref0), yCur-mv0[1]*\text{DiffPicOrderCnt}(Cur\_Pic, Ref1)/\text{DiffPicOrderCnt}(Cur\_Pic, Ref0)) \quad \text{(Expression FRUC-2)}$$

where, as illustrated in FIG. 14(a), DiffPicOrderCnt(Cur_Pic, Ref0) and DiffPicOrderCnt(Cur_Pic, Ref1) respectively represent a function for returning a difference of time information between the target picture Cur_Pic and the reference picture A and a function for returning a difference of time information between the target picture Cur_Pic and the reference picture B.

Next, (mv0 [0], mv0 [1]) is determined so that a matching cost between Block_A and Block_B has a minimum value. (mv0 [0], mv0 [1]) derived in this manner is used as the motion vector assigned for the target block. Based on the motion vector assigned for the target block, a motion vector spMVL0 is derived for each sub-block that is obtained by splitting the target block.

In contrast, FIG. 14(b) is a diagram for illustrating Template matching, which is one of the above matching processes.

As illustrated in FIG. 14(b), in template matching, one reference picture is referred to at one time in order to derive a motion vector of a target block Cur_block of a target picture Cur_Pic.

More specifically, a reference block Block_A is determined. For example, the reference block Block_A is a region within a reference picture Ref0 (referred to as a reference picture A) that is indicated by the reference picture index refIdxL0, and that has upper left coordinates (xPos0, yPos0) that are determined according to:

$$(xPos0, yPos0) = (xCur+mv0[0], yCur+mv0[1]) \quad \text{(Expression FRUC-3)}$$

where (xCur, yCur) represents upper left coordinates of the target block Cur_block.

Next, a neighboring template region Temp_Cur of the target block Cur_block in the target picture Cur_Pic and a neighboring template region Temp_L0 of Block_A in the reference picture A are configured. In the example illustrated in FIG. 14(b), the template region Temp_Cur includes an upper neighboring region of the target block Cur_block and a left neighboring region of the target block Cur_block. The template region Temp_L0 includes an upper neighboring region of Block_A and a left neighboring region of Block_A.

Next, (mv0 [0], mv0 [1]) that leads to the minimum matching cost between Temp_Cur and Temp_L0 is determined, and determined (mv0 [0], mv0 [1]) is used as the motion vector assigned for the target block. Based on the motion vector assigned for the target block, a motion vector spMvL0 is derived for each sub-block that is obtained by splitting the target block.

Also in template matching, two reference pictures Ref0 and Ref1 may be processed. In this case, matching with the reference picture Ref0 and matching with the reference picture Ref1 described above are sequentially performed. A reference block Block_B is determined. The reference block Block_B is the region within a reference picture Ref1 (referred to as a reference picture B) that is indicated by the reference picture index refIdxL1, and that has upper left coordinates (xPos1, yPos1) that are determined according to:

$$(xPos1, yPos1) = (xCur+mv1[0], yCur+mv1[1]) \quad \text{(Expression FRUC-4)}.$$

Then, neighboring template regions Temp_L1 of Block_B in the reference picture B are configured. Finally, (mv1 [0], mv1 [1]) that leads to the minimum matching cost between Temp_Cur and Temp_L1 is determined, and determined (mv1 [0], mv1 [1]) is used as the motion vector assigned for the target block. Based on the motion vector assigned for the target block, a motion vector spMvL1 is derived for each sub-block that is obtained by splitting the target block.

Motion Vector Derivation Process According to Matching Process

The flow of a motion vector derivation (pattern matched vector derivation) process in a matching mode will be described with reference to the flowchart of FIG. 32.

Figure 32:
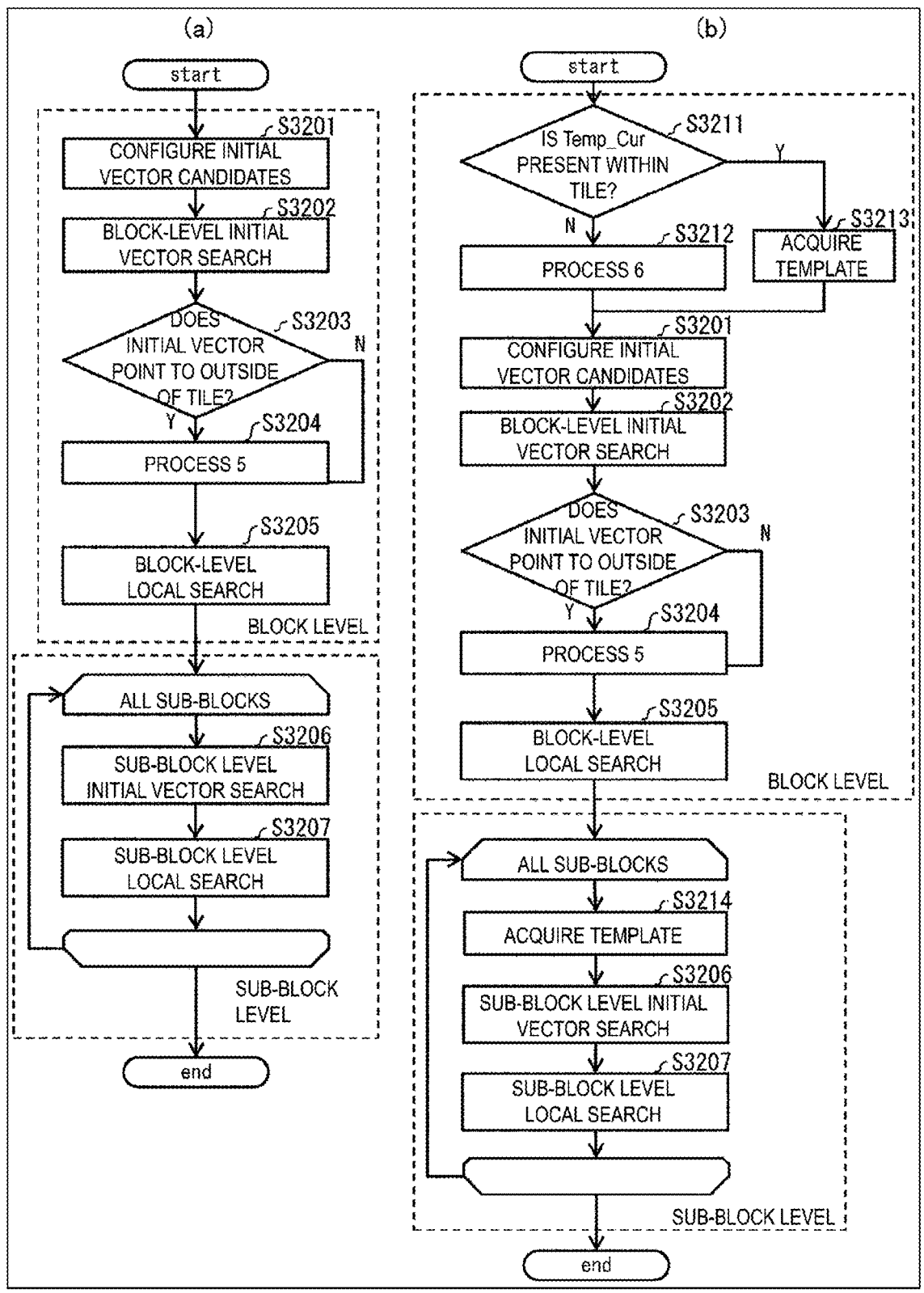
FIG. 32 is a flowchart illustrating operation of a motion vector derivation process of a matching mode.

The process illustrated in FIG. 32 is performed by the matching motion deriver 30373. FIG. 32(a) is a flowchart of a bilateral matching process, and FIG. 32(b) is a flowchart of a template matching process.

Note that S3201 to S3205, out of the steps illustrated in FIG. 32(a), correspond to a block search performed at the block level. Specifically, a motion vector is derived for the whole block (CU or PU) by means of pattern matching.

S3206 and S3207 correspond to a sub-block search performed at the sub-block level. Specifically, a motion vector is derived for each sub-block that constitutes a block, by means of pattern matching.

First, in S3201, the matching motion deriver 30373 configures block-level initial vector candidates of a target block. The initial vector candidates are motion vectors of neighboring blocks, such as an AMVP candidate and a merge candidate of the target block.

Next, in S3202, the matching motion deriver 30373 searches for a vector that leads to the minimum matching cost among the initial vector candidates configured in the above, and uses the searched vector as an initial vector to be the basis for a vector search. For example, the matching cost is expressed as in the following expression:

$$SAD = \Sigma\Sigma abs(Block\_A[x][y] - Block\_B[x][y]) \quad \text{(Expression FRUC-5)}$$

where ΣΣ represents a sum with respect to x and y, and Block_A[ ][ ] and Block_B[ ][ ] respectively represent a block whose upper left coordinates are expressed by (xPos0, yPos0) and (xPos1, yPos1) of (Expression FRUC-1) and (Expression FRUC-2). Each of the initial vector candidates is substituted into (mv0 [0], mv0 [1]). Then, a vector that leads to the minimum matching cost is again set to (mv0 [0], mv0 [1]).

Next, in S3203, the matching motion deriver 30373 determines whether or not the initial vector calculated in S3202 points to the outside of the tile (in the reference picture, a part or all of blocks at positions shifted from the collocated block by mvN (N=0 . . . 1) are not present within the collocated tile). In a case that the initial vector does not point to the outside of the tile (N in S3203), the process proceeds to S3205. In a case that at least a part of the initial vector points to the outside of the tile (Y in S3203), the process proceeds to S3204.

In S3204, the matching motion deriver 30373 performs any one of Processes 5 (Process 5A to Process 5C) described below.

[Process 5A] Tile Boundary Padding

The motion compensation unit 3091 performs tile boundary padding.

Clipping is performed so that the pixel pointed by the initial vector (mv0 [0], mv0 [1]) does not refer to the outside of the tile. A reference pixel (xRef, yRef) of the sub-block is derived according to the following expression:

$$xRef+i=Clip3(xTs, xTs+wT-1, xs+(mv0[0]>>\log 2(M))+i)$$

$$yRef+j=Clip3(yTs, yTs+hT-1, ys+(mv1[1]>>\log 2(M))+j) \quad \text{(Expression FRUC-6)}$$

where (xs, ys) represents upper left coordinates of the target block with respect to upper left coordinates of the picture, W and H respectively represent width and height of the target block, (xTs, yTs) represents upper left coordinates of the target tile at which the target block is located, and wT and hT respectively represent width and height of the target tile.

[Process 5B] Tile Boundary Motion Vector Restriction

The initial vector mv0 is clipped so that the motion vector mv0 of the initial vector does not refer to the outside of the tile. The tile boundary motion vector restriction is as described above.

[Process 5C] Tile Boundary Motion Vector Replacement (Alternative Motion Vector Replacement)

In a case that a target pointed by the motion vector mv0 is not present within the collocated tile, an alternative motion vector present within the collocated tile is copied.

[Process 5D] Turn Off Tile Boundary Bilateral Matching

In a case that it is determined that the outside of the collocated tile is referred to, BM_flag indicating on/off of bilateral matching is set to 0, and bilateral matching is not performed (the process proceeds to "end").

Note that, in Process 5, the tile encoder 2002 and the tile decoder 2012 need to select the same process.

In S3205, the matching motion deriver 30373 performs a block-level local search of the target block. In the local search, a local region around the initial vector derived in S3202 or S3204 (for example, a region±D pixels around the initial vector) is further searched for a vector that leads to the minimum matching cost, and the searched vector is used as the final motion vector of the target block.

Subsequently, the following process is performed on each sub-block included in the target block (S3206 and S3207).

In S3206, the matching motion deriver 30373 derives an initial vector of each sub-block of the target block (initial vector search). Initial vector candidates of the sub-block are the block-level motion vector derived in S3205, a motion vector of a neighboring block of the sub-block in the spatial-temporal direction, and an ATMVP or STMVP vector of the sub-block, for example. Among these candidate vectors, a vector that leads to the minimum matching cost is used as the initial vector of the sub-block. Note that the vector candidates used for the initial vector search of the sub-block are not limited to the vectors described above.

Next, in S3207, the matching motion deriver 30373 performs a step search or the like (local search) in a local region around the initial vector of the sub-block selected in S3206 (for example, a region±D pixels around the initial vector). Then, matching costs of the vector candidates near the initial vector of the sub-block are derived, and a vector that leads to the minimum matching cost is thereby derived as the motion vector of the sub-block.

After the process for all the sub-blocks included in the target block completes, the pattern matched vector derivation process of bilateral matching ends.

Next, a pattern matched vector derivation process of template matching will be described with reference to FIG. 32(b). Note that S3211 to S3205, out of the steps illustrated in FIG. 32(b), correspond to a block search performed at the block level. S3214 to S3207 correspond to a sub-block search performed at the sub-block level.

First, in S3211, the matching motion deriver 30373 determines whether or not a template Temp_Cur of a target block (both an upper neighboring region and a left neighboring region of the target block) is present within the tile. In a case of presence within the tile (Y in S3211), as illustrated in FIG. 14(c), the upper neighboring region and the left neighboring region of the target block are set to Temp_Cur, and a template of the target block is acquired (S3213). Otherwise (N in S3211), the process proceeds to S3212, and any one of Processes 6 (Process 6A to Process 6E) described below is performed.

[Process 6A] Tile Boundary Padding

The motion compensation unit 3091 performs tile boundary padding.

[Process 6B] Tile Boundary Motion Vector Restriction

The motion vector is clipped so that the motion vector does not refer to the outside of the tile. The tile boundary motion vector restriction is as described above.

[Process 6C] Tile Boundary Motion Vector Replacement (Alternative Motion Vector Replacement)

In a case that a target pointed by the sub-block motion vector is not present within the collocated tile, an alternative motion vector present within the collocated tile is copied.

[Process 6D] Turn Off Template Matching

In a case that it is determined that the outside of the collocated tile is referred to, TM_flag indicating on/off of template matching is set to 0, and template matching is not performed (the process proceeds to "end").

[Process 6E] In a case that either one of the upper neighboring region and the left neighboring region is present within the tile, the neighboring region is set as the template.

Note that, in Process 6, the tile encoder 2002 and the tile decoder 2012 need to select the same process.

Next, in S3201, the matching motion deriver 30373 configures block-level initial vector candidates of the target block. The process of S3201 is the same as the process of S3201 of FIG. 32(a).

Next, in S3202, the matching motion deriver 30373 searches for a vector that leads to the minimum matching cost among the initial vector candidates configured in the above, and uses the searched vector as an initial vector to be the basis for a vector search. For example, the matching cost is expressed as in the following expression:

$$SAD = \Sigma\Sigma abs(Temp\_Cur[x][y] - Temp\_L0[x][y]) \quad \text{(Expression FRUC-7)}$$

where ΣΣ represents a sum with respect to x and y, and Temp_L0[ ][ ] represents a template of the target block illustrated in FIG. 14(b), and corresponds to the upper and left neighboring regions of Block_A whose upper left coordinates are (xPos0, yPos0) expressed in (Expression FRUC-3). Each of the initial vector candidates is substituted into (mv0[0], mv0[1]) of (Expression FRUC-3). Then, a vector that leads to the minimum matching cost is again set to (mv0[0], mv0[1]). Note that, in a case that only the upper or left region of the target block is set to the template in S3212, the same shape is set to Temp_L0[ ][ ] as well.

The process of S3203 and S3204 is the same process as S3203 and S3204 of FIG. 32(a). Note that, in a case that template matching is turned off in Process 5 of S3204 of FIG. 32(b), TM_flag is set to 0.

In S3205, the matching motion deriver 30373 performs a block-level local search of the target block. In the local search, a local region around the initial vector derived in S3202 or S3204 (for example, a region±D pixels around the initial vector) is further searched for a vector that leads to the minimum matching cost, and the searched vector is used as the final motion vector of the target block.

Subsequently, the following process is performed on each sub-block included in the target block (S3214 to S3207).

In S3214, as illustrated in FIG. 14(d), the matching motion deriver 30373 acquires a template of each sub-block of the target block. In a case that only the upper or left region of the target block is set to the template in S3212, the same shape is set to the template of the sub-block in S3214 as well.

In S3206, the matching motion deriver 30373 derives an initial vector of each sub-block of the target block (initial vector search). Initial vector candidates of the sub-block are the block-level motion vector derived in S3205, a motion vector of a neighboring block of the sub-block in the spatial-temporal direction, and an ATMVP or STMVP vector of the sub-block, for example. Among these candidate vectors, a vector that leads to the minimum matching cost is used as the initial vector of the sub-block. Note that the vector candidates used for the initial vector search of the sub-block are not limited to the vectors described above.

Next, in S3207, the matching motion deriver 30373 performs a step search (local search) around the initial vector of the sub-block selected in S3206. Then, matching costs of the vector candidates in the local region around the initial vector of the sub-block (for example, within a search range around the initial vector (a region±D pixels)) are derived, and a vector that leads to the minimum matching cost is thereby derived as the motion vector of the sub-block. Here, in a case that a vector candidate coincides with the search range around the initial vector (or outside of the search range), the matching motion deriver 30373 does not search the vector candidate.

After the process for all the sub-blocks included in the target block completes, the pattern matched vector derivation process of template matching ends.

Although the above describes a case that the reference picture is Ref0, template matching can also be performed through the same process as above even in a case that the reference picture is Ref1. Furthermore, in a case that two reference pictures are used, the motion compensation unit 3091 performs a bi-prediction process by using two derived motion vectors.

fruc_merge_idx output to the motion compensation unit 3091 is derived according to the following expression:

fruc_merge_idx=fruc_merge_idx & $BM\_flag$ &($TM\_flag$<<1)  (Expression FRUC-8)

Note that, in a case that fruc_merge_idx is notified by the tile decoder 2012, BM_flag and TM_flag are derived before the pattern matched vector derivation process, and only a matching process with a true flag value may be performed.

$BM\_flag$=fruc_merge_idx & 1

$TM\_flag$=(fruc_merge_idx & 10)>>1  (Expression FRUC-9)

Note that, in a case that template matching is turned off because the template is located outside of the tile, there are two options of fruc_merge_idx=0 (no matching process) and fruc_merge_idx=1 (bilateral matching), and thus fruc_merge_idx can be expressed with 1 bit.

Tile Boundary Search Range

In a case that independent coding and decoding of a tile is performed (in a case that independent_tile_flag is 1), a search range D may be configured so that pixels outside of the collocated tile are not referred to in the motion vector search process. For example, the search range D in the bilateral matching process and the template matching process may be configured in accordance with the position and the size of the target block, or with the position and the size of the target sub-block.

Figure 48:
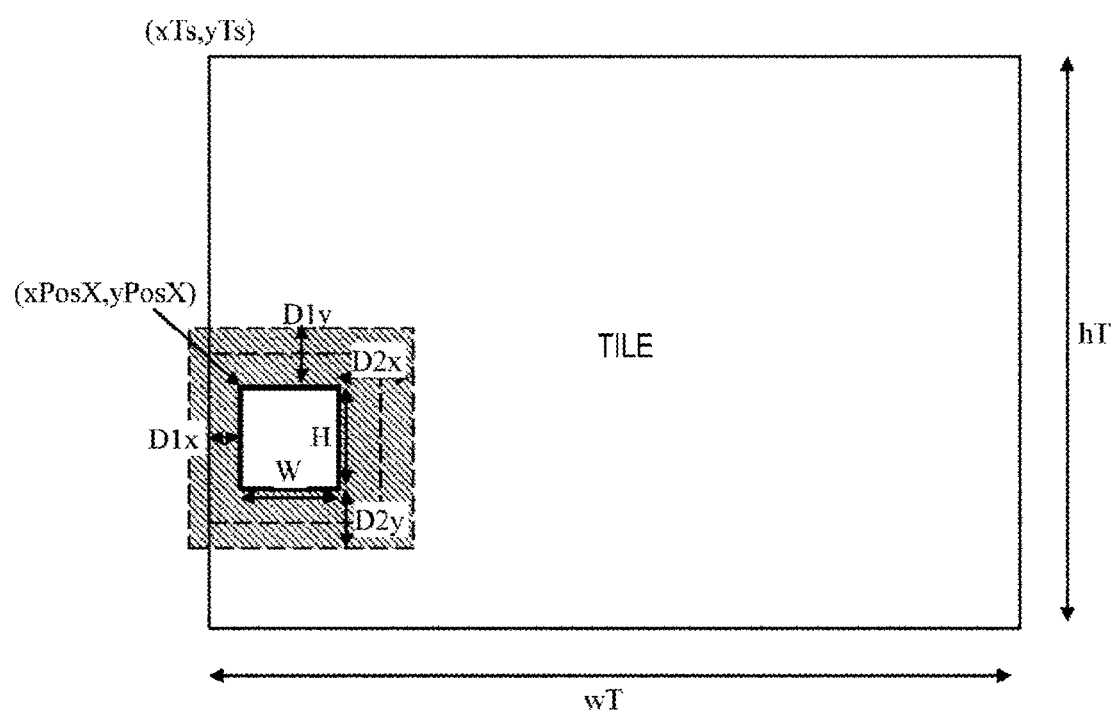
FIG. 48 is a diagram illustrating a search range of a target block.

Specifically, as the range allowing reference only to pixels within the collocated tile, the matching motion deriver 30373 derives a search range D1x located in the left direction with respect to the target block, a search range D2x located in the right direction with respect to the target block, a search range D1y located in the upper direction with respect to the target block, and a search range D2y located in the lower direction with respect to the target block, illustrated in FIG. 48, as follows:

$D1x=xPosX+mvX[0]-xTs$ $D2x=xTS+wT-(xPosX+mvX[0]+W)$ $D1y=yPosX+mvX[1]-yTS$ $D2y=yTS+hT-(yPosX+mvX[1]+H)$  (Expression FRUC-11)

As the search range D of the target block, the matching motion deriver 30373 configures a minimum value out of D1x, D2x, D1y, and D2y calculated according to (Expression FRUC-11) and a default search range Ddef.

$D=\min(D1x,D2x,D1y,D2y,Ddef)$  (Expression FRUC-12)

Alternatively, the following derivation method may be used. As the range allowing reference only to pixels within the collocated tile, the matching motion deriver 30373 derives the search range D1x located in the left direction with respect to the target block, the search range D2x located in the right direction with respect to the target block, the search range D1y located in the upper direction with respect to the target block, and the search range D2y located in the lower direction with respect to the target block, illustrated in FIG. 48, as follows:

$D1x=\text{clip3}(0,Ddef,xPosX+mvX[0]-xTs)$ $D2x=\text{clip3}(0,Ddef,xTS+wT-(xPosX+mvX[0]+W))$ $D1y=\text{clip3}(0,Ddef,yPosX+mvX[1]-yTS)$ $D2y=\text{clip3}(0,Ddef,yTS+hT-(yPosX+mvX[1]+H))$  (Expression FRUC-11b)

As the search range D of the target block, the matching motion deriver 30373 configures a minimum value out of D1x, D2x, D1y, and D2y calculated according to (Expression FRUC-11b).

$D=\min(D1x,D2x,D1y,D2y)$  (Expression FRUC-12b)

Note that, by further using a configuration of padding the tile boundary with a fixed value, the following expression may be used instead of (Expression FRUC-11) and (Expression FRUC-11b).

$$D1x = xPosX + mvX[0] - (xTs - xPad)$$

$$D2x = xTS + wT + xPad - (xPosX + mvX[0] + W)$$

$$D1y = yPosX + mvX[1] - (yTS - yPad)$$

$$D2y = yTS + hT + yPad - (yPosX + mvX[1] + H) \quad \text{(Expression FRUC-13)}$$

where xPad and yPad respectively represent width and height of the padding.

Alternatively, the following expression may be used.

$$D1x = \text{clip3}(0, Ddef, xPosX + mvX[0] - (xTs - xPad))$$

$$D2x = \text{clip3}(0, Ddef, xTS + wT + xPad - (xPosX + mvX[0] + W))$$

$$D1y = \text{clip3}(0, Ddef, yPosX + mvX[1] - (yTS - yPad))$$

$$D2y = \text{clip3}(0, Ddef, yTS + hT + yPad - (yPosX + mvX[1] + H)) \quad \text{(Expression FRUC-13b)}$$

In the matching process, even in a case that the template is located outside of the tile, or in a case that the motion vectors point to the outside of the tile, the reference pixel can be replaced with a pixel value within the tile, by deriving motion vectors and then generating a prediction image as described above. As a result, decrease in the frequency of using the matching process can be prevented, and inter prediction can be independently performed on the tiles. Therefore, coding efficiency can be enhanced.

OBMC Process

The motion compensation unit 3091 according to the present embodiment may generate a prediction image by means of an OBMC process. Here, an Overlapped block motion compensation (OBMC) process will be described. The OBMC process is a process of generating a compensation image (motion compensation image) of a target block, by using a compensation image PredC of a target sub-block generated using inter prediction parameters (hereinafter motion parameters) of the target block and a compensation image PredRN of the target block generated using motion parameters of neighboring blocks of the target sub-block. A process of correcting a compensation image of the target block is performed for each sub-block, by using the compensation image PredRN based on the motion parameters of neighboring blocks in pixels (boundary pixels) present within the target block close to the block boundary.

Figure 33:
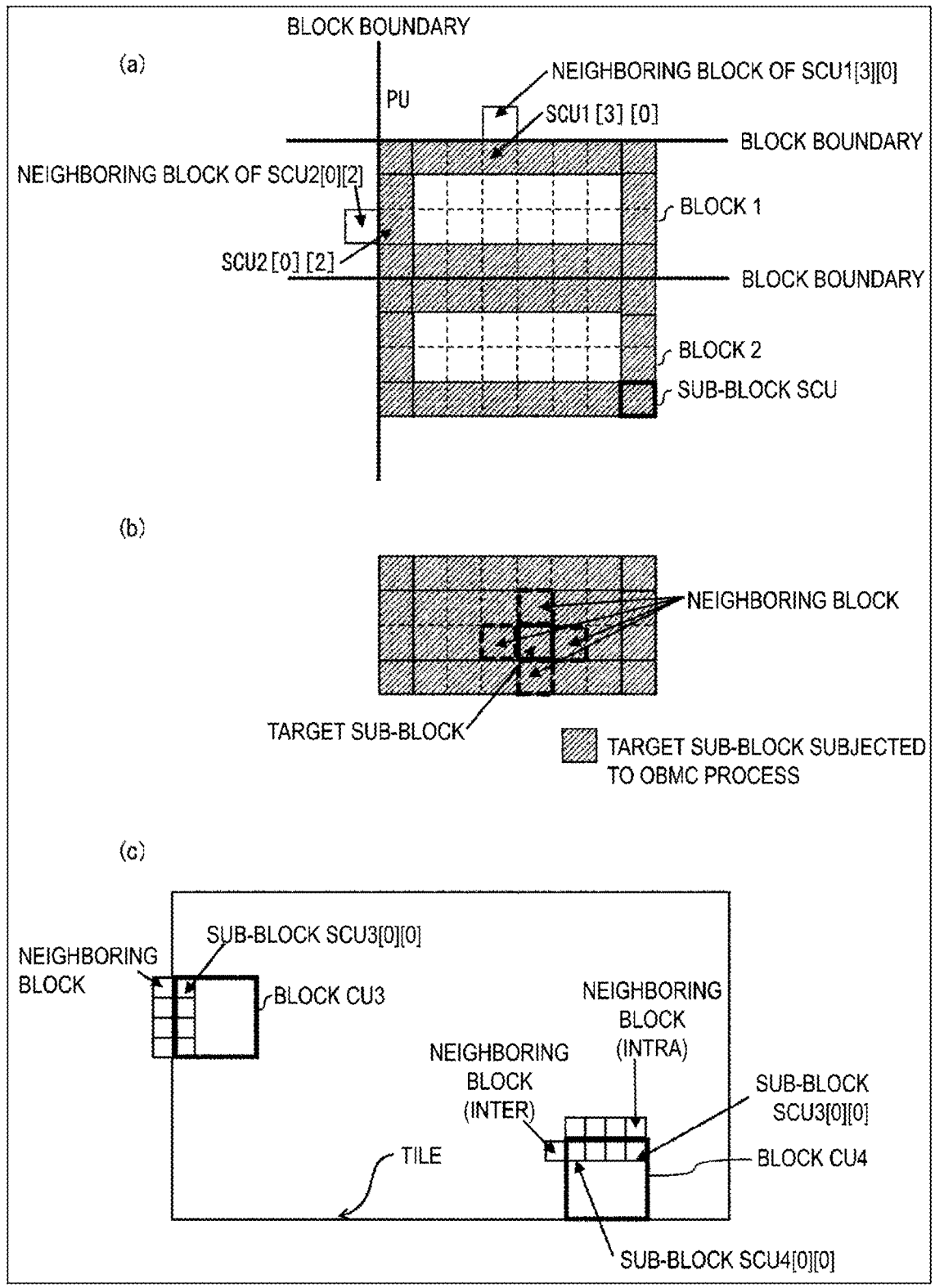
FIG. 33 is a diagram illustrating an example of a target sub-block and neighboring blocks of the target sub-block in OBMC prediction.

FIG. 33 is a diagram illustrating an example of a region in which a prediction image is generated by using motion parameters of neighboring blocks according to the present embodiment. Because the motion parameters within a block are the same in prediction per block, as illustrated in FIG. 33(a), the OBMC process applies to the pixels of the hatched sub-blocks present within a prescribed distance from the block boundary. Because the motion parameters are different for each sub-block in prediction per sub-block, as illustrated in FIG. 33(b), the OBMC process applies to the pixels of each of the sub-blocks.

Note that it is desirable that the OBMC process be performed for each sub-block obtained by splitting a block, because the shapes of the target block and the neighboring blocks are not necessarily the same. The size of the sub-block can have various values, from 4×4, 8×8, up to the block size.

Flow of OBMC Process

Figure 34:
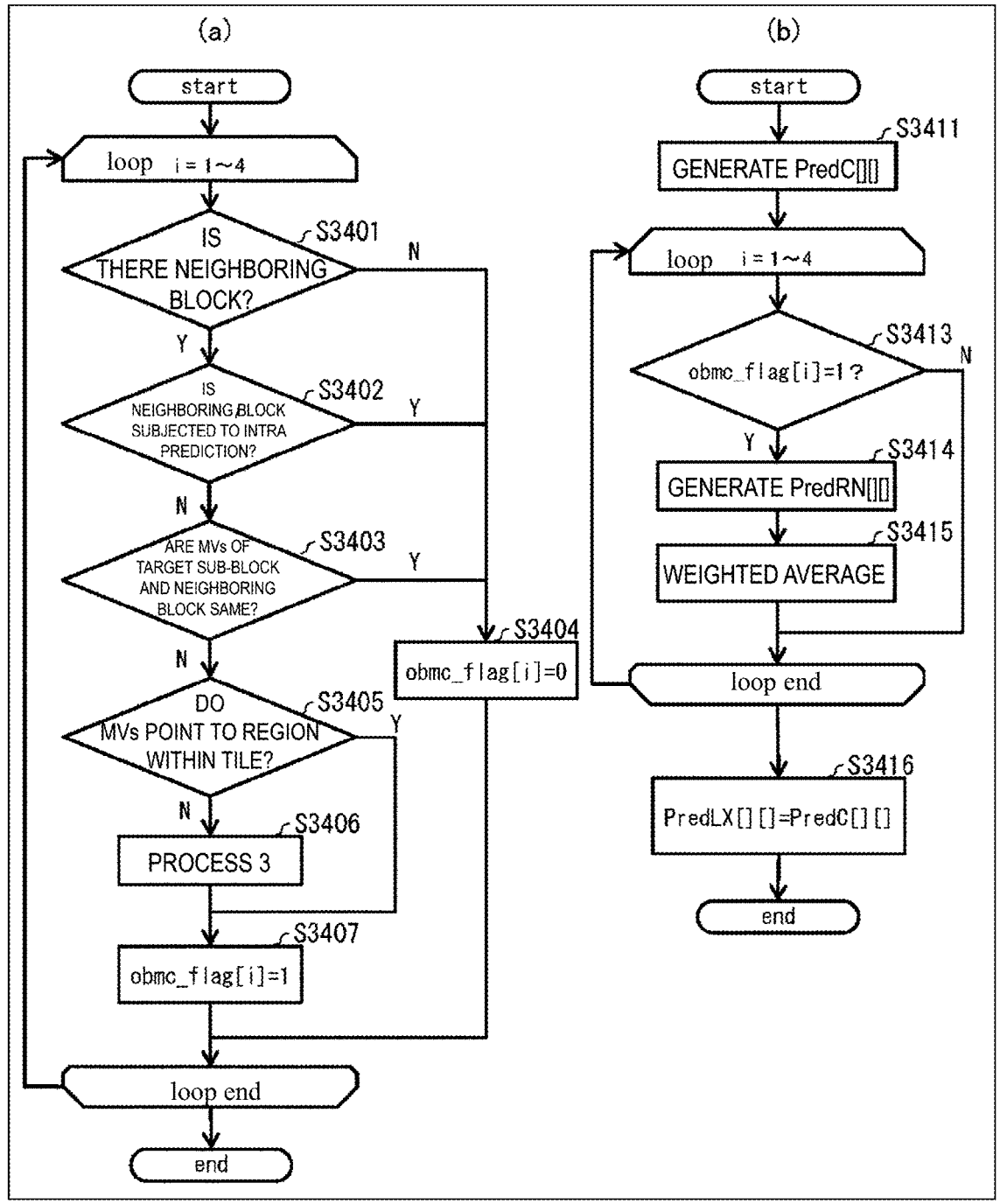
FIG. 34 is a flowchart illustrating a parameter derivation process in OBMC prediction.

FIG. 34 is a flowchart illustrating a parameter derivation process performed by the OBMC predictor 30374 according to the present embodiment.

The OBMC predictor 30374 determines the presence/absence and availability of neighboring blocks, which are neighbors of the target sub-block in each of directions of the upper side, the left side, the lower side, and the right side. In FIG. 34, a process for all the sub-blocks is first performed for each of the upper direction, the left direction, the lower direction, and the right direction, and then the process transitions to a process for the next direction; however, a process may be first performed in all the directions for a certain sub-block, and then the process may transition to a process for the next sub-block. In FIG. 34, regarding the directions of the neighboring blocks with respect to the target sub-block, i=1 represents the upper side, i=2 represents the left side, i=3 represents the lower side, and i=4 represents the right side.

First, the OBMC predictor 30374 checks the necessity of the OBMC process and the presence/absence of neighboring blocks (S3401). In a case that prediction is performed for each block and that the target sub-block does not touch the block boundary in the direction indicated by i, there are no neighboring blocks necessary for the OBMC process (N in S3401), and thus the process proceeds to S3404, and flag obmc_flag[i] is set to 0. Otherwise (in a case that prediction is performed for each block and that the target sub-block touches the block boundary, or in a case that the process is performed for each sub-block), there is a neighboring block necessary for the OBMC process (Y in S3401), and thus the process proceeds to S3402.

For example, a sub-block SCU1 [3][0] of FIG. 33(a) does not touch the block boundary on its left side, lower side, and right side, and thus obmc_flag[2]=0, obmc_flag[3]=0, and obmc_flag[4]=0. A sub-block SCU2 [0][2] does not touch the block boundary on its upper side, lower side, and right side, and thus obmc_flag[1]=0, obmc_flag[3]=0, and obmc_flag[4]=0. White sub-blocks are sub-blocks that do not touch the block boundary at all, and thus obmc_flag[1]=obmc_flag[2]=obmc_flag[3]=obmc_flag[4]=0.

Next, as availability of a neighboring block, the OBMC predictor 30374 checks whether a neighboring block in the direction indicated by i is an intra prediction block or a block outside of the tile (S3402). In a case that the neighboring block is an intra prediction block or a block outside of the tile (Y in S3402), the process proceeds to S3404, and obmc_flag[i] of a corresponding direction i is set to 0. Otherwise (in a case that the neighboring block is an inter prediction block and a block within the tile) (N in S3402), the process proceeds to S3403.

For example, in a case of FIG. 33(c), a left neighboring block of a target sub-block SCU3 [0][0] of a target block CU3 within the tile is located outside of the tile, and thus obmc_flag[2] of the target sub-block SCU3 [0][0] is set to 0. An upper neighboring block of a target sub-block SCU4 [3][0] of a target block CU4 within the tile is subjected to intra prediction, and thus obmc_flag[1] of the target sub-block SCU4 [3][0] is set to 0.

Next, as availability of the neighboring block, the OBMC predictor 30374 checks whether the motion parameters of the neighboring block in the direction indicated by i and the target sub-block are the same (S3403). In a case that the motion parameters are the same (Y in S3403), the process proceeds to S3404, and obmc_flag[i] is set to 0 (obmc_flag[i]=0). Otherwise (in a case that the motion parameters are different) (N in S3403), the process proceeds to S3405.

Whether or not the motion parameters of the sub-block and the neighboring block are the same is determined according to the following expression:

$$((\text{mv}LX[0]!=\text{mv}LXRN[0])\|(\text{mv}LX[1]!=\text{mv}LXRN[1])\|$$
$$(\text{refIdx}LX!=\text{refIdx}LXRN))? \quad \text{(Expression OBMC-1)}$$

where (mvLX[0], mvLX[1]) represents a motion vector of the target sub-block within the tile, refIdxLX represents a reference picture index thereof, (mvLXRN[0], mvLXRN[1]) represents a motion vector of the neighboring block in the direction indicated by i, and refIdxLXRN represents a reference picture index thereof.

For example, in FIG. 33(c), in a case that the motion vector and the reference picture index are the same, e.g., in a case that ((mvLX[0]==mvLXRN[0]) && (mvLX[1]==mvLXRN[1]) && (refIdxLX==refIdxLXRN)) is true, obmc_flag[2] of the target sub-block is 0 (obmc_flag[2]=0), where (mvLX[0], mvLX[1]) represents a motion vector of a target sub-block SCU4 [0][0], refIdxLX represents a reference picture index thereof, (mvLXR2 [0], mvLXR2 [1]) represents a motion vector of a left neighboring block, and refIdxLXR2 represents a reference picture index thereof.

Note that, although the above expression uses a motion vector and a reference picture index, determination may be performed by using a motion vector and a POC as in the following expression:

$$((\text{mv}LX[0]!=\text{mv}LXRN[0])\|(\text{mv}LX[1]!=\text{mv}LXRN[1])\|$$
$$(\text{refPOC}!=\text{refPOC}RN))? \quad \text{(Expression OBMC-2)}$$

where refPOC represents a POC of a target sub-block, and refPOCRN represents a POC of a neighboring block.

Next, the OBMC predictor 30374 determines whether or not all the regions pointed by the motion vectors of the neighboring blocks are present within the tile (in the reference picture, a part or all of blocks at positions shifted from the collocated block by mvN (N=0 . . . 4) are not present within the collocated tile) (S3405). In a case that all the regions pointed by the motion vectors are present within the tile (Y in S3405), the process proceeds to S3407. Otherwise (in a case that at least a part of the regions pointed by the motion vectors is present outside of the tile) (N in S3405), the process proceeds to S3406.

In a case that the motion vector of the neighboring block points to the outside of the tile, any one of Processes 3 described below is performed (S3406).

[Process 3A] Tile Boundary Padding

The motion compensation unit 3091 performs tile boundary padding. The tile boundary padding (out-of-tile padding) is, as described above, implemented by clipping a reference position, at positions of upper, lower, right, and left boundary pixels of the tile. For example, a reference pixel (xRef, yRef) of the sub-block is derived according to the following expression:

$$x\text{Ref}+i=\text{Clip3}(xTs,xTs+wT-BW,xs+(\text{Mv}LXRN[0]>>\log 2(M)))$$

$$y\text{Ref}+j=\text{Clip3}(yTs,yTs+hT-BH,ys+(\text{Mv}LXRN[1]>>\log 2(M))) \quad \text{(Expression OBMC-3)}$$

where (xs, ys) represents upper left coordinates of the target sub-block with respect to upper left coordinates of the picture, BW and BH respectively represent width and height of the target sub-block, (xTs, yTs) represents upper left coordinates of the target tile at which the target sub-block is located, wT and hT respectively represent width and height of the target tile, and (MvLXRN[0], MvLXRN[1]) represents a motion vector of the neighboring block.

[Process 3B] Tile Boundary Motion Vector Restriction

Clipping is performed so that the motion vector MvLXRN of the neighboring block does not refer to the outside of the tile.

[Process 3C] Tile Boundary Motion Vector Replacement (Alternative Motion Vector Replacement)

A motion vector is copied from a neighboring sub-block that has a motion vector pointing to the inside of the collocated tile.

[Process 3D] Turn Off Tile Boundary OBMC

In a case that a reference image is referred to by the motion vector (MvLXRN[0], MvLXRN[1]) of the neighboring block in the direction i and it is determined that this reference points to the outside of the collocated tile, obmc_flag[i] is set to 0 (obmc_flag[i]=0) (the OBMC process is not performed in the direction i). In this case, the process proceeds forward by skipping S3407.

Note that, in Process 3, the tile encoder 2002 and the tile decoder 2012 need to select the same process.

In a case that the motion vector of the neighboring block points to the inside of the tile, or in a case that Process 3 is performed, the OBMC predictor 30374 sets obmc_flag[i]=1 (S3407).

Next, after the OBMC predictor 30374 performs the process of S3401 to S3407 described above for all the directions (i=1 to 4) of the sub-blocks, the process ends.

The OBMC predictor 30374 outputs the prediction parameters (obmc_flag and the motion parameters of the neighboring block of each sub-block) derived in the above to the inter prediction image generator 309. The inter prediction image generator 309 refers to obmc_flag to determine the necessity of the OBMC process, and performs the OBMC process for the target block (details thereof will be described in Motion Compensation).

Note that, in a case that there is obmc_flag notified from the tile encoder 2002, the tile decoder 2012 may set notified obmc_flag to obmc_flag[i], and may perform the above process only in a case of obmc_flag[i]=1.

BTM

A BTM predictor 3038 uses a prediction image generated using a bi-directional motion vector derived by the merge prediction parameter deriver 3036 as a template, performs a bilateral template matching (BTM) process, and thereby derives a motion vector with high accuracy.

Example of Motion Vector Derivation Process

In a case that two motion vectors derived in the merge mode point to a direction opposite to the target block, the BTM predictor 3038 performs the bilateral template matching (BTM) process.

Figure 35:
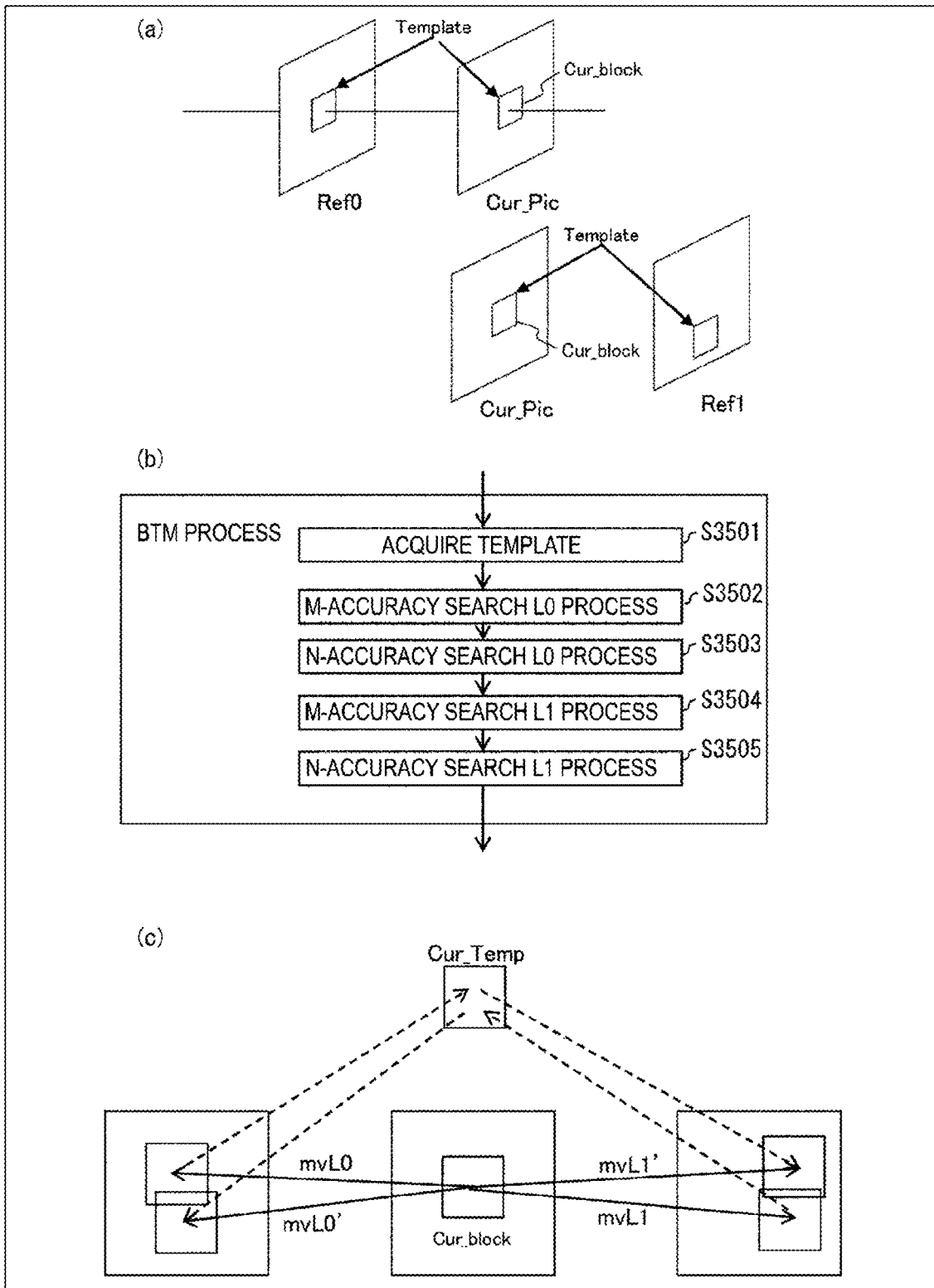
FIG. 35 is a diagram illustrating a bilateral template matching process.

The bilateral template matching (BTM) process will be described with reference to FIG. 35. FIG. 35(a) is a diagram illustrating a relationship between a reference picture and a template in BTM prediction, FIG. 35(b) is a diagram illustrating a flow of the process, and FIG. 35(c) is a diagram illustrating a template in BTM prediction.

As illustrated in FIGS. 35(a) and 35(c), first, the BTM predictor 3038 generates a prediction block of a target block Cur_block, based on multiple motion vectors (for example, mvL0 and mvL1) derived by the merge prediction parameter deriver 3036, and uses the generated prediction block as a template. Specifically, a prediction block Cur_Temp is generated based on a motion compensation image predL0 generated based on mvL0 and a motion compensation image predL1 generated based on mvL1.

$$\text{Cur\_Temp}[x][y]=\text{Clip3}(0,(1<<\text{bitDepth})-1,(\text{pred}L0[x][y]+\text{pred}L1[x][y]+1)>>1) \quad \text{(Expression BTM-1)}$$

Next, within a range±D pixels around each of mvL0 and mvL1 (initial vector), the BTM predictor 3038 configures motion vector candidates, and derives matching costs between each of the motion compensation images PredL0 and PredL1 generated by the motion vector candidates and the template. Then, vectors mvL0' and mvL1' that lead to the minimum matching cost are used as updated motion vectors of the target block. Note that a search range is restricted to a range within the collocated tile on the reference pictures Ref0 and Ref1.

Next, the flow of BTM prediction will be described with reference to FIG. 35(b). First, the BTM predictor 3038 acquires a template (S3501). The template is, as described above, generated based on the motion vectors (for example, mvL0 and mvL1) derived by the merge prediction parameter deriver 3036. Next, the BTM predictor 3038 performs a local search within the collocated tile. The local search may be performed in a manner of repeatedly performing searches of multiple different accuracies, as in S3502 to S3505. For example, the local search is performed in the order of an M-pixel accuracy search L0 process (S3502), an N-pixel accuracy search L0 process (S3503), an M-pixel accuracy search L1 process (S3504), and an N-pixel accuracy search L1 process (S3505). Here, M>N, and for example, M may be 1-pixel accuracy (M=1-pixel accuracy) and N may be ½-pixel accuracy (N=½-pixel accuracy).

In an M-pixel accuracy LX search process (X=0 . . . 1), a search is performed around coordinates indicated by mvLX, within the tile. In an N-pixel accuracy search LX process, a search is performed around coordinates that lead to the minimum matching cost in the M-pixel accuracy search LX process, within the tile.

Note that the tile boundary may be padded and extended in advance. In this case, the motion compensation unit 3091 performs a padding process in a similar manner.

In order to allow independent decoding of each tile in a case that independent_tile_flag is 1, as expressed in (Expression FRUC-11) to (Expression FRUC-13), the search range D may be adaptively changed so that pixels outside of the collocated tile are not referred to in the motion vector search process. In the BTM process, (mvX[0], mvX[1]) of (Expression FRUC-11) and (Expression FRUC-13) is replaced by (mvLX[0], mvLX[1]).

By modifying the motion vectors derived in the merge mode as in the manner described above, a prediction image can be improved. Moreover, by restricting the modified motion vectors to a range within the tile, decrease in the frequency of using the bilateral template matching process can be prevented, and inter prediction can be independently performed on the tiles. Therefore, coding efficiency can be enhanced.

Figure 8:
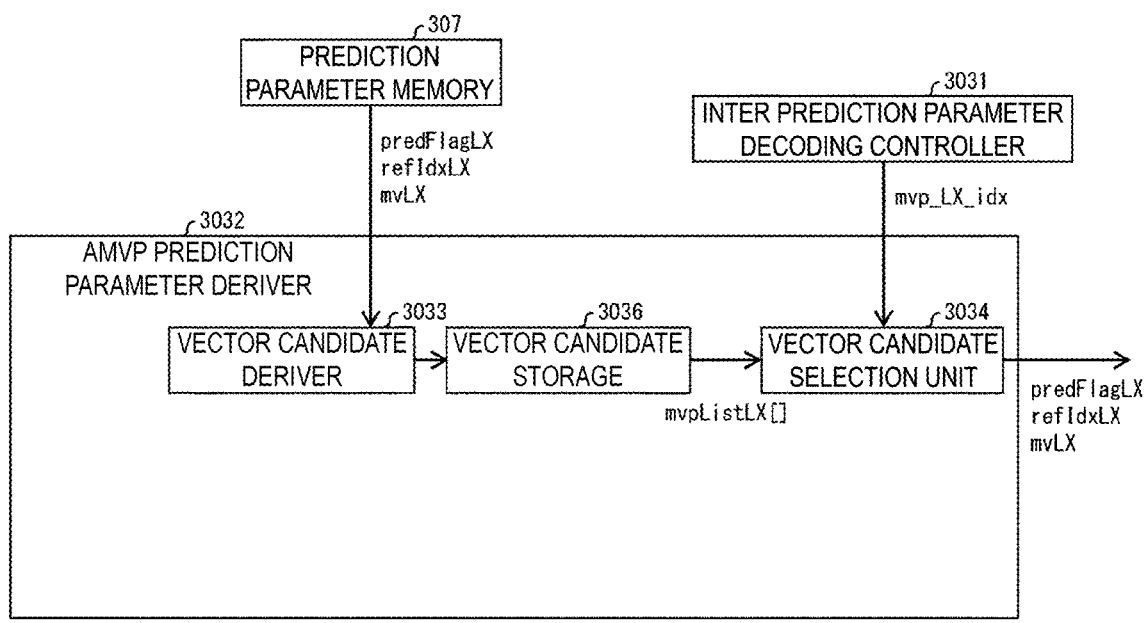
FIG. 8 is a diagram illustrating a configuration of an AMVP prediction parameter deriver according to the present embodiment.

FIG. 8 is a schematic diagram illustrating a configuration of the AMVP prediction parameter deriver 3032 according to the present embodiment. The AMVP prediction parameter deriver 3032 includes a vector candidate deriver 3033, a vector candidate selection unit 3034, and a vector candidate storage 3036. The vector candidate deriver 3033 derives prediction vector candidates from the motion vector mvLX of a processed PU stored in the prediction parameter memory 307, based on the reference picture index refIdx, and stores the derived prediction vector candidates in the prediction vector candidate list mvpListLX[ ] of the vector candidate storage 3036.

The vector candidate selection unit 3034 selects a motion vector mvpListLX[mvp_lX_idx] indicated by the prediction vector index mvp_lX_idx among the prediction vector candidates in the prediction vector candidate list mvpListLX[ ], as the prediction vector mvpLX. The vector candidate selection unit 3034 outputs the selected prediction vector mvpLX to the addition unit 3035.

Note that the prediction vector candidates are derived by scaling motion vectors of PUs that have been subjected to a decoding process and that are located within a predetermined range with respect to a decoding target PU (for example, the PUs are neighboring PUs). Note that the neighboring PUs include spatial neighboring PUs of the decoding target PU, such as a left PU and an upper PU, as well as temporal neighboring regions of the decoding target PU, such as a region obtained from a prediction parameter of a PU with different display time and including the same position as the position of the decoding target PU. Note that, as described in derivation of temporal merge candidates, by changing the position of the lower right block of the collocated block to the lower right position within the tile illustrated in FIG. 21(f), the tile sequence can be independently decoded by means of AMVP prediction without reducing coding efficiency in a case of independent_tile_flag=1.

The addition unit 3035 calculates a motion vector mvLX by adding the prediction vector mvpLX input from the AMVP prediction parameter deriver 3032 and the difference vector mvdLX input from the inter prediction parameter decoding controller 3031. The addition unit 3035 outputs the calculated motion vector mvLX to the prediction image generator 308 and the prediction parameter memory 307.

Note that, instead of directly outputting the motion vector derived by the merge prediction parameter deriver 3036 to the inter prediction image generator 309, the motion vector may be output through the BTM predictor 3038.

LIC Predictor 3039

Local Illumination Compensation (LIC) prediction is a process of performing linear prediction for a pixel value of a target block Cur_block, based on pixel values of neighboring regions Ref_Temp (FIG. 36(a)) in a region on the reference picture pointed by a motion vector derived in merge prediction, sub-block prediction, AMVP prediction, or the like, and pixel values of neighboring regions Cur_Temp (FIG. 36(b)) of the target block. A combination of a scaling coefficient a and an offset b that leads to a minimum square error SSD between a prediction value Cur_Temp' of the neighboring region of the target block calculated based on the neighboring region Ref_Temp in the region on the reference picture and the neighboring region Cur_Temp of the target block is calculated as in the following expression:

$$\text{Cur\_Temp}'[\ ][\ ]=a*\text{Ref\_Temp}[\ ][\ ]+b$$

$$\text{SSD}=\Sigma\Sigma(\text{Cur\_Temp}'[x][y]-\text{Cur\_Temp}[x][y])^2 \quad \text{(Expression LIC-1)}$$

where $\Sigma\Sigma$ represents a sum with respect to x and y.

Figure 36:
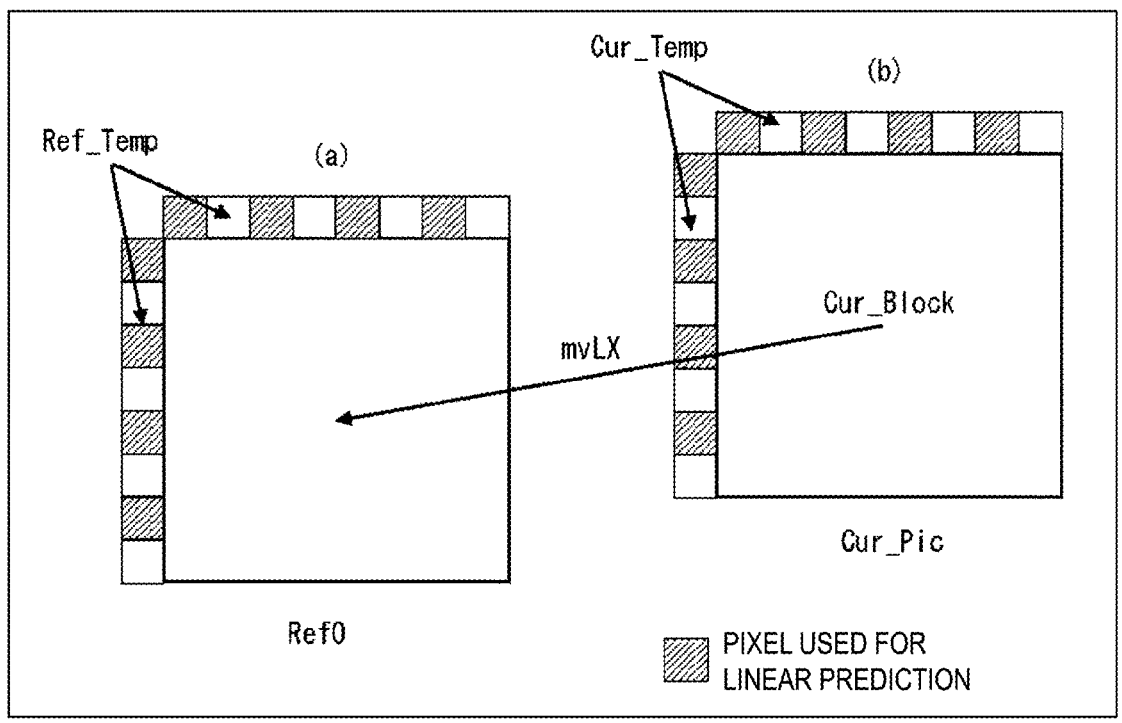
FIG. 36 is a diagram illustrating an example of pixels used to derive prediction parameters of LIC prediction.

Note that, in FIG. 36, pixel values used to calculate a and b are sub-sampled, but all the pixel values within a region may be used without being sub-sampled.

In a case that a part of the region of either one of the neighboring region Cur_Temp of the target block and the neighboring region Ref_Temp of the reference block is located outside of the tile or the collocated tile, only pixels within the tile or the collocated tile may be used. For example, in a case that an upper neighboring region of the reference block is located outside of the collocated tile, Cur_Temp and Ref_Temp use only pixels of a left neighboring region of the target block and the reference block. For example, in a case that a left neighboring region of the reference block is located outside of the collocated tile, Cur_Temp and Ref_Temp may use only pixels of an upper neighboring region of the target block and the reference block.

Alternatively, in a case that a part of the region of either one of the neighboring region Cur_Temp of the target block and the neighboring region Ref_Temp of the reference block is located outside of the tile or the collocated tile, LIC prediction may be turned off, and the motion compensation unit 3091 need not perform LIC prediction.

Alternatively, in a case that a part of the region of either one of the neighboring region Cur_Temp of the target block and the neighboring region Ref_Temp of the reference block is located outside of the tile or the collocated tile, the region may be set by using pixels within the tile or the collocated tile, on a condition that the size of the region included in the tile or the collocated tile is larger than a threshold. Otherwise, LIC prediction may be turned off. For example, in a case that an upper neighboring region of the reference block is located outside of the collocated tile, and a threshold TH is 16 (threshold TH=16), Cur_Temp and Ref_Temp use pixels of a left neighboring region of the target block and the reference block, on a condition that the height H of the target block is larger than 16. In this case, LIC prediction is turned off, on a condition that the height H of the target block is equal to or less than 16.

Note that pixels to be used may be sub-sampled, or all the pixel values within a region may be used without being sub-sampled.

In these processes, the tile encoder 2002 and the tile decoder 2012 need to select the same process.

The calculated a and b are output to the motion compensation unit 3091, together with the motion vector and the like.

Inter Prediction Image Generator 309

Figure 11:
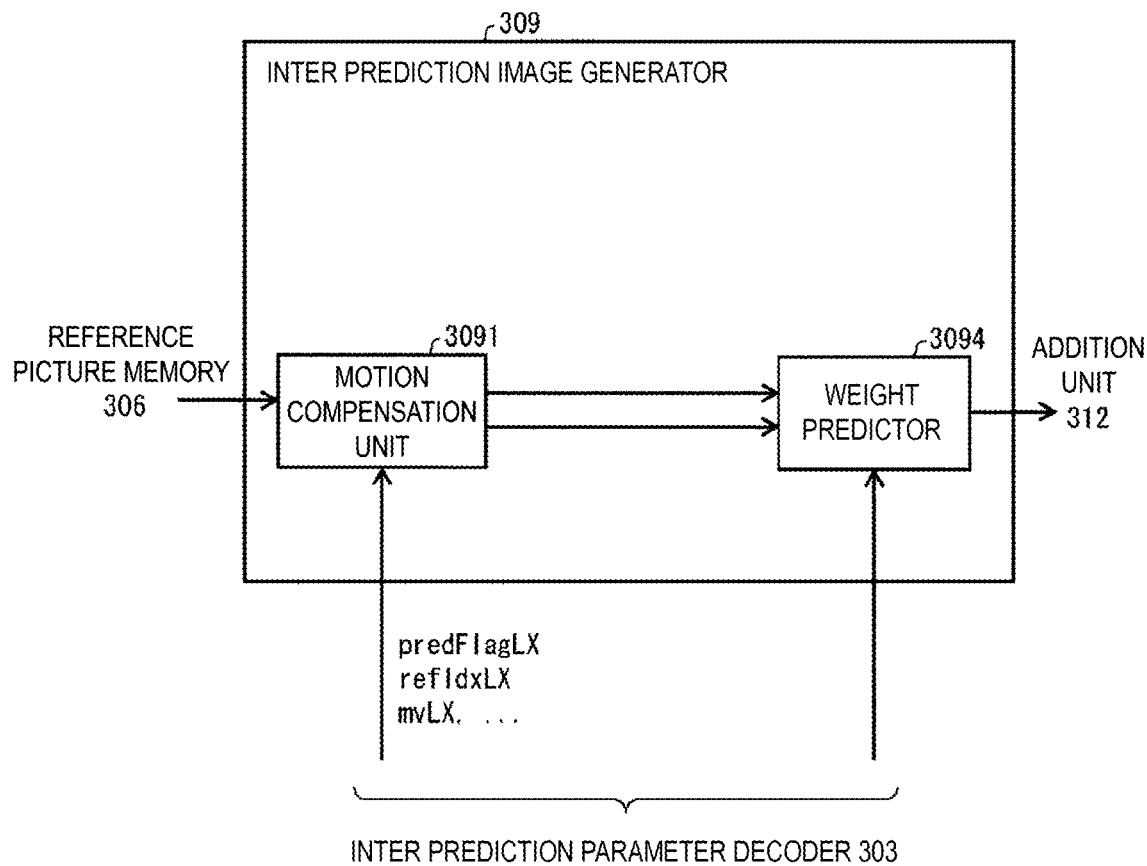
FIG. 11 is a diagram illustrating a configuration of the inter prediction image generator according to the present embodiment.

FIG. 11 is a schematic diagram illustrating a configuration of the inter prediction image generator 309 included in the prediction image generator 308 according to the present embodiment. The inter prediction image generator 309 includes a motion compensation unit (prediction image generation device) 3091 and a weighted predictor 3094.

Motion Compensation

Based on the inter prediction parameters (a prediction list use flag predFlagLX, a reference picture index refIdxLX, a motion vector mvLX, an on/off flag, and the like) input from the inter prediction parameter decoder 303, the motion compensation unit 3091 reads from the reference picture memory 306 a block located at the position shifted by the motion vector mvLX from the position of the decoding target PU in the reference picture RefX indicated by the reference picture index refIdxLX, and thereby generates a compensation image (motion compensation image). Here, in a case that accuracy of the motion vector mvLX is not integer accuracy, a filter, called a motion compensation filter, for generating pixels at fractional positions is applied to generate a motion compensation image.

In a case that the motion vector mvLX or the motion vector mvLXN input to the motion compensation unit 3091 is 1/M-pixel accuracy (M is a natural number of 2 or greater), an interpolation filter is applied to generate a compensation image, based on a pixel value of the reference picture at an integer pixel position. Specifically, a compensation image Pred[ ][ ] (described above) is generated based on product-sum operation of an NTAP-tap interpolation filter coefficient mcFilter[nFrac][k] (k=0 . . . NTAP−1) corresponding to a phase nFrac and a pixel of the reference picture.

First, the motion compensation unit 3091 derives an integer position (xInt, yInt) and a phase (xFrac, yFrac) corresponding to coordinates (x, y) within the prediction block, according to the following expression:

$xInt = xb + (mvLX[0] >> (\log 2(M))) + x$ $xFrac = mvLX[0] \& (M-1)$ $yInt = yb + (mvLX[1] >> (\log 2(M))) + y$ $yFrac = mvLX[1] \& (M-1)$   (Expression INTER-1)

where (xb, yb) represents upper left coordinates of a block, x=0 . . . nW−1, y=0 . . . nH−1, and M represents accuracy (1/M-pixel accuracy) of the motion vector mvLX.

The motion compensation unit 3091 performs a horizontal interpolation process by using an interpolation filter for a reference picture refImg to derive a temporary image temp[ ][ ]. In the following expression, $\Sigma$ represents a sum with respect to k for k=0 . . . NTAP−1, shift1 represents a normalization parameter for adjusting a range of a value, and offset1=1<<(shift1−1).

$temp[x][y] = (\Sigma mcFilter[xFrac][k] * refImg[xInt+k-NTAP/2+1][yInt] + offset1) >> shift1$  (Expression INTER-2)

Note that padding (described later) is performed in a case that a pixel refImg[xInt+k−NTAP/2+1][yInt] on the reference picture is referred to.

Subsequently, the motion compensation unit 3091 performs a vertical interpolation process for the temporary image temp[ ][ ] to derive a compensation image Pred[ ][ ]. In the following expression, $\Sigma$ represents a sum with respect to k for k=0 . . . NTAP−1, shift2 represents a normalization parameter for adjusting a range of a value, and offset2=1<<(shift2−1).

$Pred[x][y] = (\Sigma mcFilter[yFrac][k] * temp[x][y+k-NTAP/2+1] + offset2) >> shift2$  (Expression INTER-3)

Note that, in a case of bi-prediction, above Pred[ ][ ] is derived for each of the lists L0 and L1 (respectively referred to as compensation images PredL0[ ][ ] and PredL1[ ][ ]), and the compensation image Pred[ ][ ] is generated based on the compensation image PredL0[ ][ ] and the compensation image PredL1[ ][ ].

Note that, in a case that at least a part of the input motion vector mvLX and motion vector mvLXN points to the outside of the collocated tile of the tile where the target block is located, inter prediction can be independently performed for the tile by padding the tile boundary in advance.

Padding

In (Expression INTER-2) described above, the pixel refImg[xInt+k−NTAP/2+1][yInt] on the reference picture is referred to; however, in a case that an actually non-existent pixel value outside of a picture is referred to, the following picture boundary padding (out-of-picture padding) is performed. The picture boundary padding is implemented by using a pixel value refImg[xRef+i][yRef+j] of the following position xRef+i, yRef+j for the pixel value of a position (xIntL+i, yIntL+j) of the reference pixel.

$xRef + i = Clip3(0, pic\_width\_in\_luma\_samples-1, xIntL+i)$ $yRef + j = Clip3(0, pic\_height\_in\_luma\_samples-1, yIntL+j)$  (Expression PAD-3)

Note that, instead of the picture boundary padding (Expression PAD-3), the tile boundary padding (Expression PAD-1) may be performed.

OBMC Compensation Image Generation

In OBMC, two types of compensation images, i.e., a compensation image of a target sub-block derived based on inter prediction parameters of a target block and a compensation image derived based on inter prediction parameters of a neighboring block, are generated, and then a compensation image to be finally used for prediction is generated through a weighted addition process of these two compensation images. The compensation image of the target sub-block derived based on the inter prediction parameters of the target block is herein referred to as a compensation image PredC (first OBMC compensation image), and the compensation image derived based on the inter prediction parameters of the neighboring block is herein referred to as a compensation image PredRN (second OBMC compensation image). Note that N represents any one of the upper side (A), the left side (L), the lower side (B), and the right side (R) of the target sub-block. In a case that the OBMC process is not performed (OBMC off), the compensation image PredC is directly used as the motion compensation image PredLX of the target sub-block. In a case that the OBMC process is performed (OBMC on), the motion compensation image PredLX of the target sub-block is generated based on the compensation image PredC and the compensation image PredRN.

The motion compensation unit 3091 generates a compensation image, based on the inter prediction parameters (a prediction list use flag predFlagLX, a reference picture index refIdxLX, a motion vector mvLX, and an OBMC flag obmc_flag) of the target sub-block input from the inter prediction parameter decoder 303.

FIG. 34(b) is a flowchart illustrating operation of compensation image generation in OBMC prediction performed by the motion compensation unit 3091.

First, the motion compensation unit 3091 generates a compensation image PredC[x][y] (x=0 ... BW−1, y=0 ... BH−1), based on prediction parameters (S3411).

Next, whether or not obmc_flag[i] is 1 (obmc_flag[i]=1) is determined (S3413). In a case of obmc_flag[i]=0 (N in S3413), the process proceeds for the next direction (i=i+1). In a case of obmc_flag[i]=1 (Y in S3413), a compensation image PredRN[x][y] is generated (S3414). Specifically, only for the sub-block in the direction indicated by i that satisfies obmc_flag[i]=1, the compensation image PredRN[x][y] (x=0 ... BW−1, y=0 ... BH−1) is generated based on a prediction list use flag predFlagLX[xPbN][yPbN], a reference picture index refIdxLX[xPbN][yPbN], and a motion vector mvLX[xPbN][yPbN] of the neighboring block that are input from the inter prediction parameter decoder 303 (S3414), a weighted average process for the compensation image PredC[x][y] and the compensation image PredRN[x][y] (described below) is performed (S3415), and the compensation image PredLX is generated (S3416). Note that (xPbN, yPbN) represents upper left coordinates of the neighboring block.

Next, a weighted average process is performed (S3415).

In the configuration of performing the OBMC process, the motion compensation unit 3091 performs a weighted average process for the compensation image PredC[x][y] and the compensation image PredRN[x][y], and thereby updates the compensation image PredC[x][y]. Specifically, in a case that the OBMC flag obmc_flag[i] input from the inter prediction parameter decoder 303 is 1 (OBMC flag obmc_flag[i]=1 (OBMC process is enabled), the motion compensation unit 3091 performs the following weighted average process for S pixels at the sub-block boundary in the direction indicated by i.

$$\text{Pred}C[x][y] = ((w1 * \text{Pred}C[x][y] + w2 * \text{Pred}RN[x][y]) + o) >> \text{shift} \qquad \text{(Expression INTER-4)}$$

Here, weights w1 and w2 of the weighted average process will be described. The weights w1 and w2 of the weighted average process are determined according to the distance (the number of pixels) between the sub-block boundary and the target pixel. The relationship of w1+w2=(1<<shift) and o=1<<(shift−1) holds.

In the OBMC process, a prediction image is generated by using compensation images of multiple neighboring blocks. Here, a method of updating PredC[x][y] based on motion parameters of multiple neighboring blocks will be described.

First, in a case of obmc_flag[1]=1, the motion compensation unit 3091 applies a compensation image PredRA[x][y], which is generated by using motion parameters of an upper neighboring block, to a compensation image PredC[x][y] of a target sub-block, and thereby updates PredC[x][y].

$$\text{Pred}C[x][y] = ((w1 * \text{Pred}C[x][y] + w2 * \text{Pred}RA[x][y]) + o) >> \text{shift} \qquad \text{(Expression INTER-5)}$$

Next, for the direction i satisfying obmc_flag[i]=1, the motion compensation unit 3091 sequentially updates PredC[x][y] by using compensation images PredRL[x][y], PredRL[x][y], and PredRL[x][y], which are generated by using motion parameters of left (i=2), lower (i=3), and right (i=4) neighboring blocks of the target sub-block. Specifically, the update is performed according to the following expression:

$$\text{Pred}C[x][y] = ((w1 * \text{Pred}C[x][y] + w2 * \text{Pred}RL[x][y]) + o) >> \text{shift}$$

$$\text{Pred}C[x][y] = ((w1 * \text{Pred}C[x][y] + w2 * \text{Pred}RB[x][y]) + o) >> \text{shift}$$

$$\text{Pred}C[x][y] = ((w1 * \text{Pred}C[x][y] + w2 * \text{Pred}RR[x][y]) + o) >> \text{shift} \qquad \text{(Expression INTER-6)}$$

In a case of obmc_flag[0]=0, or for i=1 to 4, the above process is performed, and then PredC[x][y] is set to the prediction image PredLX[x][y] (S3416).

$$\text{Pred}LX[x][y] = \text{Pred}C[x][y] \qquad \text{(Expression INTER-7)}$$

As described above, the motion compensation unit 3091 can generate a prediction image in consideration of motion parameters of the neighboring blocks of the target sub-block. Therefore, in the OBMC process, a prediction image with high prediction accuracy can be generated.

The number S of pixels at the sub-block boundary updated in the OBMC process may be any number (S=2 to the block size). A split manner for a block including a sub-block to be subjected to the OBMC process may be any split manner, such as 2N×N, N×2N, and N×N.

Even in a case that a motion vector of the sub-block points to the outside of the tile, the reference pixel can be replaced by using a pixel value within the tile, by deriving OBMC motion vectors and then generating a prediction image as described above. As a result, decrease in the frequency of using the OBMC process can be prevented, and inter prediction can be independently performed on the tiles. Therefore, coding efficiency can be enhanced.

LIC Compensation Image Generation

In LIC, the compensation image Pred of the target block derived according to (Expression INTER-3) is modified by using the scaling coefficient a and the offset b calculated by the LIC predictor 3039, and a prediction image PredLX is thereby generated.

$$\text{Pred}LX[x][y] = \text{Pred}[x][y] * a + b \qquad \text{(Expression INTER-8)}$$

Weighted Prediction

The weighted predictor 3094 multiplies the input motion compensation image PredLX by a weighting coefficient, and thereby generates a prediction image of the target block. In a case that one of the prediction list use flags (predFlagL0 or predFlagL1) is 1 (in a case of uni-prediction), and weighted prediction is not used, a process of the following expression for adjusting the input motion compensation image PredLX (LX is L0 or L1) to the number bitDepth of pixel bits is performed.

Pred[x][y]=Clip3(0,(1<<bitDepth)−1,(Pred$LX$[x][y]+
offset1)>>shift1)  (Expression INTER-9)

where shift1=14−bitDepth, and offset1=1<<(shift1−1).

In a case that both of the prediction list use flags (predFlagL0 and predFlagL1) are 1 (in a case of bi-prediction BiPred), and weighted prediction is not used, a process of the following expression for averaging the input motion compensation images PredL0 and PredL1 and adjusting to the number of pixel bits is performed.

Pred[x][y]=Clip3(0,(1<<bitDepth)−1,(Pred$L0$[x][y]+
Pred$L1$[x][y]+offset2)>>shift2)  (Expression INTER-10)

where shift2=15−bitDepth, and offset2=1<<(shift2−1).

Furthermore, in a case of uni-prediction, and that weighted prediction is performed, the weighted predictor 3094 derives a weighted prediction coefficient w0 and an offset o0 from coded data, and performs a process of the following expression:

Pred[x][y]=Clip3(0,(1<<bitDepth)−1,((Pred$LX$[x][y]*
w0+2^(log 2$WD$−1))>>log
2$WD$)+o0)  (Expression INTER-11)

where log 2WD represents a variable indicating a prescribed shift amount.

Furthermore, in a case of bi-prediction BiPred, and that weighted prediction is performed, the weighted predictor 3094 derives weighted prediction coefficients w0, w1, o0, and o1 from coded data, and performs a process of the following expression:

Pred[x][y]=Clip3(0,(1<<bitDepth)−1,(Pred$L0$[x][y]*
w0+Pred$L1$[x][y]*w1+((o0+o1+1)<<
log 2$WD$))>>(log 2$WD$+1))  (Expression INTER-12)

Motion Vector Decoding Process

A motion vector decoding process according to the present embodiment will be specifically described below with reference to FIG. 9.

As is apparent from the above description, the motion vector decoding process according to the present embodiment includes a process of decoding syntax elements associated with inter prediction (also referred to as a motion syntax decoding process), and a process of deriving a motion vector (motion vector derivation process).

Motion Syntax Decoding Process

Figure 9:
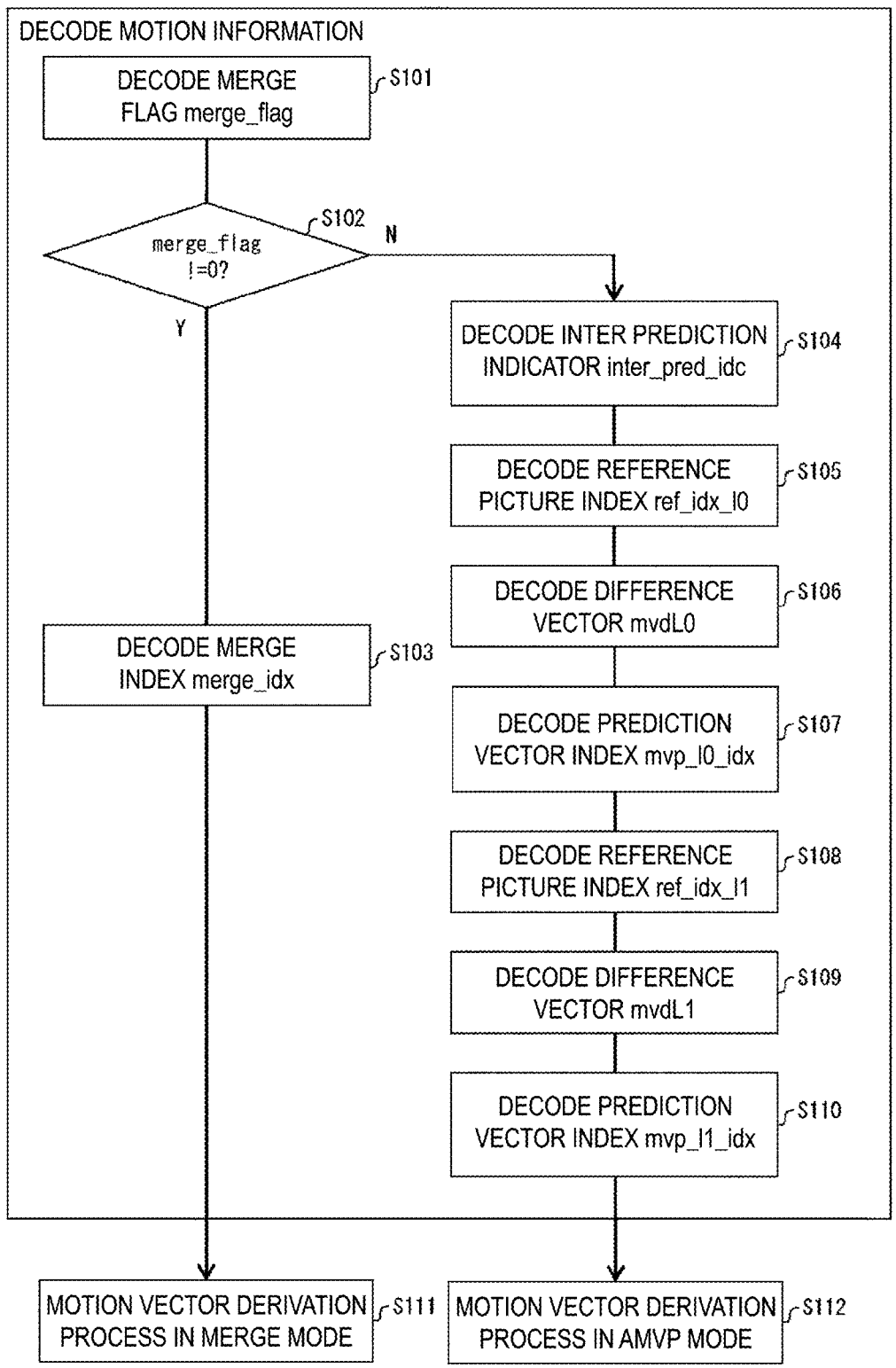
FIG. 9 is a flowchart illustrating operation of a decoding process of motion information according to the present embodiment.

FIG. 9 is a flowchart illustrating a flow of an inter prediction syntax decoding process performed by the inter prediction parameter decoding controller 3031. In the following description concerning the description of FIG. 9, each process is performed by the inter prediction parameter decoding controller 3031, unless otherwise specifically noted.

First, in Step S101, a merge flag merge_flag is decoded, and in Step S102, whether or not merge_flag is 0 (merge_flag!=0) is determined.

In a case that merge_flag!=0 is true (Y in S102), in S103, a merge index merge_idx is decoded, and a motion vector derivation process of the merge mode (S111) is performed.

In a case that merge_flag!=0 is false (N in S102), in S104, an inter prediction indicator inter_pred_idc is decoded.

In a case that inter_pred_idc is other than PRED_L1 (PRED_L0 or PRED_BI), a reference picture index ref_idx_l0, a parameter mvdL0 of a difference vector, and a prediction vector index mvp_l0_idx are decoded respectively in S105, S106, and S107.

In a case that inter_pred_idc is other than PRED_L0 (PRED_L1 or PRED_BI), a reference picture index ref_idx_l1, a parameter mvdL1 of a difference vector, and a prediction vector index mvp_l1_idx are decoded respectively in S108, S109, and S110. Subsequently, a motion vector derivation process of the AMVP mode (S112) is performed.

Owing to the configuration as described above, the image decoding device 2000 can independently decode the tiles for each tile sequence in a case that a value of independent_tile_flag is 1. A system of guaranteeing independence of decoding of each tile is introduced in each individual tool, and therefore decrease in coding efficiency can be prevented, and each tile can be independently decoded in a video. As a result, decoding can be performed in a selected region necessary for display or the like, and therefore a processing amount can be reduced in a great degree.

Configuration of Image Encoding Device

FIG. 20(b) illustrates a video encoding device 2020 according to the present invention. The video encoding device 2020 includes a picture splitter 2010, a header information generator 2011, tile encoders 2012a to 2012n, and a coding stream generator 2013.

The picture splitter 2010 splits a picture into non-overlapping multiple tiles, and transmits the tiles to the tile encoders 2012a to 2012n. The header information generator 2011 generates tile information (a Tile Id, the number of splits of the tile, and information related to the size) from the split tiles, and transmits the tile information as header information to the coding stream generator 2013.

The tile encoders 2012a to 2012n code each tile. The tile encoders 2012a to 2012n also code the tiles for each tile sequence. In this manner, according to the tile encoders 2012a to 2012n, tiles can be subjected to a coding process in parallel.

Here, the tile encoders 2012a to 2012n perform a coding process for the tile sequence in a similar manner to that for one independent video sequence, and do not either temporally or spatially refer to prediction information of a tile sequence with a different Tile ID in a case of performing the coding process. Specifically, in a case of coding a tile within a certain picture, the tile encoders 2012a to 2012n do not either spatially or temporally refer to another tile.

The coding stream generator 2013 generates a coding stream Te for each NAL unit, based on the header information including the tile information transmitted from the header information generator 2011, and the tiles coded by the tile encoders 2012a to 2012n.

In this manner, the tile encoders 2012a to 2012n can independently code each tile. As a result, multiple tiles can be subjected to a coding process in parallel, a decoding device can perform a decoding process for multiple tiles in parallel, or only one tile can be independently decoded.

Configuration of Tile Encoder

Figure 4:
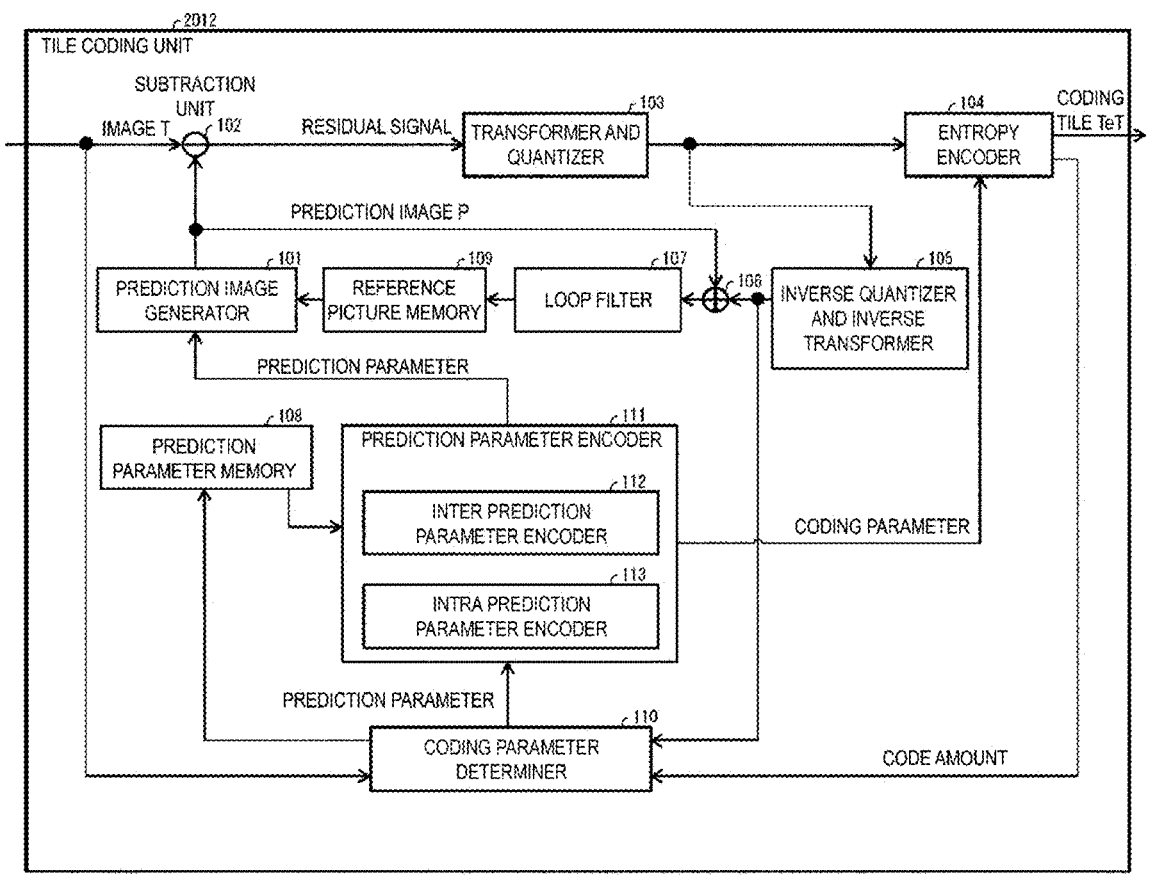
FIG. 4 is block diagram illustrating a configuration of a tile encoder according to the present embodiment.

Next, a configuration of the tile encoders 2012a to 2012n will be described. As an example, a configuration of the tile encoder 2012a will be described below with reference to FIG. 4. FIG. 4 is a block diagram illustrating a configuration of 2012, which is one of the tile encoders 2012a to 2012n. FIG. 4 is a block diagram illustrating a configuration of the tile encoder 2012 according to the present embodiment. The tile encoder 2012 includes a prediction image generator 101, a subtraction unit 102, a transform processing and quantization unit 103, an entropy encoder 104, an inverse quantization and inverse transform processing unit 105, an addition unit 106, a loop filter 107, a prediction parameter memory (a prediction parameter storage, a frame memory) 108, a reference picture memory (a reference image storage unit, a frame memory) 109, a coding parameter determiner 110, and a prediction parameter encoder 111. The prediction parameter encoder 111 includes an inter prediction parameter encoder 112 and an intra prediction parameter encoder 113. Note that the tile encoder 2012 may not include the loop filter 107.

For each picture of an image T, the prediction image generator 101 generates a prediction image P of a prediction unit PU for each coding unit CU that is a region where the picture is split. Here, the prediction image generator 101 reads a block that has been decoded from the reference picture memory 109, based on a prediction parameter input from the prediction parameter encoder 111. For example, in a case of an inter prediction, the prediction parameter input from the prediction parameter encoder 111 is a motion vector. The prediction image generator 101 reads a block in a position in a reference picture indicated by a motion vector starting from a target PU. In a case of an intra prediction, the prediction parameter is, for example, an intra prediction mode. The prediction image generator 101 reads a pixel value of a neighboring PU used in an intra prediction mode from the reference picture memory 109, and generates the prediction image P of a PU. The prediction image generator 101 generates the prediction image P of a PU by using one prediction scheme among multiple prediction schemes for the read reference picture block. The prediction image generator 101 outputs the generated prediction image P of the PU to the subtraction unit 102.

Figure 6:
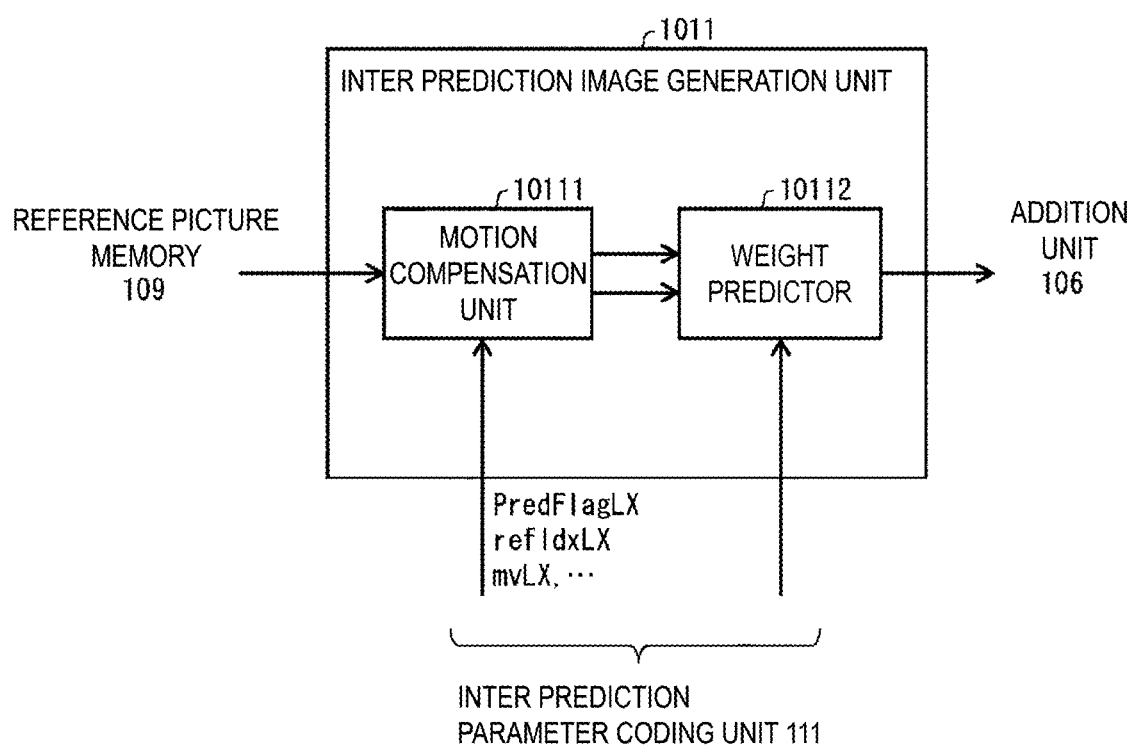
FIG. 6 is a diagram illustrating a configuration of an inter prediction image generator according to the present embodiment.

Note that the prediction image generator 101 is an operation the same as the prediction image generator 308 already described. For example, FIG. 6 is a schematic diagram illustrating a configuration of an inter prediction image generator 1011 included in the prediction image generator 101. The inter prediction image generator 1011 includes a motion compensation unit 10111 and a weight predictor 10112. Descriptions about the motion compensation unit 10111 and the weight predictor 10112 are omitted since the motion compensation unit 10111 and the weight predictor 10112 have configurations similar to those of the above-mentioned motion compensation unit 3091 and weight predictor 3094, respectively. The padding process at the tile boundary is also the same operation as the operation of the prediction image generator 308, and thus description is herein omitted.

The prediction image generator 101 generates the prediction image P of a PU, based on a pixel value of a reference block read from the reference picture memory, by using a parameter input by the prediction parameter encoder. The prediction image generated by the prediction image generator 101 is output to the subtraction unit 102 and the addition unit 106.

The intra prediction image generator (not illustrated) included in the prediction image generator 101 performs the same operation as the operation of the intra prediction image generator 310 described above.

The subtraction unit 102 subtracts a signal value of the prediction image P of a PU input from the prediction image generator 101 from a pixel value of a corresponding PU position of the image T, and generates a residual signal. The subtraction unit 102 outputs the generated residual signal to the transform processing and quantization unit 103.

The transform processing and quantization unit 103 performs a frequency transform for the prediction residual signal input from the subtraction unit 102, and calculates transform coefficients. The transform processing and quantization unit 103 quantizes the calculated transform coefficients to calculate quantization transform coefficients. The transform processing and quantization unit 103 outputs the calculated quantization transform coefficients to the entropy encoder 104 and the inverse quantization and inverse transform processing unit 105.

To the entropy encoder 104, quantization transform coefficients are input from the transform processing and quantization unit 103, and prediction parameters are input from the prediction parameter encoder 111. For example, input prediction parameters include codes such as a reference picture index ref_idx_lX, a prediction vector index mvp_lX_idx, a difference vector mvdLX, a prediction mode pred_mode_flag, and a merge index merge_idx.

The entropy encoder 104 performs entropy coding on the input split information, prediction parameters, quantization transform coefficients, and the like to generate the coding stream Te, and outputs the generated coding stream Te to the outside.

The inverse quantization and inverse transform processing unit 105 is the same as the inverse quantization and inverse transform processing unit 311 (FIG. 5) of the tile decoder 2002, and inversely quantizes the quantization transform coefficients input from the transform processing and quantization unit 103 to calculate transform coefficients. The inverse quantization and inverse transform processing unit 105 performs inverse transform on the calculated transform coefficient to calculate residual signals. The inverse quantization and inverse transform processing unit 105 outputs the calculated residual signals to the addition unit 106.

The addition unit 106 adds signal values of the prediction image P of the PUs input from the prediction image generator 101 and signal values of the residual signals input from the inverse quantization and inverse transform processing unit 105 for each pixel, and generates the decoded image. The addition unit 106 stores the generated decoded image in the reference picture memory 109.

The loop filter 107 performs a deblocking filter 114, a sample adaptive offset (SAO) 115, and an adaptive loop filter (ALF) 116 to the decoded image generated by the addition unit 106. Note that the loop filter 107 need not necessarily include the above three types of filters, and may include only the deblocking filter 114, for example.

The prediction parameter memory 108 stores the prediction parameters generated by the coding parameter determiner 110 for each picture and CU of the coding target in a prescribed position.

The reference picture memory 109 stores the decoded image generated by the loop filter 107 for each picture and CU of the coding target in a prescribed position.

The coding parameter determiner 110 selects one set among multiple sets of coding parameters. A coding parameter is the above-mentioned QT or BT split parameter or prediction parameter, or a parameter to be a target of coding generated in association with these parameters. The prediction image generator 101 generates the prediction image P of the PUs by using each of the sets of these coding parameters.

The coding parameter determiner 110 calculates RD cost values indicating a volume of an information quantity and coding errors for each of the multiple sets. For example, an RD cost value is a sum of a code amount and a value of multiplying a coefficient λ by a square error. The code amount is an information quantity of the coding stream Te obtained by performing entropy coding on a quantization residual and a coding parameter. The square error is a sum of pixels for square values of residual values of residual signals calculated in the subtraction unit 102. The coefficient λ is a real number that is larger than a pre-configured zero. The coding parameter determiner 110 selects a set of coding parameters by which the calculated RD cost value is minimized. With this configuration, the entropy encoder 104 outputs the selected set of coding parameters as the coding stream Te to the outside, and does not output sets of coding parameters that are not selected. The coding parameter determiner 110 stores the determined coding parameters in the prediction parameter memory 108.

The prediction parameter encoder 111 derives a format for coding from parameters input from the coding parameter determiner 110, and outputs the format to the entropy encoder 104. A derivation of a format for coding is, for example, to derive a difference vector from a motion vector and a prediction vector. The prediction parameter encoder 111 derives parameters necessary to generate a prediction image from parameters input from the coding parameter determiner 110, and outputs the parameters to the prediction image generator 101. For example, parameters necessary to generate a prediction image are a motion vector of a sub-block unit.

The inter prediction parameter encoder 112 derives inter prediction parameters such as a difference vector, based on prediction parameters input from the coding parameter determiner 110. The inter prediction parameter encoder 112 includes a partly identical configuration to a configuration by which the inter prediction parameter decoder 303 derives inter prediction parameters, as a configuration to derive parameters necessary for generation of a prediction image output to the prediction image generator 101. A configuration of the inter prediction parameter encoder 112 will be described later.

The intra prediction parameter encoder 113 includes a partly identical configuration to a configuration by which the intra prediction parameter decoder 304 derives intra prediction parameters, as a configuration to derive prediction parameters necessary for generation of a prediction image output to the prediction image generator 101.

The intra prediction parameter encoder 113 derives a format for coding (for example, MPM_idx, rem_intra_luma_pred_mode, and the like) from the intra prediction mode IntraPredMode input from the coding parameter determiner 110.

Configuration of Inter Prediction Parameter Encoder

Figure 10:
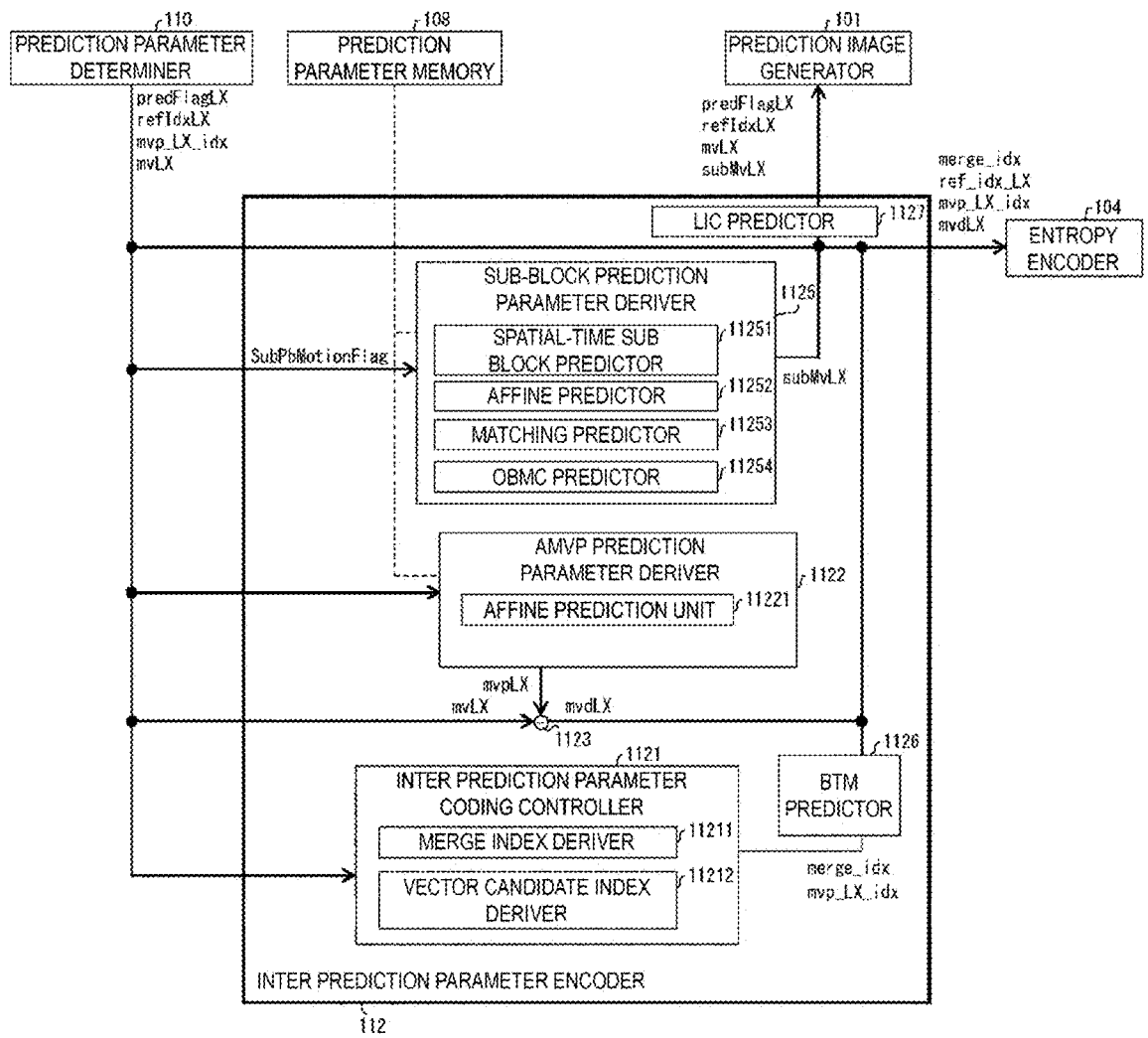
FIG. 10 is a schematic diagram illustrating a configuration of an inter prediction parameter encoder according to the present embodiment.

Next, a configuration of the inter prediction parameter encoder 112 will be described. The inter prediction parameter encoder 112 is a unit corresponding to the inter prediction parameter decoder 303 of FIG. 12, and its configuration is illustrated in FIG. 10.

The inter prediction parameter encoder 112 includes an inter prediction parameter coding controller 1121, an AMVP prediction parameter deriver 1122, a subtraction unit 1123, a sub-block prediction parameter deriver 1125, a BTM predictor 1126, and an LIC predictor 1127. Although not illustrated, the inter prediction parameter encoder 112 further includes a split mode deriver, a merge flag deriver, an inter prediction indicator deriver, a reference picture index deriver, and a vector difference deriver, for example. The split mode deriver, the merge flag deriver, the inter prediction indicator deriver, the reference picture index deriver, and the vector difference deriver derive the PU split mode part_mode, the merge flag merge_flag, the inter prediction indicator inter_pred_idc, the reference picture index refIdxLX, and the difference vector mvdLX, respectively. The inter prediction parameter encoder 112 outputs, to the prediction image generator 101, the motion vectors (mvLX, subMvLX) and the reference picture index refIdxLX, the PU split mode part_mode, the inter prediction indicator inter_pred_idc, or information indicating these. The inter prediction parameter encoder 112 outputs, to the entropy encoder 104, the PU split mode part_mode, the merge flag merge_flag, the merge index merge_idx, the inter prediction indicator inter_pred_idc, the reference picture index refIdxLX, the prediction vector index mvp_lX_idx, the difference vector mvdLX, and the sub-block prediction mode flag subPbMotionFlag.

The inter prediction parameter coding controller 1121 includes a merge index deriver 11211 and a vector candidate index deriver 11212. The merge index deriver 11211 compares a motion vector and a reference picture index input from the coding parameter determiner 110 with motion vectors and reference picture indexes of PUs of merge candidates read from the prediction parameter memory 108, respectively, and thereby derives a merge index merge_idx and outputs the derived merge index merge_idx to the entropy encoder 104. The merge candidates are reference PUs (for example, reference PUs touching a lower left end, an upper left end, and an upper right end of a coding target block) that are located within a predetermined range with respect to a coding target CU to be coded, and are PUs that have been subjected to a coding process. The vector candidate index deriver 11212 derives the prediction vector index mvp_lX_idx.

In a case that the coding parameter determiner 110 determines to use the sub-block prediction mode, the sub-block prediction parameter deriver 1125 derives a motion vector and a reference picture index for sub-block prediction of any one of spatial sub-block prediction, temporal sub-block prediction, affine prediction, matching motion derivation, and OBMC prediction, in accordance with the value of subPbMotionFlag. As described in the description for tile decoder 2002, the motion vector and the reference picture index are derived by reading a motion vector and a reference picture index of a neighboring PU, a reference picture block, and the like from the prediction parameter memory 108. The sub-block prediction parameter deriver 1125, as well as a spatial-temporal sub-block predictor 11251, an affine predictor 11252, a matching motion deriver 11253, and an OBMC predictor 11254 included in the sub-block prediction parameter deriver 1125, have configurations similar to the configurations of the sub-block prediction parameter deriver 3037 of the inter prediction parameter decoder 303, as well as the spatial-temporal sub-block predictor 30371, the affine predictor 30372, the matching motion deriver 30373, and the OBMC predictor 30374 included in the sub-block prediction parameter deriver 3037, respectively.

The AMVP prediction parameter deriver 1122 includes the affine predictor 11221, and has a configuration similar to the configuration of the above-described AMVP prediction parameter deriver 3032 (see FIG. 12).

Specifically, in a case that the prediction mode predMode indicates the inter prediction mode, the motion vector mvLX is input to the AMVP prediction parameter deriver 1122 from the coding parameter determiner 110. Based on the input motion vector mvLX, the AMVP prediction parameter deriver 1122 derives a prediction vector mvpLX. The AMVP prediction parameter deriver 1122 outputs the derived prediction vector mvpLX to the subtraction unit 1123. Note that the reference picture index refIdxLX and the prediction vector index mvp_lX_idx are output to the entropy encoder 104. The affine predictor 11221 has a configuration similar to the configuration of the affine predictor 30321 of the above-described AMVP prediction parameter deriver 3032 (see FIG. 12). The LIC predictor 1127 has a configuration similar to the configuration of the above-described LIC predictor 3039 (see FIG. 12).

The subtraction unit 1123 subtracts the prediction vector mvpLX input from the AMVP prediction parameter deriver 1122 from the motion vector mvLX input from the coding parameter determiner 110, and thereby generates a difference vector mvdLX. The difference vector mvdLX is output to the entropy encoder 104.

An image encoding device or a video decoding device according to one aspect of the present invention is a video encoding device or a video decoding device for performing a spatial-temporal sub-block prediction process of deriving a motion vector (first motion vector) per sub-block of a target block, based on a spatial neighboring block or a temporal neighboring block, the image encoding device or the video decoding device including: a unit configured to refer to a neighboring block within a tile sequence including the target block, and acquire a motion vector (second motion vector) and a reference picture (second reference picture) of an available neighboring block; a unit configured to calculate a sub-block level motion vector (third motion vector) of the target block, based on the second motion vector and the second reference picture; a unit configured to scale the third motion vector by using a time difference between a target picture and the second reference picture or between the target picture and a reference picture (first reference picture) of the target block, and derive the first motion vector; and a unit configured to determine whether or not a reference pixel is present within the tile sequence on the first reference picture, the reference pixel being referred to in a case of deriving a motion compensation image by using the first motion vector of the sub-block of the target block, wherein in a case that the reference pixel is not present within the tile sequence, a process of deriving a pixel value of the motion compensation image based on a pixel value within the tile sequence is performed.

In the image encoding device or the video decoding device according to one aspect of the present invention, the motion compensation image derivation process uses a padding pixel derived based on a boundary pixel of the tile sequence.

In the image encoding device or the video decoding device according to one aspect of the present invention, the motion compensation image derivation process is processed within a range restriction of the first motion vector.

In the image encoding device or the video decoding device according to one aspect of the present invention, the motion compensation image derivation process is processed by performing a process by copying a motion vector of a neighboring sub-block to the first motion vector.

In the image encoding device or the video decoding device according to one aspect of the present invention, the motion compensation image derivation process is performed in a case that the number of horizontal tiles within a picture, the number of vertical tiles within the picture, a width of a tile, and a height of the tile remain unchanged throughout certain sequence units (Coded Video Sequence (CVS)).

In the image encoding device or the video decoding device according to one aspect of the present invention, a position of the temporal neighboring block is a block including lower right coordinates within a collocated block.

In the image encoding device or the video decoding device according to one aspect of the present invention, a tile reference restriction flag is coded or decoded, in a case that the tile reference restriction flag is 0, the position of the temporal neighboring block is configured to a position of a lower right neighboring block of the collocated block, and in a case that the tile reference restriction flag is 1, the position of the temporal neighboring block is configured to a lower right position within the collocated block.

An image encoding device or a video decoding device according to one aspect of the present invention is a device for performing variable-length coding or decoding on a syntax by using a context (probability model) adaptively updated and selected depending on a type of the syntax and a surrounding condition, for each of multiple tiles constituting a picture, the image encoding device or the video decoding device including: a memory configured to store a predetermined context (first context); a storage unit configured to store contexts updated for each of the coded or decoded tiles in the memory, together with a tile ID, a slice type, and a quantization parameter; a determination unit configured to determine whether or not a context (second context) of a tile having the same tile ID and using the same slice type or the same quantization parameter is stored in the memory, among the contexts stored in the memory; a reading unit configured to read, from the memory, an initial state of a context of a tile to be coded or decoded; and a variable-length coding and decoding unit configured to perform variable-length coding or decoding on the syntax by using the initial state, wherein in a case that the determination unit determines that the second context is stored in the memory, the reading unit reads the second context as the initial state, otherwise, the reading unit reads the first context as the initial state, and the variable-length coding and decoding unit performs variable-length coding or variable-length decoding on the tile by using the initial state.

An image encoding device according to one aspect of the present invention is a video encoding device for applying an adaptive loop filter (ALF) to each of multiple tiles constituting a picture, the image encoding device including: a unit configured to calculate a filter coefficient of a target tile; a memory configured to store filter information (the filter coefficient, a tile ID, a slice type, and a quantization parameter) of the target tile; a encoder unit configured to code a parameter related to the filter information; and a filter unit configured to apply the ALF to the target tile by using the filter coefficient, wherein in a case that the filter information of the target tile is the same as one piece of the filter information stored in the memory, the encoder unit codes an index indicating the filter information stored in the memory as a parameter, otherwise, the encoder unit codes the filter information of the target tile as a parameter, and stores the coded parameter in the memory, and the filter unit applies the ALF to the target tile by using the filter coefficient.

An image decoding device according to one aspect of the present invention is a video decoding device for applying an adaptive loop filter (ALF) to each of multiple tiles constituting a picture, the image decoding device including: a unit configured to decode a parameter related to filter information of a target tile from a coding stream; a derivation unit configured to derive a filter coefficient, based on the parameter; a memory configured to store filter information (the filter coefficient, a tile ID, a slice type, and a quantization parameter) of the target tile; and a filter unit configured to apply the ALF to the target tile by using the filter coefficient, wherein in a case that the parameter is an index, the derivation unit derives the filter coefficient selected from the filter information stored in the memory by using the index as the filter coefficient of the target tile, otherwise, the derivation unit derives the parameter as the filter information of the target tile, and stores the derived parameter in the memory, together with the tile ID, the slice type, and the quantization parameter, and the filter unit applies the ALF to the target tile by using the filter coefficient.

An image encoding device or a video decoding device according to one aspect of the present invention is a video encoding device or a video decoding device for performing a motion compensation prediction process by means of affine prediction for a sub-block obtained by splitting a target block, the image encoding device or the video decoding device including: a first derivation unit configured to derive a motion vector (first motion vector) of each of two representative points of the target block; a determination unit configured to determine whether or not the first motion vector refers to an inside of a tile sequence; a second derivation unit configured to derive a motion vector (second motion vector) of the sub-block included in the target block, based on the first motion vector; and a generator unit configured to generate a motion compensation image per sub-block, based on the second motion vector, wherein in a case that the determination unit determines that the first motion vector refers to an outside of the tile sequence, a process of deriving a pixel value of the motion compensation image based on a pixel value within the tile sequence is performed.

In the image encoding device or the video decoding device according to one aspect of the present invention, in a case that the determination unit determines that the first motion vector refers to the outside of the tile sequence, the first derivation process is processed within a range restriction of the first motion vector.

In the image encoding device or the video decoding device according to one aspect of the present invention, in a case that the second motion vector refers to an outside of a tile, the generator unit generates the motion compensation image by padding a tile boundary.

In the image encoding device or the video decoding device according to one aspect of the present invention, the motion vector of each of the two representative points is derived by adding a prediction vector referring to a prediction vector index and a difference vector.

In the image encoding device or the video decoding device according to one aspect of the present invention, in a case that a left side of the target block touches a tile boundary, the representative points are configured to upper left and upper right points of the target block, and in a case that an upper side of the target block touches the tile boundary, the representative points are configured to upper left and lower left points of the target block.

In the image encoding device or the video decoding device according to one aspect of the present invention, the motion vector of each of the two representative points is derived based on a motion vector of each of three points within a neighboring block in which the affine prediction is used.

An image encoding device or a video decoding device according to one aspect of the present invention is a video encoding device or a video decoding device for performing an overlapped motion compensation prediction process by using a motion vector (first motion vector) of a sub-block obtained by splitting a target block and a motion vector (second motion vector) from a neighboring block of the sub-block, the image encoding device or the video decoding device including: an acquisition unit configured to acquire the second motion vector from the neighboring block, the neighboring block being a neighbor of the sub-block in each of directions of an upper side, a left side, a lower side, and a right side; a first determination unit configured to determine whether or not a reference pixel is present within a tile sequence on a reference picture, the reference pixel being referred to in a case of generating a motion compensation image by using the second motion vector of the sub-block; a second determination unit configured to determine whether or not the first motion vector and the second motion vector are the same; a first generator unit configured to generate a first motion compensation image by using the first motion vector of the sub-block; a second generator unit configured to generate a second motion compensation image by using the second motion vector of the sub-block; and a third generator unit configured to generate a prediction image by adding the first motion compensation image and the second motion compensation image, in a case that the second determination unit determines that the two motion vectors are not the same, wherein in a case that the first determination unit determines that the reference pixel is not present within the tile sequence on the reference picture, a process of deriving a pixel value of the motion compensation image, based on a pixel value within the tile sequence is performed.

In the image encoding device or the video decoding device according to one aspect of the present invention, the generator unit uses a padding pixel derived based on a boundary pixel of the tile sequence.

In the image encoding device or the video decoding device according to one aspect of the present invention, the generator unit performs a process within a range restriction of the second motion vector.

In the image encoding device or the video decoding device according to one aspect of the present invention, the generator unit performs a process by copying a motion vector of the neighboring block to the second motion vector.

An image encoding device or a video decoding device according to one aspect of the present invention is a video encoding device or a video decoding device for performing a motion compensation prediction process by means of template matching for a sub-block obtained by splitting a target block, the image encoding device or the video decoding device including: a first acquisition unit configured to acquire upper and left neighboring regions (first template region) of a target block in a target picture, and upper and left neighboring regions (second template region) of a reference block in a reference picture; a first derivation unit configured to derive a motion vector (first motion vector) leading to a minimum matching cost between the first template region and the second template region, based on a motion vector of a neighboring block of the target block; a second acquisition unit configured to acquire upper and left neighboring regions (third template region) of the sub-block obtained by splitting the target block in the target picture, and upper and left neighboring regions (fourth template region) of the sub-block obtained by splitting the reference block in the reference picture; a second derivation unit configured to derive a motion vector (second motion vector) leading to a minimum matching cost between the third template region and the fourth template region, based on the first motion vector or the motion vector of the neighboring block; and a generator unit configured to generate a motion compensation image by using the second motion vector of the sub-block, wherein the first acquisition unit includes a determination unit configured to determine whether or not all the first template region is present within a tile, in a case of acquiring the first template region, in a case that the determination unit determines that a part of the first template region is present within a tile sequence, only any one of the upper neighboring region and the left neighboring region present within the tile sequence is acquired as the first template region, and in a case that the determination unit determines that the first template region is not present within the tile sequence, the motion compensation prediction process by means of template matching is not performed.

An image decoding device or a video encoding device according to one aspect of the present invention includes: a filtered reference image configuration unit configured to derive a filtered reference image on a reference region configured for a prediction target block; a predictor unit configured to refer to the filtered reference image to derive a temporary prediction image of the prediction target block, by means of a prediction scheme in accordance with an intra prediction mode; and a prediction image correction unit configured to perform a prediction image correction process, based on an unfiltered reference image on the reference region and the intra prediction mode, to thereby generate a prediction image from the temporary prediction image, wherein the prediction image correction unit derives the prediction image by applying weighted addition using a weighting coefficient to a pixel value of the temporary prediction image and pixel values of at least two or more unfiltered reference images, and in a case that a pixel (upper left pixel) of the unfiltered reference image located at upper left of the prediction target block is located outside of a tile sequence, the prediction image is derived by replacing a pixel value of the upper left pixel with a pixel value within the tile sequence.

In the image decoding device or the video encoding device according to one aspect of the present invention, the prediction image correction unit replaces the pixel value of the upper left pixel with a pixel value of the unfiltered reference image located immediately on an upper side of a left end or right end pixel of the prediction target block.

In the image decoding device or the video encoding device according to one aspect of the present invention, the prediction image correction unit replaces the pixel value of the upper left pixel with a pixel value of the unfiltered reference image located immediately on a left side of an upper end or lower end pixel of the prediction target block.

An image decoding device or a video encoding device according to one aspect of the present invention includes: a derivation unit configured to derive a linear model (prediction parameter) between a luminance component and a chrominance component, based on an unfiltered reference image of the luminance component and an unfiltered reference image of the chrominance component being neighbors of a prediction target block; a down-sampling unit including multiple filters that down-sample a decoded image of the luminance component of the prediction target block; and a predictor unit configured to refer to the prediction parameter, and generate a prediction image of the chrominance component from the decoded image of the down-sampled luminance component, wherein in a case that at least a part of left and upper unfiltered reference images of the prediction target block is located outside of a tile sequence, the down-sampling unit down-samples the decoded image of the luminance component by using one predetermined type of a filter.

An image decoding device or a video encoding device according to one aspect of the present invention includes: a first motion vector derivation unit configured to perform an initial vector search and a local search of a matching process for each target block, and thereby derive a motion vector; and a second motion vector derivation unit configured to refer to a first motion vector derived by the first motion vector derivation unit, and performs an initial vector search and a local search of a matching process for each of multiple sub-blocks included in the target block, and thereby derive a motion vector, wherein in a case that an outside of a tile sequence is included in a search range of a motion vector search of the matching process, the search range is configured so that only a pixel within the tile sequence is referred to.

An image decoding device or a video encoding device according to one aspect of the present invention is a video encoding device or a video decoding device for performing a spatial-temporal prediction process by deriving a motion vector of a target block, based on a spatial neighboring block or a temporal neighboring block, the image decoding device or the video encoding device including: a unit configured to determine whether or not a reference pixel is present within a tile sequence on a reference picture, the reference pixel being referred to in a case of deriving a motion compensation image by using a motion vector of the target block; and a unit configured to derive a pixel value of the motion compensation image, based on a pixel value within the tile sequence, in a case that the reference pixel is not present within the tile sequence, wherein a position of the temporal neighboring block is a block including any one of lower right coordinates within a collocated block, lower left coordinates of a right neighboring block of the collocated block, and upper right coordinates of a lower neighboring block of the collocated block.

In the image decoding device or the video encoding device according to one aspect of the present invention, a tile reference restriction flag is coded or decode, in a case that the tile reference restriction flag is 0, the position of the temporal neighboring block is configured to a position of a lower right neighboring block of the collocated block, and in a case that the tile reference restriction flag is 1, the position of the temporal neighboring block is configured to the position of the block including any one of the lower right coordinates within the collocated block, the lower left coordinates of the right neighboring block of the collocated block, and the upper right coordinates of the lower neighboring block of the collocated block.

An image decoding device or a video encoding device according to one aspect of the present invention is a video encoding device or a video decoding device for performing a spatial-temporal prediction process by deriving a motion vector (first motion vector) of a target block, based on a spatial neighboring block or a temporal neighboring block, the image decoding device or the video encoding device including: a unit configured to refer to a neighboring block within a tile sequence including the target block, and acquire a prediction parameter (motion vector (second motion vector), reference picture) of an available spatial or temporal neighboring block; a unit configured to store the acquired prediction parameter of the neighboring block in a list storing prediction candidates of the first motion vector; and a unit configured to pad a region outside of the tile sequence, wherein in a case that the second motion vector stored in a candidate list includes multiple motion vectors referring to a padding region, the storage unit keeps the second motion vector first stored in the candidate list, and removes other second motion vectors referring to the padding region from the candidate list.

Implementation Examples by Software

Note that, part of the tile encoder 2012 and the tile decoder 2002 according to the above-mentioned embodiments, for example, the entropy decoder 301, the prediction parameter decoder 302, the loop filter 305, the prediction image generator 308, the inverse quantization and inverse transform processing unit 311, the addition unit 312, the prediction image generator 101, the subtraction unit 102, the transform processing and quantization unit 103, the entropy encoder 104, the inverse quantization and inverse transform processing unit 105, the loop filter 107, the coding parameter determiner 110, and the prediction parameter encoder 111, may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the tile encoder 2012 or the tile decoder 2002, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Part or all of the image encoding device 11 and the image decoding device 31 in the embodiments described above may be realized as an integrated circuit such as a Large Scale Integration (LSI). Each function block of the image encoding device 11 and the image decoding device 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiments of the present invention have been described in detail above referring to the drawings, but the specific configuration is not limited to the above embodiments and various amendments can be made to a design that falls within the scope that does not depart from the gist of the present invention.

Application Examples

The above-mentioned image encoding device 11 and the image decoding device 31 can be utilized being installed to various devices performing transmission, reception, recording, and regeneration of videos. Note that, videos may be natural videos imaged by cameras or the like, or may be artificial videos (including CG and GUI) generated by computers or the like.

At first, referring to FIG. 27, it will be described that the above-mentioned image encoding device 11 and the image decoding device 31 can be utilized for transmission and reception of videos.

Figure 27:
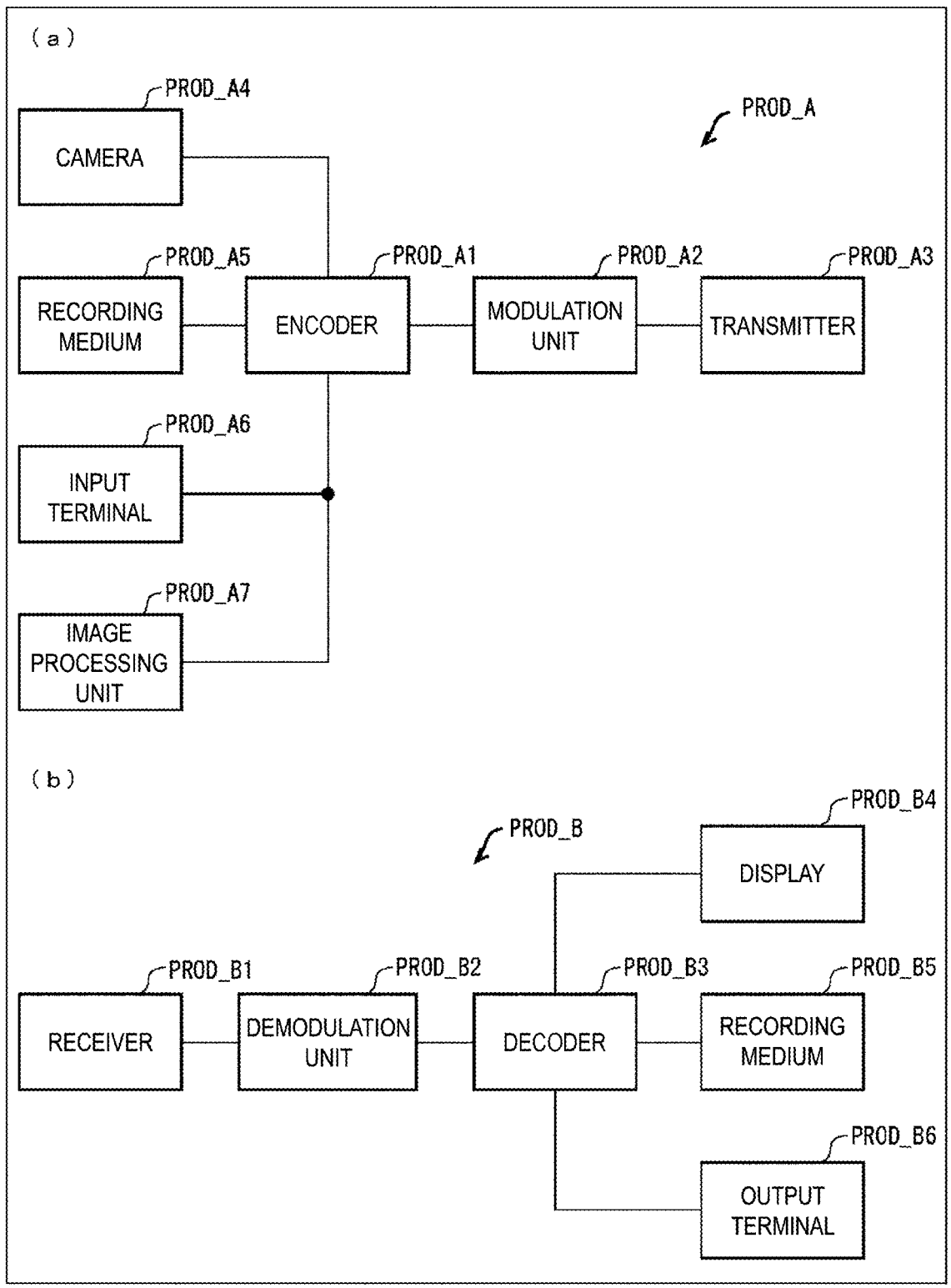
FIG. 27 is a diagram illustrating configurations of a transmission device equipped with the video encoding device and a reception device equipped with the video decoding device according to the present embodiment.

FIG. 27($a$) is a block diagram illustrating a configuration of a transmission device PROD_A installed with the image encoding device 11. As illustrated in FIG. 27($a$), the transmission device PROD_A includes an encoder PROD_A1 which obtains coded data by coding videos, a modulation unit PROD_A2 which obtains modulating signals by modulating carrier waves with the coded data obtained by the encoder PROD_A1, and a transmitter PROD_A3 which transmits the modulating signals obtained by the modulation unit PROD_A2. The above-mentioned image encoding device 11 is utilized as the encoder PROD_A1.

The transmission device PROD_A may further include a camera PROD_A4 imaging videos, a recording medium PROD_A5 recording videos, an input terminal PROD_A6 to input videos from the outside, and an image processing unit PROD_A7 which generates or processes images, as sources of supply of the videos input into the encoder PROD_A1. In FIG. 27($a$), although the configuration that the transmission device PROD_A includes these all is exemplified, a part may be omitted.

Note that the recording medium PROD_A5 may record videos which are not coded, or may record videos coded in a coding scheme for recording different from a coding scheme for transmission. In the latter case, a decoder (not illustrated) to decode coded data read from the recording medium PROD_A5 according to coding scheme for recording may be interleaved between the recording medium PROD_A5 and the encoder PROD_A1.

FIG. 27($b$) is a block diagram illustrating a configuration of a reception device PROD_B installed with the image decoding device 31. As illustrated in FIG. 27($b$), the reception device PROD_B includes a receiver PROD_B1 which receives modulating signals, a demodulation unit PROD_B2 which obtains coded data by demodulating the modulating signals received by the receiver PROD_B1, and a decoder PROD_B3 which obtains videos by decoding the coded data obtained by the demodulation unit PROD_B2. The above-mentioned image decoding device 31 is utilized as the decoder PROD_B3.

The reception device PROD_B may further include a display PROD_B4 displaying videos, a recording medium PROD_B5 to record the videos, and an output terminal PROD_B6 to output videos outside, as supply destination of the videos output by the decoder PROD_B3. In FIG. 27($b$), although the configuration that the reception device PROD_B includes these all is exemplified, a part may be omitted.

Note that the recording medium PROD_B5 may record videos which are not coded, or may record videos which are coded in a coding scheme for recording different from a coding scheme for transmission. In the latter case, an encoder (not illustrated) to code videos acquired from the decoder PROD_B3 according to a coding scheme for recording may be interleaved between the decoder PROD_B3 and the recording medium PROD_B5.

Note that the transmission medium transmitting modulating signals may be wireless or may be wired. The transmission aspect to transmit modulating signals may be broadcasting (here, referred to as the transmission aspect where the transmission target is not specified beforehand) or may be telecommunication (here, referred to as the transmission aspect that the transmission target is specified beforehand). Thus, the transmission of the modulating signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of the transmission device PROD_A/reception device PROD_B transmitting and/or receiving modulating signals in radio broadcasting. Broadcasting stations (broadcasting equipment, and the like)/receiving stations (television receivers, and the like) of cable television broadcasting are an example of the transmission device PROD_A/reception device PROD_B transmitting and/or receiving modulating signals in cable broadcasting.

Servers (work stations, and the like)/clients (television receivers, personal computers, smartphones, and the like) for Video On Demand (VOD) services, video hosting services using the Internet and the like are an example of transmission device PROD_A/reception device PROD_B transmitting and/or receiving modulating signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multifunctional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmission device PROD_A and the reception device PROD_B.

Figure 28:
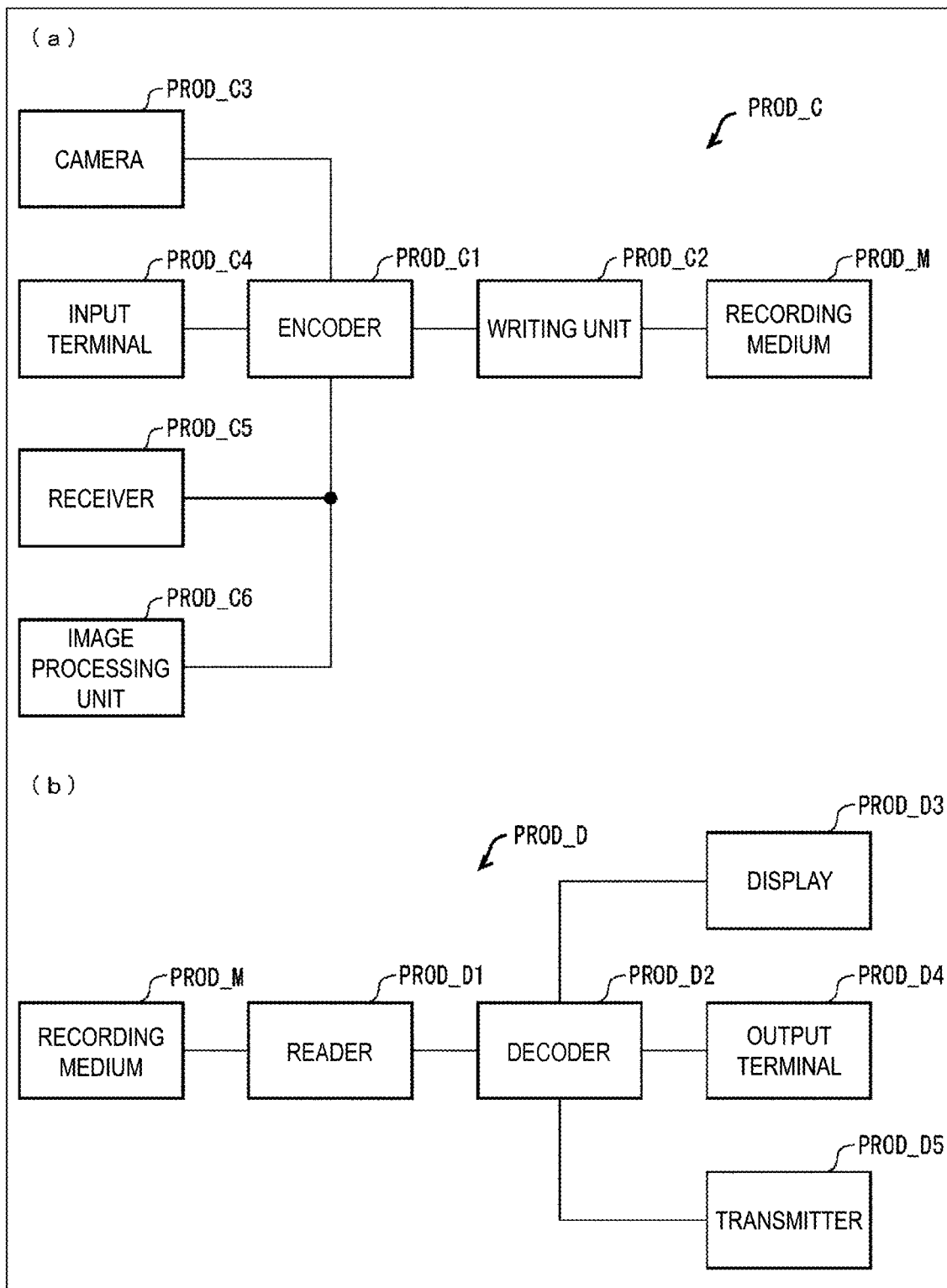
FIG. 28 is a diagram illustrating configurations of a recording device equipped with the video encoding device and a regeneration device equipped with the video decoding device according to the present embodiment.

Next, referring to FIG. 28, it will be described that the above-mentioned image encoding device 11 and the image decoding device 31 can be utilized for recording and regeneration of videos.

FIG. 28(a) is a block diagram illustrating a configuration of a recording device PROD_C installed with the above-mentioned image encoding device 11. As illustrated in FIG. 28(a), the recording device PROD_C includes an encoder PROD_C1 which obtains coded data by coding a video, and a writing unit PROD_C2 which writes the coded data obtained by the encoder PROD_C1 in a recording medium PROD_M. The above-mentioned image encoding device 11 is utilized as the encoder PROD_C1.

Note that the recording medium PROD_M may be (1) a type built in the recording device PROD_C such as Hard Disk Drive (HDD) or Solid State Drive (SSD), may be (2) a type connected to the recording device PROD_C such as an SD memory card or a Universal Serial Bus (USB) flash memory, and may be (3) a type loaded in a drive device (not illustrated) built in the recording device PROD_C such as Digital Versatile Disc (DVD) or Blu-ray (trademark) Disc (BD: trademark).

The recording device PROD_C may further include a camera PROD_C3 imaging a video, an input terminal PROD_C4 to input the video from the outside, a receiver PROD_C5 to receive the video, and an image processing unit PROD_C6 which generates or processes images, as sources of supply of the video input into the encoder PROD_C1. In FIG. 28(a), although the configuration that the recording device PROD_C includes these all is exemplified, a part may be omitted.

Note that the receiver PROD_C5 may receive a video which is not coded, or may receive coded data coded in a coding scheme for transmission different from a coding scheme for recording. In the latter case, a decoder (not illustrated) for transmission to decode coded data coded in a coding scheme for transmission may be interleaved between the receiver PROD_C5 and the encoder PROD_C1.

Examples of such recording device PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is the main source of supply of a video), a personal computer (in this case, the receiver PROD_C5 or the image processing unit C6 is the main source of supply of a video), a smartphone (in this case, the camera PROD_C3 or the receiver PROD_C5 is the main source of supply of a video), or the like is an example of such recording device PROD_C.

FIG. 28(b) is a block illustrating a configuration of a regeneration device PROD_D installed with the above-mentioned image decoding device 31. As illustrated in FIG. 28(b), the regeneration device PROD_D includes a reader PROD_D1 which reads coded data written in the recording medium PROD_M, and a decoder PROD_D2 which obtains a video by decoding the coded data read by the reader PROD_D1. The above-mentioned image decoding device 31 is utilized as the decoder PROD_D2.

Note that the recording medium PROD_M may be (1) a type built in the regeneration device PROD_D such as HDD or SSD, may be (2) a type connected to the regeneration device PROD_D such as an SD memory card or a USB flash memory, and may be (3) a type loaded in a drive device (not illustrated) built in the regeneration device PROD_D such as DVD or BD.

The regeneration device PROD_D may further include a display PROD_D3 displaying a video, an output terminal PROD_D4 to output the video to the outside, and a transmitter PROD_D5 which transmits the video, as the supply destination of the video output by the decoder PROD_D2. In FIG. 28(b), although the configuration that the regeneration device PROD_D includes these all is exemplified, a part may be omitted.

Note that the transmitter PROD_D5 may transmit a video which is not coded, or may transmit coded data coded in a coding scheme for transmission different from a coding scheme for recording. In the latter case, an encoder (not illustrated) to code a video in a coding scheme for transmission may be interleaved between the decoder PROD_D2 and the transmitter PROD_D5.

Examples of such regeneration device PROD_D include a DVD player, a BD player, an HDD player, and the like (in this case, the output terminal PROD_D4 to which a television receiver, and the like is connected is the main supply target of the video). A television receiver (in this case, the display PROD_D3 is the main supply target of the video), a digital signage (also referred to as an electronic signboard or an electronic bulletin board, and the like, the display PROD_D3 or the transmitter PROD_D5 is the main supply target of the video), a desktop PC (in this case, the output terminal PROD_D4 or the transmitter PROD_D5 is the main supply target of the video), a laptop type or tablet type PC (in this case, the display PROD_D3 or the transmitter PROD_D5 is the main supply target of the video), a smartphone (in this case, the display PROD_D3 or the transmitter PROD_D5 is the main supply target of the video), or the like is an example of such regeneration device PROD_D.

Realization as Hardware and Realization as Software

Each block of the above-mentioned image decoding device 31 and the image encoding device 11 may be realized as a hardware by a logical circuit formed on an integrated circuit (IC chip), or may be realized as a software using a Central Processing Unit (CPU).

In the latter case, each device includes a CPU performing a command of a program to implement each function, a Read Only Memory (ROM) stored in the program, a Random Access Memory (RAM) developing the program, and a storage device (recording medium) such as a memory storing the program and various data, and the like. The purpose of the embodiments of the present invention can be achieved by supplying, to each of the devices, the recording medium recording in a computer-readable manner the program code (execution form program, intermediate code program, source program) of the control program of each of the devices which is software implementing the above-mentioned functions, and a computer (or a CPU or a MPU) reading and performing the program code recorded in the recording medium.

For example, as the recording medium, a tape such as a magnetic tape or a cassette tape, a disc including a magnetic disc such as a floppy (trademark) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray (trademark) Disc (trademark), a card such as an IC card (including a memory card)/an optical card, a semiconductor memory such as a mask ROM/Erasable Programmable Read-Only Memory (EPROM)/Electrically Erasable and Programmable Read-Only Memory (EEPROM: trademark)/a flash ROM, or a Logical circuits such as a Programmable logic device (PLD) or a Field Programmable Gate Array (FPGA) can be used.

Each of the devices is configured connectably with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BlueTooth (trademark), IEEE 802.11 radio communication, High Data Rate (HDR), Near Field Communication (NFC), Digital Living Network Alliance (trademark) (DLNA: trademark), a cellular telephone network, a satellite channel, a terrestrial digital broadcast network are available. Note that the embodiments of the present invention can be also realized in the form of computer data signals embedded in a carrier wave where the program code is embodied by electronic transmission.

The embodiment of the present invention is not limited to the above-described embodiments. It is possible to make various modifications within the scope of the claims. Embodiments obtained by appropriately combining technical elements disclosed in different embodiments fall also within the technical scope of the present invention. Further, it is possible to form a new technical feature by combining technical elements disclosed in the respective embodiments.

CROSS-REFERENCE OF RELATED APPLICATION

This application claims the benefit of priority to JP 2017-126272 filed on 28 Jun. 2017, to JP 2017-162106 filed on 25 Aug. 2017, to JP 2017-146569 filed on 28 Jul. 2017, and to JP 2018-061846 filed on 28 Mar. 2018, which are incorporated herein by reference in its entirety.

INDUSTRIAL APPLICABILITY

The embodiments of the present invention can be preferably applied to an image decoding device to decode coded data where image data is coded, and an image encoding device to generate coded data where image data is coded. The embodiments of the present invention can be preferably applied to a data structure of coded data generated by the image encoding device and referred to by the image decoding device.

REFERENCE SIGNS LIST

10 CT information decoder
20 CU decoder
41 Image display device
2000 Image decoding device
2002 Tile decoder
2020 Image encoding device
2012 Tile encoder

The invention claimed is:
1. A video decoding device for generating a prediction image from two motion vectors, the video decoding device comprising:
a memory and
a processor, wherein the processor configured to:
decode a flag indicating whether or not a tile sequence of a tile, obtained by splitting a picture into rectangular regions, is independently decoded;
derive two motion vectors of a current block;
in a case that a first one of the two motion vectors points to a first reference picture which is located prior to a current picture in a time direction and a second one of the two motion vectors points to a second reference picture which is located after the current picture in the time direction,
a) derive reference positions in each of the first reference picture and the second reference picture based on upper left coordinates of the current block, each of the two motion vectors, and an accuracy of the two motion vectors;
b) derive a phase based on the two motion vectors and the accuracy,
c) derive clipped positions by clipping x coordinates of the reference positions in a range from xTs to xTs+wT−1 and clipping y coordinates of the reference positions in a range from yTs to yTs+hT−1 in a case that the flag indicates the tile sequence is independently decoded, where the xTs is an x coordinate of upper left coordinates of a current tile, where the wT is a width of the current tile, where the yTs is a y coordinate of the upper left coordinates of the current tile, and where the hT is a height of the current tile;

d) generate compensation images based on a product of a filter coefficient corresponding to the phase and pixel values of the clipped positions;
e) derive updated motion vectors that lead to a minimum matching cost based on the compensation images;
f) generate the prediction image based on the update motion vectors; and
g) decode the picture based on the prediction image.

\* \* \* \* \*